(12) United States Patent
McGuirk et al.

(10) Patent No.: US 10,558,207 B1
(45) Date of Patent: Feb. 11, 2020

(54) EVENT MONITORING SYSTEM

(71) Applicant: SAS Institute Inc., Cary, NC (US)

(72) Inventors: Anya M. McGuirk, Holly Springs, NC (US); Yuwei Liao, Cary, NC (US); Byron Davis Biggs, Cary, NC (US); Deovrat Vijay Kakde, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/549,608

(22) Filed: Aug. 23, 2019

Related U.S. Application Data

(60) Provisional application No. 62/832,569, filed on Apr. 11, 2019.

(51) Int. Cl.
  *G05B 23/02* (2006.01)
  *G06F 17/14* (2006.01)
  *G06N 20/00* (2019.01)

(52) U.S. Cl.
  CPC ......... *G05B 23/0283* (2013.01); *G06F 17/14* (2013.01); *G06N 20/00* (2019.01)

(58) Field of Classification Search
  CPC ...... G05B 23/0283; G06F 17/14; G06N 20/00
  See application file for complete search history.

(56) References Cited

U.S. PATENT DOCUMENTS 9,524,315 B1 12/2016 Bonham et al.
2018/0335366 A1* 11/2018 Qiao .................. G01M 13/045

OTHER PUBLICATIONS

Robert B. Randall, State of the Art in Monitoring Rotating Machinery—Part 1, Sound and Vibration, Mar. 2004, pp. 14-20.
Chaudauri et al., "The Trace Criterion for Kernel Bandwidth Selection for Support Vector Data Description," SAS Institute Inc., arXiv:1811.06838v1 Nov. 15, 2018, 16 pages.
Cholaquidis et al., "On visual distances for spectrum-type functional data," Advances in Data Analysis and Classification, Unversidad de la Republica, Nov. 2014, 21 pages.
Condition Monitoring & Predictive Maintenance, https://reality.ai/condition-monitoring-predictive-maintenance/, Printed Jun. 5, 2019, 7 pages.

(Continued)

*Primary Examiner* — Benjamin P Geib
(74) *Attorney, Agent, or Firm* — Bell & Manning, LLC

(57) ABSTRACT

A computing system detects an event. (A) A frequency spectrum of observation vectors is computed using a Fourier transform. Each observation vector includes a sensor value. (B) (A) is repeated a predefined plurality of times with successive windows of the observation vectors. Each window of the successive windows includes a subset of the observation vectors. The successive windows include successive subsets selected sequentially in time. (C) An average frequency spectrum is computed from the frequency spectrum computed the predefined plurality of times. (D) A predefined noise filter is applied to the average frequency spectrum to define a filtered frequency spectrum. (E) A distance value is computed between the filtered frequency spectrum and a predefined reference spectrum using a distance computation function. (F) When an event has occurred is determined based on a comparison between the computed distance value and a predefined distance threshold.

30 Claims, 38 Drawing Sheets

(56) References Cited

OTHER PUBLICATIONS

Cost-Effective & Highly Accurate Prediction of the Remaining Useful Life of Industrial Equipment, Nanoprecise, printed from the internet Jun. 5, 2019, 8 pages.

Langmead et al., "Phase-Independent Rhythmic Analysis of Genome-Wide Expression Patterns," Journal of Computational Biology, vol. 10, No. 3-4, 2003, pp. 521-536.

Wenjing Liao, "Music for multidimensional spectral estimation: stability and super-resolution," IEEE Transactions on Signal Processing 63(23) Nov. 2015, 12 pages.

Time-Frequency Analysis Using SAS©, Paper SAS585-2017, 5 pages, 2017.

Ludmila Scharf, "Computing the Hausdorff distance between sets of curves," Freie Universitat Berlin, Dec. 2003, 72 pages.

SAS© Forecast Server 14.3 Time Series Packages, SAS Institute Inc., 2017, 78 pages.

Van der Maaten et al, "Visualizing Data using t-SNE", Journal of Machine Learning Research 1, 48 pages, 2008.

SAS© Visual Data Mining and Machine Learning 8.4 Procedures, Chapters 1, 20, 24 and Syntax Index, SAS Institute, 2019.

SAS© Visual Forecasting 8.4 Forecasting Procedures, SAS Institute, 2019, 148 pages.

Abboud et al., "Mechanical Systems and Signal Processing," Mechanical Systems and Signal Processing 84 (2017) pp. 200-226.

Antoniadou et al., "A time-frequency analysis approach for condition monitoring of a wind turbine gearbox under varying load conditions," *Mechanical Systems and Signal Processing* 64 (2015): 188-216.

De Azevedo et al., A Review of Wind Turbine Bearing Condition Monitoring: State of the art and challenges, Renewable and Sustainable Energy Reviews 56 (2016) pp. 368-379.

Barksdale et al., "Condition Monitoring of Electrical Machines with Internet of Things," IEEE 2018, 4 pages.

Caesarendra et al., "A Review of Feature Extraction Methods in Vibration-Based Condition Monitoring and Its Application for Degradation Trend Estimation of Low-Speed Slew Bearing," Machines 2017, 5, 21; pp. 1-28.

Ganga et al., "IoT-Based Vibration Analytics of Electrical Machines," IEEE Internet of Things Journal, vol. 5, No. 6, Dec. 2018, pp. 4538-4549.

M V KiranKumar et al, "Review on Condition Monitoring of Bearings using vibration analysis techniques," 2018 IOP Conf. Ser.: Mater. Sci. Eng. 376, 2018, 7 pages.

Li et al., "An Enhanced Data Visualization Method for Diesel Engine Malfunction Classification Using Multi-Sensor Signals," Sensors 2015, 15, pp. 26675-26693.

Nandi et al., "Condition Monitoring and Fault Diagnosis of Electrical Motors—A Review," IEEE Transactions on Energy Conversion, vol. 28, No. 4, Dec. 2005, pp. 719-729.

Kriegel et al., LoOP: Local Outlier Probabilities, CIKM'09, Nov. 2-6, 2009, pp. 1649-1652.

Breunig et al., OPTICS-OF: Identifying Local Outliers, Proceedings of the $3^{rd}$ European Conference on Principles and Practice of Knowledge Discovery in Databases (PKDD'99), Sep. 1999, 9 pages.

Kriegel et al., Interpreting and Unifying Outlier Scores, $11^{th}$ SIAM International Conference on Data Mining (SDM), 2011, pp. 13-24.

Schubert et al., On Evaluation of Outlier Rankings and Outlier Scores, Proceedings of the 12th SIAM International Conference on Data Mining, SDM 2012, Apr. 2012, pp. 1047-1058.

Xu et al., Automatic Hyperparameter Tuning Method for Local Outlier Factor, with Applications to Anomaly Detection, Technical Paper, SAS Institute Inc., Mar. 2019, 17 pages.

Breunig et al., LOF: Identifying Density-Based Local Outliers, Proc. ADM SIGMOD 2000 Int. Conf. on Management of Data, 2000, pp. 1-12.

Shao et al., "Learning Features From Vibration Signals for Induction Motor Fault Diagnosis," Proceedings of ISFA2016, Aug. 2016, pp. 71-77.

Tax et al., "Support vector data description applied to machine vibration analysis," *Proc. 5th Annual Conference of the Advanced School for Computing and Imaging*. vol. 54. Citeseer 1999, 8 pages.

Mikhail Tsypkin, "Induction Motor Condition Monitoring: Vibration Analysis Technique—A Practical Implementation," IEEE International Electric Machines & Drives Conference, 2011, pp. 406-411.

Wald et al., "Fourier Transforms for Vibration Analysis: A Review and Case Study," IEEE IRI 2011, Aug. 211, pp. 366-371.

Zhang et al., "A New Deep Learning Model for Fault Diagnosis with Good Anti-Noise and Domain Adaptation Ability on Raw Vibration Signal," Sensors (Basel). Feb. 22, 2017;17(2), 21 pages.

Lee et al., "Integrating independent component analysis and local outlier factor for plant-wide process monitoring" Journal of Process Control 21, pp. 1011-1021, 2011.

\* cited by examiner

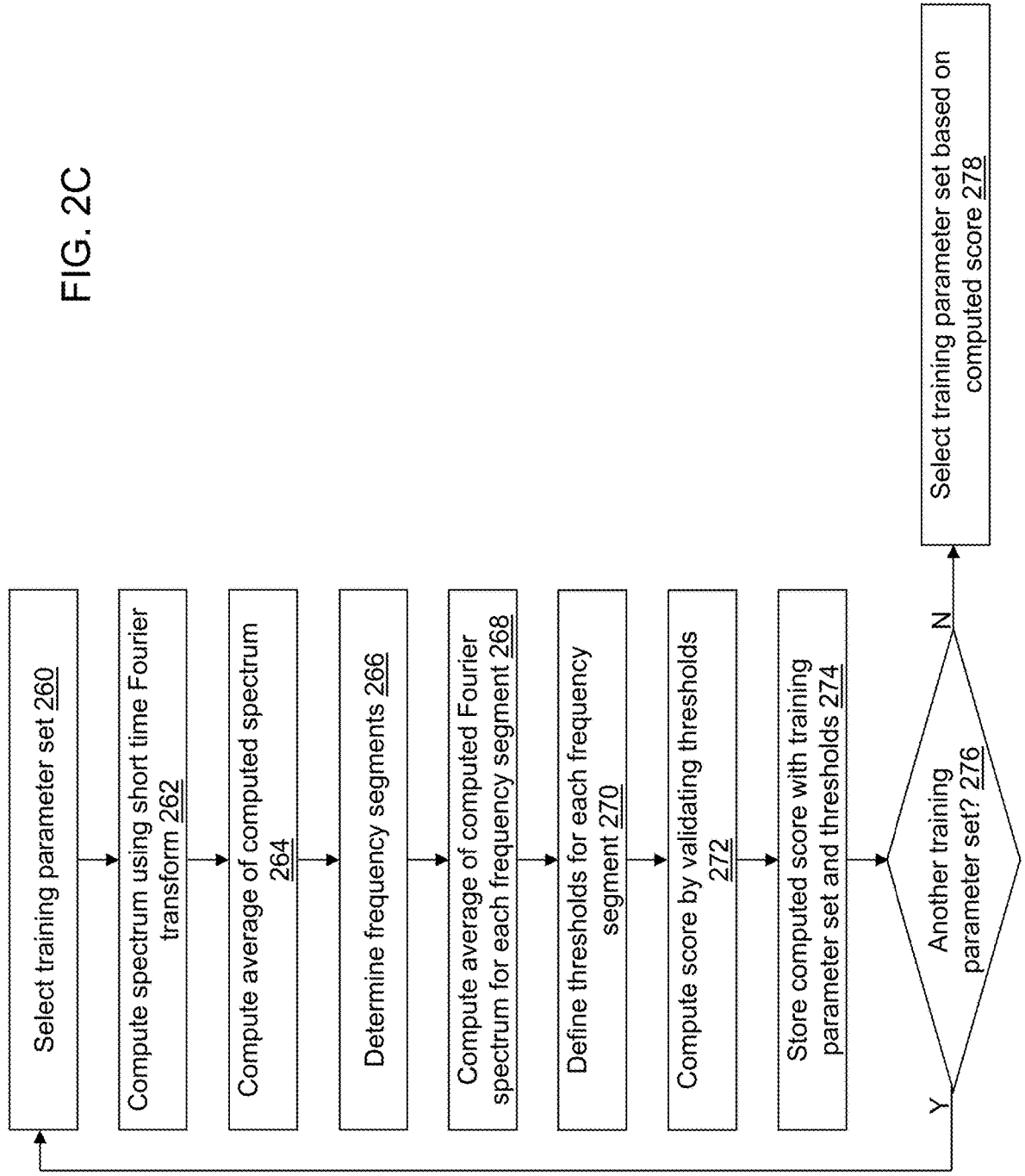

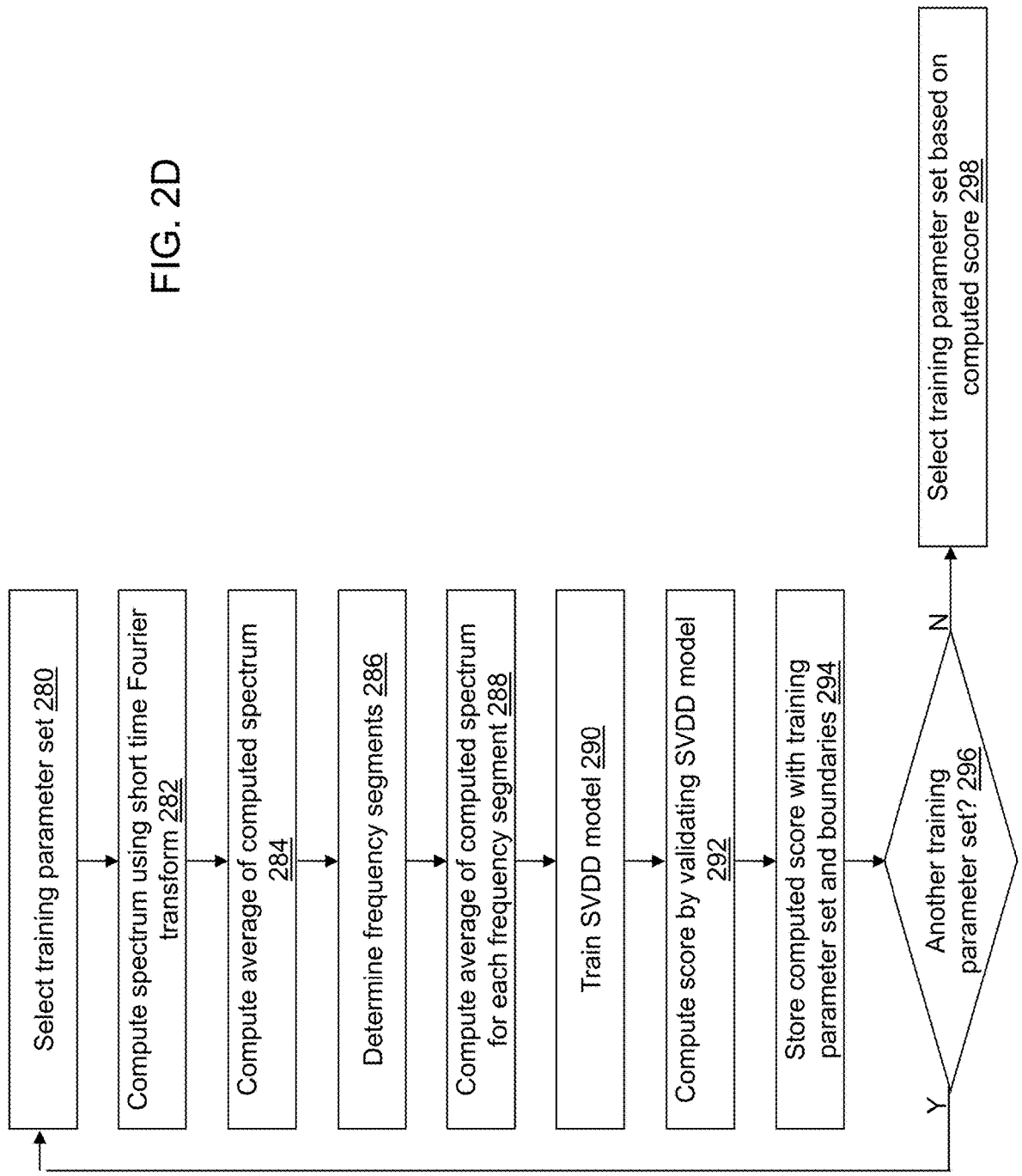

EVENT MONITORING SYSTEM

CROSS-REFERENCE TO RELATED APPLICATIONS

The present application claims the benefit of 35 U.S.C. § 119(e) to U.S. Provisional Patent Application No. 62/832,569 filed on Apr. 11, 2019, the entire contents of which are hereby incorporated by reference.

BACKGROUND

Condition-based maintenance (CBM) of critical high-valued machines is a typical Internet of Things (IoT) scenario. Key to CBM is monitoring important machine health parameters for fault, event, and/or state shift detection in industrial machines through monitoring of data sensors. For example, CBM supports maintenance based on a perceived condition of the machine rather than preventive maintenance at intervals where the likelihood of failures between repairs is very small or corrective maintenance by running the machine until it fails before repairing it. Successful monitoring reduces a cost of maintenance and improves both worker and machine efficiency. In machine learning, fault, event, and/or state shift detection can be viewed as an outlier detection problem.

SUMMARY

In an example embodiment, a non-transitory computer-readable medium is provided having stored thereon computer-readable instructions that, when executed by a computing device, cause the computing device to detect an event. (A) A frequency spectrum of a plurality of observation vectors is computed using a Fourier transform, wherein each observation vector of the plurality of observation vectors includes a sensor value measured by a sensor, wherein the plurality of observation vectors includes the sensor value measured as a function of time. (B) (A) is repeated a predefined plurality of times with successive windows of the plurality of observation vectors. Each window of the successive windows includes a subset of the plurality of observation vectors. The successive windows include successive subsets selected sequentially in time. (C) An average frequency spectrum is computed from the frequency spectrum computed the predefined plurality of times. (D) A predefined noise filter is applied to the computed average frequency spectrum to define a filtered frequency spectrum. (E) A distance value is computed between the defined filtered frequency spectrum and a predefined reference spectrum using a distance computation function. (F) When an event has occurred is determined based on a comparison between the computed distance value and a predefined distance threshold. (G) An event indicator is output to indicate the event has occurred when an event has occurred based on the comparison.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to detect an event.

In yet another example embodiment, a method of detecting an event is provided.

In yet another example embodiment, a non-transitory computer-readable medium is provided having stored thereon computer-readable instructions that, when executed by a computing device, cause the computing device to detect an event. (A) A frequency spectrum of a plurality of observation vectors is computed using a Fourier transform. Each observation vector of the plurality of observation vectors includes a sensor value measured by a sensor. The plurality of observation vectors includes the sensor value measured as a function of time. (B) (A) is repeated a predefined plurality of times with successive windows of the plurality of observation vectors. Each window of the successive windows includes a subset of the plurality of observation vectors. The successive windows include successive subsets selected sequentially in time. (C) An average frequency spectrum is computed from the frequency spectrum computed the predefined plurality of times. (D) A plurality of segmented average frequency spectra is computed from the computed average frequency spectrum. Each segmented average frequency spectrum of the plurality of segmented average frequency spectra is computed for a frequency band of a plurality of predefined frequency bands. (E) When an event has occurred is determined based on the computed plurality of segmented average frequency spectra and a predefined threshold value. (F) When an event has occurred based on the comparison, an event indicator is output to indicate the event has occurred.

A unique predefined threshold value may be defined for each frequency band of the plurality of predefined frequency bands. Each unique predefined threshold value may include a predefined upper threshold value and a predefined lower threshold value, and the event may be determined as having occurred when any of the computed plurality of segmented average frequency spectra is greater than or equal to the predefined upper threshold value of an associated frequency band. The event may be determined as having occurred when any of the computed plurality of segmented average frequency spectra is less than or equal to the predefined lower threshold value of an associated frequency band. Each unique predefined threshold may be selected based on a number of standard deviations computed from a predefined segmented mean frequency spectrum of an associated frequency band. The predefined segmented mean frequency spectrum of each of the plurality of predefined frequency bands may be computed by training with training observation vectors.

The predefined threshold value may be computed by training a support vector data description (SVDD) model with training observation vectors. The SVDD model may be trained by computing an optimal value of an objective function using a second plurality of segmented average frequency spectra, wherein the objective function associated with the optimal value defines a set of support vectors selected from the second plurality of segmented average frequency spectra to define a boundary around the second plurality of segmented average frequency spectra and a Lagrange constant associated with each support vector of the defined set of support vectors. The second plurality of segmented average frequency spectra may be computed by computing a training average frequency spectrum from frequency spectra computed using the Fourier transform of the training observation vectors the predefined plurality of times and computing the second plurality of segmented average frequency spectra from the training average frequency spectrum computed for each frequency band of the plurality of predefined frequency bands. Determining when the event has occurred may include computing a distance value using the defined set of support vectors and associated Lagrange constant and the computed plurality of segmented average frequency spectra. When the computed distance value is greater than the predefined threshold value, the event may have occurred. The predefined threshold value may be computed using $$R^2 = K(x_k, x_k) - 2\sum_{i=1}^{NSV} \alpha_i K(x_i, x_k) + \sum_{i=1}^{NSV}\sum_{j=1}^{NSV} \alpha_i \alpha_j K(x_i, x_j),$$

where $R^2$ the predefined threshold value, $K(x_i,x_j)$ is kernel function, $x_k$ is any support vector of the defined set of support vectors, $x_i$ and $x_j$ are the defined set of support vectors, $\alpha_i$ is the Lagrange constant associated with support vector $x_i$, $\alpha_1$ is the Lagrange constant associated with support vector $x_j$, and NSV is a number of support vectors included in the defined set of support vectors. The distance value may be computed using $$dist^2(z) = K(z, z) - 2\sum_{i=1}^{NSV} \alpha_i K(x_i, z) + \sum_{i=1}^{NSV}\sum_{j=1}^{NSV} \alpha_i \alpha_j K(x_i, x_j),$$

where z is the computed plurality of segmented average frequency spectra.

In yet another example embodiment, a non-transitory computer-readable medium is provided having stored thereon computer-readable instructions that, when executed by a computing device, cause the computing device to detect an event. (A) A frequency spectrum of a plurality of observation vectors is computed using a Fourier transform, wherein each observation vector of the plurality of observation vectors includes a sensor value measured by a sensor, wherein the plurality of observation vectors includes the sensor value measured as a function of time. (B) (A) is repeated a predefined plurality of times with successive windows of the plurality of observation vectors, wherein each window of the successive windows includes a subset of the plurality of observation vectors, wherein the successive windows include successive subsets selected sequentially in time. (C) An average frequency spectrum is computed from the frequency spectrum computed the predefined plurality of times. (D) A plurality of segmented average frequency spectra is computed from the computed average frequency spectrum, wherein each segmented average frequency spectrum of the plurality of segmented average frequency spectra is computed for a frequency band of a plurality of predefined frequency bands. (E) A distance value is computed using a trained support vector data description (SVDD) model with the computed plurality of segmented average frequency spectra. (F) When an event has occurred is determined based on a comparison between the computed distance value and a predefined threshold. (G) A two-dimensional vector or a three-dimensional vector compute from the computed plurality of segmented average frequency spectra using t-stochastic neighbor embedding. (H) When an event has occurred based on the comparison, an event indicator is presented to indicate the event has occurred on a graph using the computed two-dimensional vector or the computed three-dimensional vector.

A non-event indicator may be presented on the graph when the event has not occurred based on the comparison. The event indicator may be larger than the non-event indicator. The event indicator may be a different color than the non-event indicator. The event indicator may be a different symbol than the non-event indicator. The event indicator may further include a notification message that indicates the event has occurred. The event indicator may be presented by streaming the event indicator to a second computing device that subscribes to receive the event indicator from the computing device and that presents the graph on a display.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A-2D depict a flow diagram illustrating examples of operations performed by the training device of FIG. 1 in accordance with an illustrative embodiment.

DETAILED DESCRIPTION

Measurement and monitoring of one or more health parameters is a critical component of condition-based maintenance (CBM), the practice of performing maintenance based on the perceived health of a machine. It is now generally accepted that CBM, where possible, is economically superior to the practices of preventative maintenance—conducting maintenance in predetermined, fixed time intervals where the likelihood of failures between repairs is very small—and the practice of run-to-failure or corrective maintenance. CBM is particularly more economical in the case of high-valued machines that are typical in many Internet of Things (IoT) scenarios. Understanding the internal condition or health of a machine is not trivial, especially when the machine is constantly in operation as is often the case. The real-time analysis of monitoring data requires analytical tools that can handle a large volume of data and turn this data into actionable insights at second to sub-second rates.

The various technical aspects described herein can be useful for variety of industrial machinery, which involve rotating component assemblies. Some examples of rotating component assemblies can be, but are not limited to the following:

1. A Shaft and Bearing assembly, where the Bearing type can be but is not limited to Ball bearing, Journal Bearing and its variates.
2. Meshing Gears assemblies such as but not limited to rack and pinion, spur gears.

The above assemblies are generally part of multiple industrial systems such as, but not limited to:

Compressors

Metal cutting machinery such as Lathe machines, Drilling Machines, Milling Machines etc.

Machinery used in Oil and natural gas exploration.

Bearing assemblies in Windmill turbines

Container cranes used at Loading docks.

Figure 1:
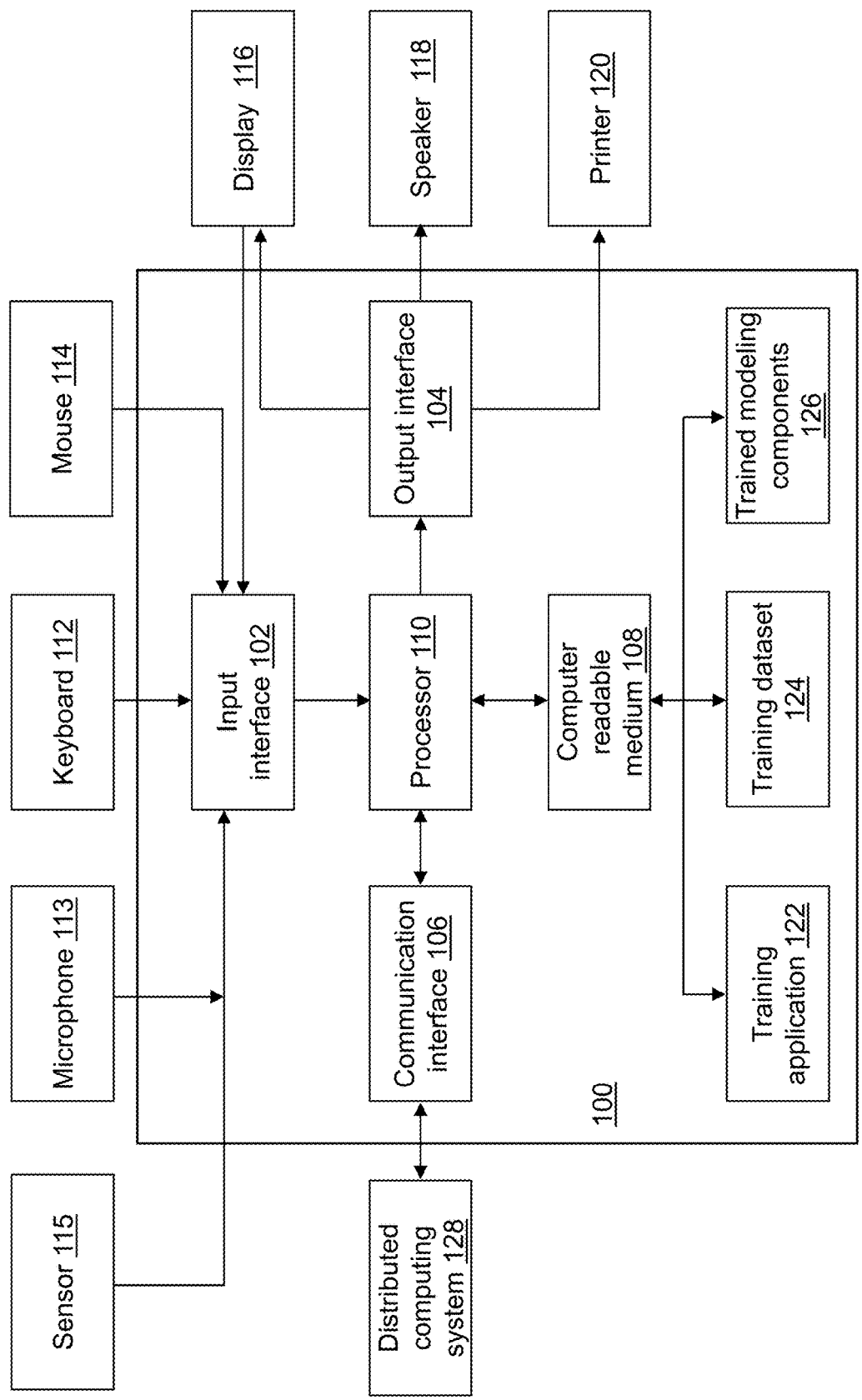
FIG. 1 depicts a block diagram of a training device in accordance with an illustrative embodiment.

Referring to FIG. 1, a block diagram of a training device 100 is shown in accordance with an illustrative embodiment. Training device 100 may include an input interface 102, an output interface 104, a communication interface 106, a non-transitory computer-readable medium 108, a processor 110, a training application 122, a training dataset 124, and trained modeling components 126. Fewer, different, and/or additional components may be incorporated into training device 100.

Input interface 102 provides an interface for receiving information from the user or another device for entry into training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into training device 100 or to make selections presented in a user interface displayed on display 116.

Input interface 102 may also interface with various input technologies such as a sensor 115. For example, sensor 115 may produce a sensor signal value referred to as a measurement data value representative of a measure of a physical quantity in an environment to which sensor 115 is associated and generate a corresponding measurement datum that may be associated with a time that the measurement datum is generated. The environment to which sensor 115 is associated for monitoring may include a power grid system, a telecommunications system, a fluid (oil, gas, water, etc.) pipeline, a transportation system, an industrial device, a medical device, an appliance, a vehicle, a computing device, etc. Example sensor types of sensor 115 include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system.

The same interface may support both input interface 102 and output interface 104. For example, display 116 comprising a touch screen provides a mechanism for user input and for presentation of output to the user. Training device 100 may have one or more input interfaces that use the same or a different input interface technology. The input interface technology further may be accessible by training device 100 through communication interface 106.

Output interface 104 provides an interface for outputting information for review by a user of training device 100 and/or for use by another application or device. For example, output interface 104 may interface with various output technologies including, but not limited to, display 116, a speaker 118, a printer 120, etc. Training device 100 may have one or more output interfaces that use the same or a different output interface technology. The output interface technology further may be accessible by training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Training device 100 may have one or more communication interfaces that use the same or a different communication interface technology. For example, training device 100 may support communication using an Ethernet port, a Bluetooth antenna, a telephone jack, a USB port, etc. Data and messages may be transferred between training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Training device 100 also may have one or more drives that support the loading of a memory media such as a CD, DVD, an external hard drive, etc. One or more external hard drives further may be connected to training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with computing trained modeling components 126 from observation vectors stored in training dataset 124. Trained modeling components 126 can be used to determine when an event has occurred that may indicate a fault, a state shift, an incident, a situation, etc. based on an observation vector in input dataset 324 (shown referring to FIG. 3) or a streamed observation vector. The event may be stored in an output dataset 326 (shown referring to FIG. 3) or streamed to an event subscribing device 1100 (shown referring to FIG. 11) to support various data analysis functions as well as provide alert/messaging related to monitored data. Output dataset 326 may include anomalies as part of process control, for example, of a manufacturing process, for machine condition monitoring, for example, of an electro-cardiogram device, for image classification, for intrusion detection, for fraud detection, etc. Training application 122 can be used to identify anomalies that occur based on the data as or shortly after the data is generated. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. For example, training application 122 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing, all of which are developed and provided by SAS Institute Inc. of Cary, N.C., USA. Data mining is applicable in a wide variety of industries. For illustration, training application 122 may be executed by a procedure implemented as part of SAS® Viya™.

Training application 122 may be integrated with other system processing tools to automatically process data generated as part of operation of an enterprise, device, system, facility, etc., to identify any outliers or events in new data, to monitor changes in the data, and/or to provide a warning or alert associated with the monitored data using input interface 102, output interface 104, and/or communication interface 106 so that appropriate action can be initiated in response to changes in the monitored data. For example, if a machine is being monitored and begins to overheat, a warning or alert message may be sent to a user's smartphone or tablet through communication interface 106 so that the machine can be shut down before damage to the machine occurs.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Training dataset 124 may be transposed. The plurality of variables may define multiple dimensions for each observation vector. An observation vector $x_i$ may include a value for each of the plurality of variables associated with the observation i. All or a subset of the columns may be used as variables that define observation vector $x_i$. Each variable of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as SAS® Event Stream Processing. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 124 may be stored on computer-readable medium 108 or on one or more computer-readable media of distributed computing system 128 and accessed by training device 100 using communication interface 106, input interface 102, and/or output interface 104. Data stored in training dataset 124 may be continually received for processing by training application 122. Data stored in training dataset 124 may be sensor measurements or signal values captured by sensor 115, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observations per second for one or more physical objects. For example, data stored in training dataset 124 may be generated as part of the IoT, where things (e.g., machines, devices, phones, sensors) can be connected to networks and the data from these things collected and processed within the things and/or external to the things before being stored in training dataset 124. For example, the IoT can include sensors, such as sensor 115, in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Some data may be processed with an event stream processing engine (ESPE), which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on training device 100 or on distributed computing system 128. Training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. Some systems may use SAS In-Memory Statistics for Hadoop® to read big data once and analyze it several times by persisting it in-memory for the entire session. Some systems may be of other types and configurations.

Referring to FIGS. 2A to 2D, example operations associated with training application 122 are described. Additional, fewer, or different operations may be performed depending on the embodiment of training application 122. The order of presentation of the operations of FIGS. 2A to 2D is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute training application 122, which causes presentation of a first user interface window, which may include a plurality of menus and selectors such as drop-down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Figure 2A:
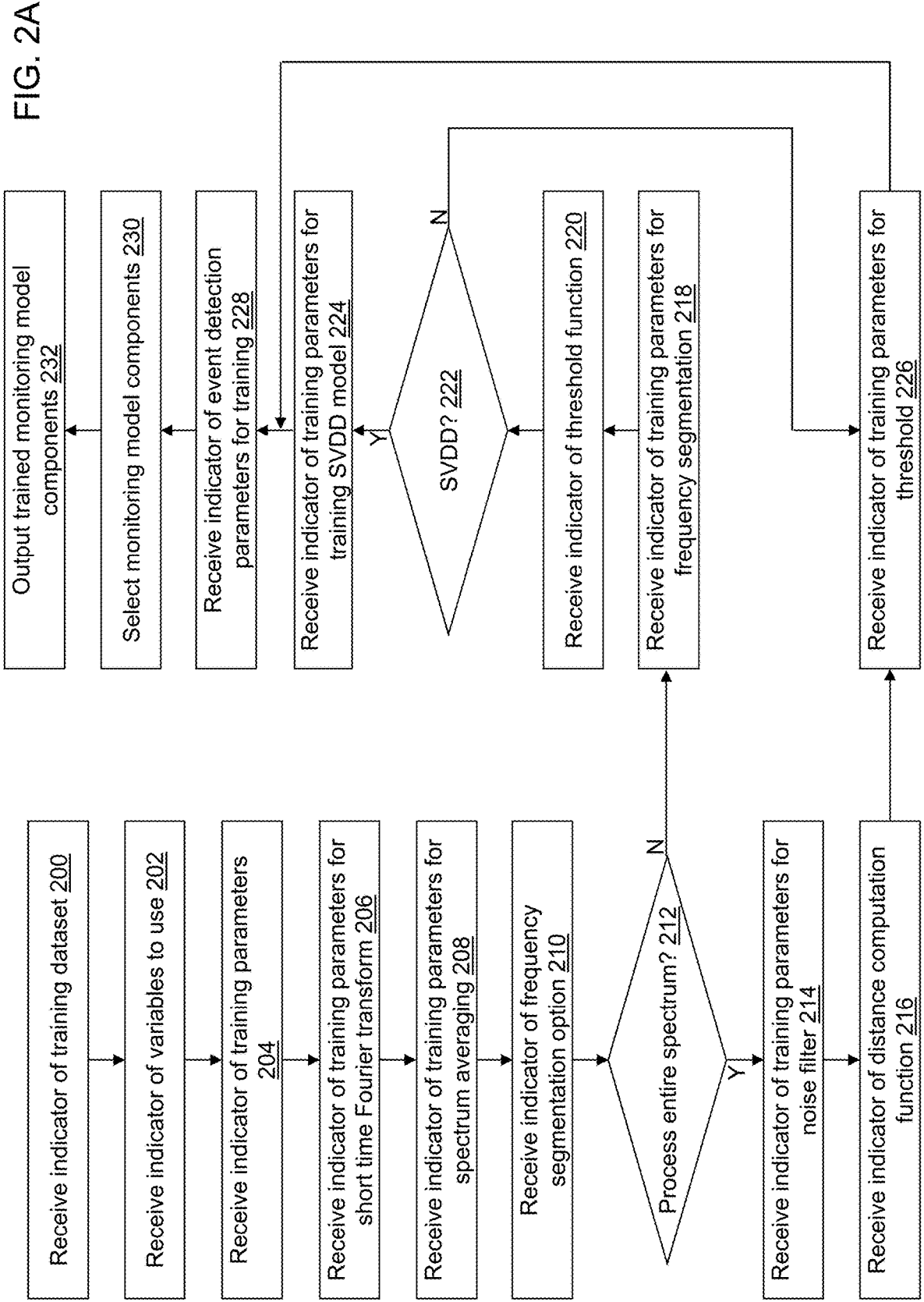

Referring to FIG. 2A, in an operation 200, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically or training dataset 124 may refer to streaming data as discussed further below.

In an operation 202, a second indicator may be received that indicates a plurality of variables of training dataset 124 to define $x_i$. The second indicator may indicate that all or only a subset of the variables stored in training dataset 124 be used to define trained modeling components 126. For example, the second indicator indicates a list of variables to use by name, column number, etc. In an alternative embodiment, the second indicator may not be received. For example, all of the variables may be used automatically.

In an operation 204, a third indicator is received that indicates a value for each of one or more training parameters to define how trained modeling components 126 are determined. In an alternative embodiment, the third indicator may not be received and default values for the one or more training parameters are used. In another alternative embodiment, the value for each of the one or more training parameters may not be selectable. Instead, a fixed, predefined value for each of the one or more training parameters may be used. Illustrative training parameters may include a cross validation parameter, a maximum number of training parameter sets to evaluate, a maximum number of iterations, a maximum computing time, an objective function, a training search method, etc. The objective function specifies a measure of model error (performance) to be used to identify a best configuration of the one or more training parameters among those evaluated.

When cross-validation is performed to determine how well the generated model performed, a number of folds F may be defined using the third indicator and the training may be performed F−1 times with the performance measure averaged across the F−1 scoring executions with a validation dataset holdout extracted from training dataset 124. When cross-validation is performed, training dataset 124 may be partitioned into F subsets (folds). For each fold, trained modeling components 126 are determined on each of the F−1 folds and validated using the selected (holdout) fold. The objective function value is averaged over each set of training and scoring executions to obtain a single error estimate value. The training and validation datasets may be stored in a single computing device or a plurality of distributed computing devices of distributed computing system 128.

One or more training search methods may be selected using the third indicator, for example, from "Grid", "Random", "Latin Hypercube Sampling (LHS)", "Genetic Algorithm (GA)", "Genetic Set Search (GSS)", "Bayesian", "DIRECT", "Nelder-Mead Simplex", "DIRECT/Nelder-Mead Hybrid", "Random+GA", "Random+GA/GSS", "Random+Bayesian", "LHS+GA", "LHS+GA/GSS", "LHS+Bayesian", etc. In the illustrative selections, "+" indicates a successive execution. Simultaneous execution may be indicated by a comma delimited list of training search method selections such as "LHS, GA1, Bayesian".

In an operation 206, a fourth indicator is received that indicates a value for one or more training parameters to evaluate for training a short time Fourier transform (STFT) based on the one or more training parameters indicated in operation 204. In an alternative embodiment, the fourth indicator may not be received. For example, a default value for the one or more training parameters to evaluate for training the STFT may be stored, for example, in computer-readable medium 108 and used automatically. In another alternative embodiment, the value for the one or more training parameters to evaluate for training the STFT may not be selectable. Instead, a fixed, predefined value for the one or more training parameters to evaluate for training the STFT may be used. For example, the fourth indicator may indicate one or more values for an STFT window size and/or for a fast Fourier transform (FFT) length to evaluate based on the one or more training parameters indicated in operation 204. The one or more values for the STFT window size and for the FFT length may be defined using an upper bound value, a lower bound value, and an incremental value, using a list of values to evaluate, etc. Values for the STFT window size and the FFT length may be included in a training parameter set defined for a training iteration.

In an operation 208, a fifth indicator is received that indicates a value for one or more training parameters to evaluate for training a frequency spectrum averaging process based on the one or more training parameters indicated in operation 204. In an alternative embodiment, the fifth indicator may not be received. For example, a default value for the one or more training parameters to evaluate for training the frequency spectrum averaging process may be stored, for example, in computer-readable medium 108 and used automatically. In another alternative embodiment, the value for the one or more training parameters to evaluate for training the frequency spectrum averaging process may not be selectable. Instead, a fixed, predefined value for the one or more training parameters to evaluate for training the frequency spectrum averaging process may be used. For example, the fifth indicator may indicate one or more values for a number of spectrums to average based on the one or more training parameters indicated in operation 204. The one or more values for the number of spectrums to average may be defined using an upper bound value, a lower bound value, and an incremental value, using a list of values to evaluate, etc. A value for the number of spectrums to average may be included in a training parameter set defined for a training iteration.

In an operation 210, a sixth indicator is received that indicates a value for a frequency segmentation option. The sixth indicator may be received by training application 122 after selection from a user interface window or after entry by a user into a user interface window. As an example, a frequency segmentation option may be selected from "Entire Spectrum" and "Segmentation". The frequency segmentation option may be labeled or selected in a variety of different manners by the user as understood by a person of skill in the art. For example, a check box may switch between frequency segmentation or the entire spectrum. In an alternative embodiment, the frequency segmentation option may not be selectable, and a single frequency segmentation option is implemented by training application 122. For example, either the entire spectrum or frequency segmentation may be performed automatically by training application 122.

In an operation 212, a determination is made concerning based on the frequency segmentation option. When the frequency segmentation option indicates the entire spectrum, processing continues in an operation 214. When the frequency segmentation option indicates frequency segmentation, processing continues in an operation 218. Of course, if a single frequency segmentation option is implemented by training application 122, no determination is needed, and processing continues based on the option implemented.

In operation 214, a seventh indicator is received that indicates a value for one or more training parameters to evaluate for training a lowpass noise filter based on the one or more training parameters indicated in operation 204. In an alternative embodiment, the seventh indicator may not be received. For example, a default value for the one or more training parameters to evaluate for training the lowpass noise filter may be stored, for example, in computer-readable medium 108 and used automatically. In another alternative embodiment, the value for the one or more training parameters to evaluate for training the lowpass noise filter may not be selectable. Instead, a fixed, predefined value for the one or more training parameters to evaluate for training the lowpass noise filter may be used. For example, the seventh indicator may indicate one or more values for a filter type and/or a filter window size based on the one or more training parameters indicated in operation 204. As an example, a filter type may be selected from "Median", "Butterworth", "Chebyshev I", "Chebyshev II", etc. Of course, the filter type may be labeled or selected in a variety of different manners by the user as understood by a person of skill in the art. In an alternative embodiment, the filter type may not be selectable, and a single filter type is implemented by training application 122. The one or more values for the filter window size may be defined using an upper bound value, a lower bound value, and an incremental value, using a list of values to evaluate, etc. Values for the filter window size and the filter type may be included in a training parameter set defined for a training iteration. For example, a user may want to compare performance using different filter types. For illustration, when a "Butterworth" type lowpass noise filter is selected, an upper frequency value may be selected as training parameters to define a frequency band of frequencies to keep.

In an operation 216, an eighth indicator is received that indicates one or more distance computation functions to evaluate based on the one or more training parameters indicated in operation 204, and processing continues in an operation 226. As an example, the one or more distance computation functions may be selected from "Hausdorff", "Mean Absolute", etc. Of course, the one or more distance computation functions may be labeled or selected in a variety of different manners by the user as understood by a person of skill in the art. In an alternative embodiment, the distance computation functions to evaluate may not be selectable, and a single distance computation function is implemented by training application 122. A value for the distance computation functions may be included in a training parameter set defined for a training iteration. For example, a user may want to compare performance using the Hausdorff distance computation function with the Mean Absolute distance computation function. For illustration, the Hausdorff distance is computed using $$D_H = \max\left\{\sup_{x \in S_{in}} \inf_{y \in S_{ref}} d(x, y), \sup_{y \in S_{ref}} \inf_{x \in S_{in}} d(x, y)\right\},$$

where $S_{in}$ is an input spectrum, and $S_{ref}$ is a reference spectrum. The Hausdorff distance is the largest of all the distances from a point on one spectrum to the closest point on the other spectrum. For illustration, the Mean Absolute distance is computed using $D_{MA} = \text{Mean}(|S_{in} - S_{ref}|)$.

In operation 218, a ninth indicator is received that indicates a value for one or more training parameters to evaluate for training a frequency segmentation process based on the one or more training parameters indicated in operation 204. In an alternative embodiment, the ninth indicator may not be received. For example, a default value for the one or more training parameters to evaluate for training the frequency segmentation process may be stored, for example, in computer-readable medium 108 and used automatically. In another alternative embodiment, the value for the one or more training parameters to evaluate for training the frequency segmentation process may not be selectable. Instead, a fixed, predefined value for the one or more training parameters to evaluate for training the frequency segmentation process may be used. For example, the ninth indicator may indicate one or more values for a number of segments to evaluate based on the one or more training parameters indicated in operation 204. The one or more values for the number of segments to evaluate may be defined using a minimum number of segments, a maximum number of segments, and an incremental value, using a list of values to evaluate, etc. A value for the number of segments to evaluate may be included in a training parameter set defined for a training iteration.

In an operation 220, a tenth indicator is received that indicates a threshold function to evaluate based on the one or more training parameters indicated in operation 204. As an example, the threshold function may be selected from "Standard Deviations", "SVDD", etc. Of course, the threshold function may be labeled or selected in a variety of different manners by the user as understood by a person of skill in the art. For illustration, the threshold function defines a methodology by which a threshold is computed for determining that an event has occurred. A value for the threshold function may be included in a training parameter set defined for a training iteration.

In an operation 222, a determination is made concerning whether the SVDD threshold function is indicated in operation 220. When the SVDD threshold function is indicated, processing continues in an operation 224. When the SVDD threshold function is not indicated, processing continues in operation 226. Of course, if a single threshold function is implemented by training application 122, no determination is needed, and processing continues based on the threshold function implemented.

In operation 224, an eleventh indicator is received that indicates one or more training parameters for training an SVDD model using training dataset 124, and processing continues in an operation 228. For illustration, the SVDD model may be trained based on methods described in one or more of U.S. Patent Publication Nos. 2019/0042891, 2019/0095400, and 2019/0042977 and one or more of U.S. Pat. Nos. 9,639,809, 9,830,558, 9,536,208, 9,536,208, and 9,990,592, all of which are assigned to the assignee of the present application, and all of which are hereby incorporated by reference. An event may be indicated as having occurred if the SVDD threshold is exceeded based on the trained SVDD model as discussed further below.

In operation 226, a twelfth indicator is received that indicates one or more training parameters for defining the threshold(s) based on a number of standard deviations using training dataset 124, and processing continues in operation 228. For example, the one or more training parameters for defining the threshold(s) based on the number of standard deviations may indicate a number of standard deviations above and/or below a threshold to indicate that an event has occurred. An illustrative value may be 3 standard deviations though other values may be used. An event may be indicated as having occurred if the threshold defined by the number of standard deviations above or below is exceeded. A value for the number of standard deviations may be included in a training parameter set defined for a training iteration. The number of standard deviations may be used to define an upper threshold value and/or a lower threshold value.

In operation 228, a thirteenth indicator is received that indicates a value for one or more training parameters to evaluate for selecting event detection parameters based on the one or more training parameters indicated in operation 204. In an alternative embodiment, the thirteenth indicator may not be received. For example, a default value for the one or more training parameters to evaluate for selecting the event detection parameters may be stored, for example, in computer-readable medium 108 and used automatically. In another alternative embodiment, the value for the one or more training parameters to evaluate for selecting the event detection parameters may not be selectable. Instead, a fixed, predefined value for the one or more training parameters to evaluate for selecting the event detection parameters may be used. For example, the thirteenth indicator may indicate one or more values for a number of consecutive times, a number of times, and/or a time window length based on the one or more training parameters indicated in operation 204. The one or more values for the number of consecutive times, the number of times, and/or the time window length may be defined using an upper bound value, a lower bound value, and an incremental value, using a list of values to evaluate, etc. For example, an event may be indicated as having occurred if the selected threshold is exceeded the number of consecutive times. For example, an event may be indicated as having occurred if the selected threshold is exceeded the number of times within the time window length. A value for the number of consecutive times or for the number of times and the time window length may be included in a training parameter set defined for a training iteration.

In an operation 230, the monitoring model components are selected based on the indicated selections as described in FIGS. 2B to 2D. For example, FIG. 2B describes a training process when the frequency segmentation option indicates that the entire spectrum is selected for training; FIG. 2C describes a training process when the frequency segmentation option indicates that frequency segmentation is used and the threshold function indicates that standard deviation boundaries are used for training; and FIG. 2D describes a training process when the frequency segmentation option indicates that frequency segmentation is used and the threshold function indicates that the SVDD model is used for training. In an alternative embodiment, more than one frequency segmentation option and/or more than one threshold function may be evaluated such that one or more of the operations of FIGS. 2B to 2D are performed to select the trained monitoring model components.

Referring to FIG. 2B, in an operation 236, a training parameter set is selected from a plurality of training parameter sets that may be defined based on the training parameters indicated in operations 206, 208, 210, 214, 216, 226, and 228. The search method and other training parameters indicated in operation 204 may be used to define the plurality of training parameter sets and to select the training parameter set. For illustration, an autotune function may be defined in a manner similar to that described in U.S. Pat. No. 10,360,517 and/or U.S. patent application Ser. No. 16/411,590, filed May 14, 2019, and titled SYSTEM FOR AUTOMATIC, SIMULTANEOUS FEATURE SELECTION AND HYPERPARAMETER TRAINING FOR A MACHINE LEARNING MODEL, both of which are assigned to the assignee of the present application, and both of which are hereby incorporated by reference.

Some signals are better understood in the frequency, rather than time, domain. Vibration signals from rotating equipment are an example of signals that may be better understood in the frequency domain because rhythmicity or cycles arise from components or parts that rotate. The time waveform can be decomposed into the frequencies that it consists of to obtain its frequency spectrum. A (discrete)

Fourier spectrum describes the magnitude of the various frequencies comprising the signal.

Figure 13:
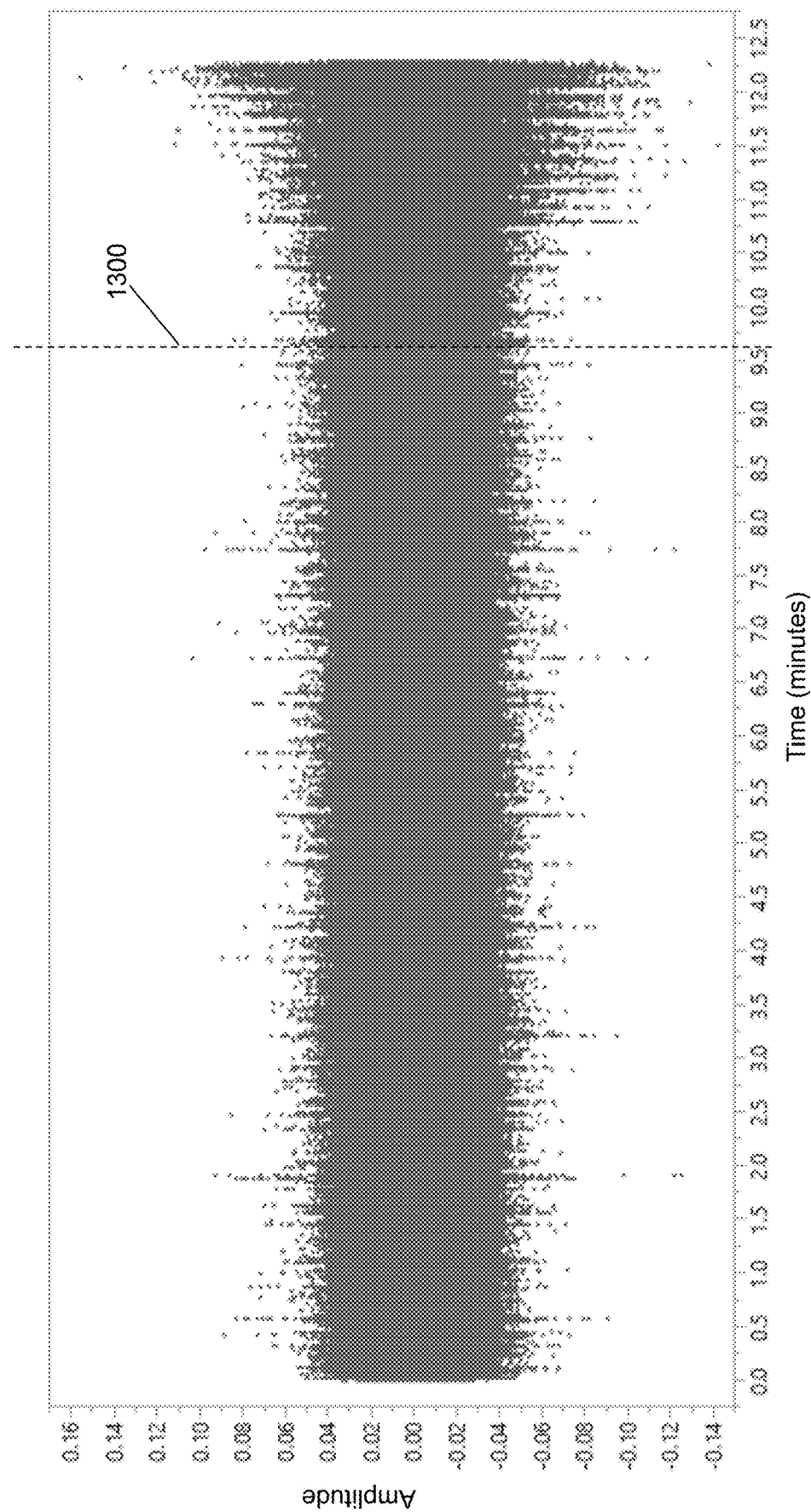
FIG. 13 shows sensor measurements in accordance with an illustrative embodiment.
Figure 14A:
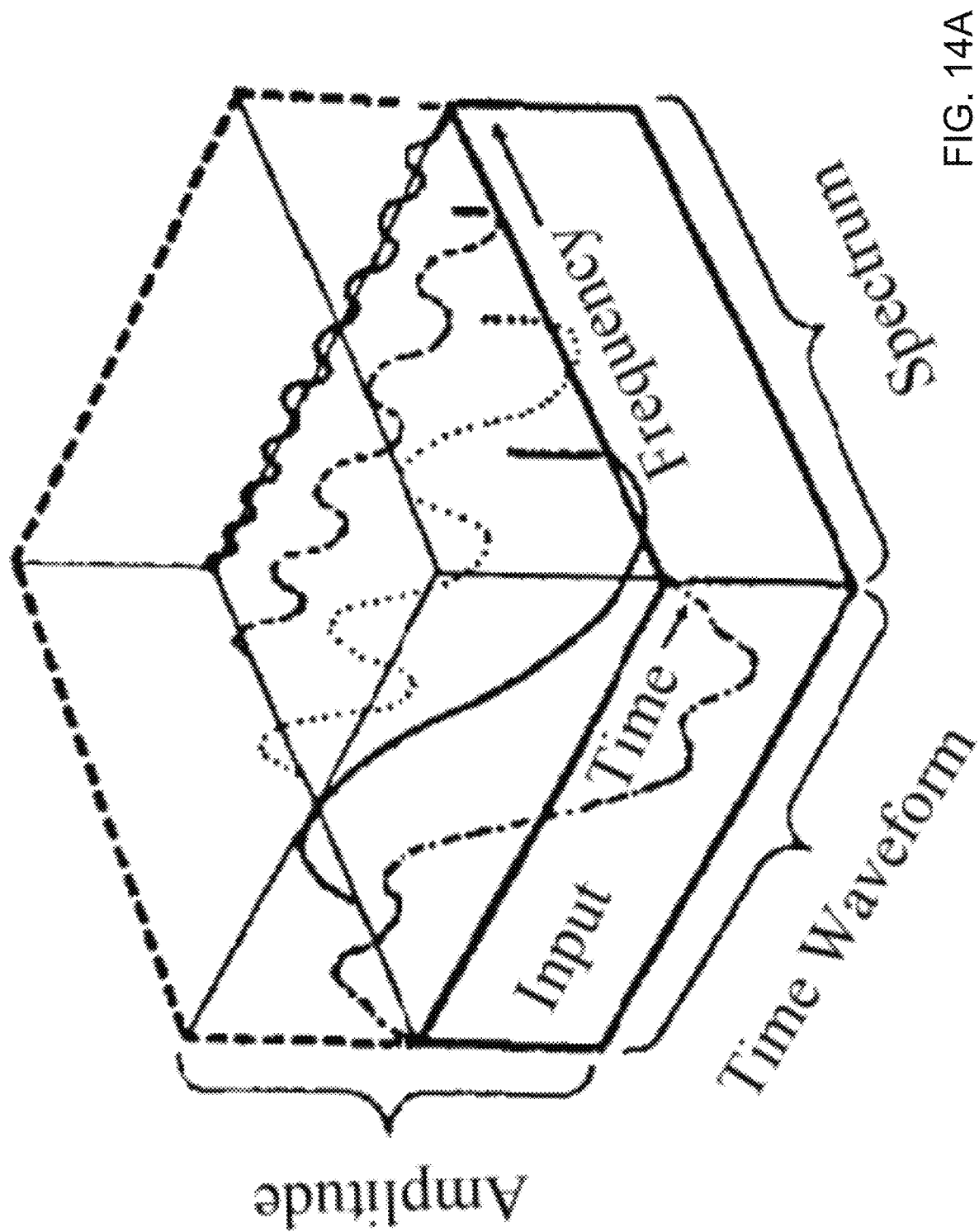
FIG. 14A shows a time domain and a frequency domain relationship in accordance with an illustrative embodiment.

In an operation 238, a frequency spectrum is computed for the variable values included in training dataset 124 of the variables indicated in operation 202 using a STFT with the STFT window size and/or FFT length included in the selected training parameter set. For example, the frequency spectrum can be computed using the STFT method available in the Time Frequency Analysis (TFA) package of the TIMEDATA procedure in the SAS® Visual Forecasting product on SAS® Viya®. For illustration, referring to FIG. 13, sensor measurements as a function of time are shown in accordance with an illustrative embodiment. An amplitude of the displacement due to vibration was used for the variable values included in training dataset 124. An induced shaft misalignment occurred at intervention time 1300. For illustration, referring to FIG. 14A, a relationship between the time domain and the frequency domain is shown in accordance with an illustrative embodiment.

The sensor measurements were generated using a variable speed, three-phase induction squirrel cage motor equipped with three accelerometer vibration sensors such that the motor could operate at 25, 35, or 50 revolutions per minute (rpm). While running each experiment, data was collected from the vibration sensors at 12.8 kilohertz (kHz) (that is, 12,800 data reads per second). Approximately 10 minutes of data was collected with the machine running under its current, presumed non-fault "normal" state. After approximately 10 minutes, the state of the motor was changed from this normal condition by adjusting a knob that changed the alignment of the main motor shaft slightly from its "balanced" state to become unbalanced. The machine then ran in this new state with an artificially induced misalignment. Unless otherwise stated, the motor was operating at 25 rpm.

Figure 14B:
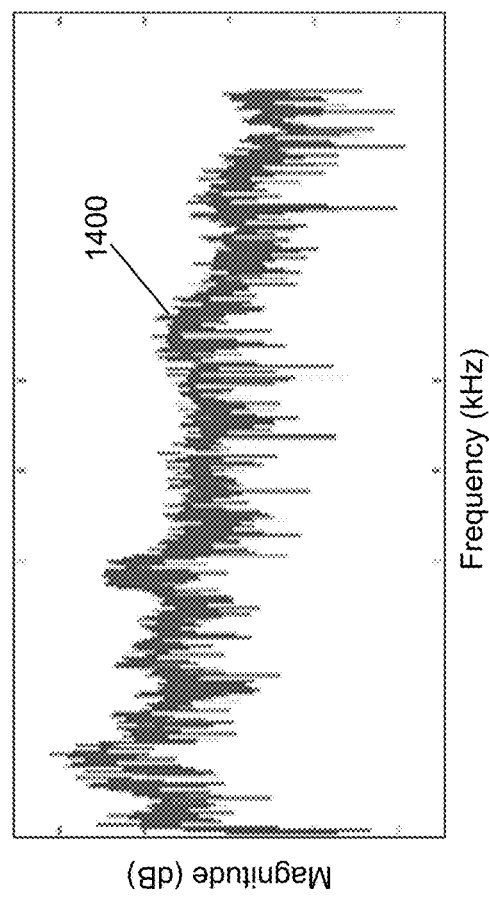
FIG. 14B shows a frequency spectrum of the sensor measurements of FIG. 13 in accordance with an illustrative embodiment.

The frequencies that one expects to see in the data depend on the characteristics of the machine being monitored. Motor characteristics like the speed of rotation, the diameter of the rotating components such as the shaft, and the size and number of ball bearings all affect what frequencies may be seen in the data. For example, to monitor the state of the inner-race that the ball bearings of the squirrel cage motor ride on, frequencies around 53 Hz should be monitored assuming that the motor is running at 25 rpm. This frequency is derived based on the fact that the machine has seven ball-bearings that are 12 millimeters (mm) in diameter, with a pitch diameter of 32 mm, and a contact angle of 15 degrees. Similarly, you can use the motor design and specifications to derive which frequencies need to be monitored to verify that other components are working properly. Once the frequencies of interest are identified, they can be monitored using a digital filter. Instead of, or in addition to, monitoring a frequency band, the entire Fourier spectrum can be monitored to look for any changes in the spectrum by observing the motor operating in a normal or fault-free state, computing a "normal" or reference Fourier spectrum, and computing the spectrum for incoming data and looking for differences between the incoming spectrum and the reference spectrum. For further illustration, referring to FIG. 14B, a frequency spectrum 1400 of the displacement due to vibration is shown in accordance with an illustrative embodiment as a function of frequency.

Figure 14C:
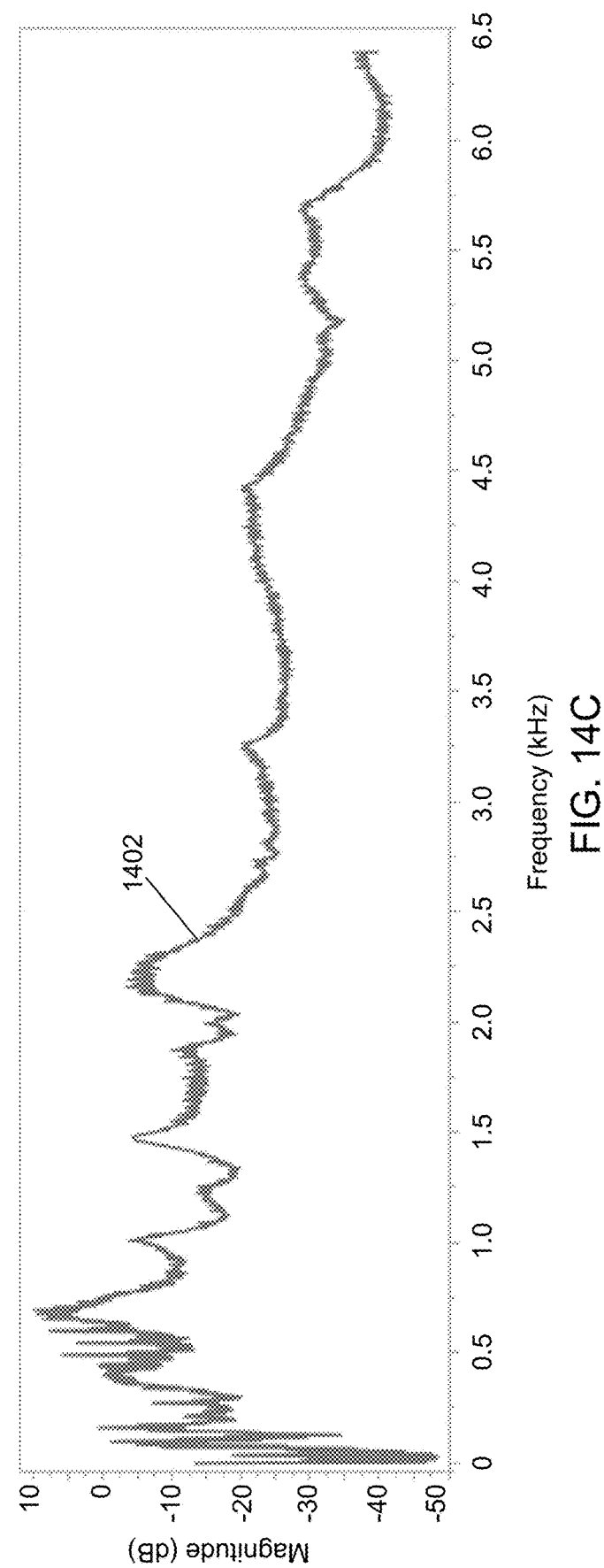
FIG. 14C shows an average of a plurality of frequency spectra of FIG. 14B in accordance with an illustrative embodiment.

In an operation 240, an average of the frequency spectrum computed for a plurality of STFT sliding windows is computed based on the number of spectrums to average included in the selected training parameter set. For illustration, referring to FIG. 14C, an averaged frequency spectrum 1402 is shown in accordance with an illustrative embodiment computed for a one-minute duration. 4096 samples were used with an overlap ratio of 50% making each sliding window length in seconds=4096*0.5/12800=0.16 seconds resulting in 375 STFT sliding windows averaged for the one-minute duration.

Figure 15:
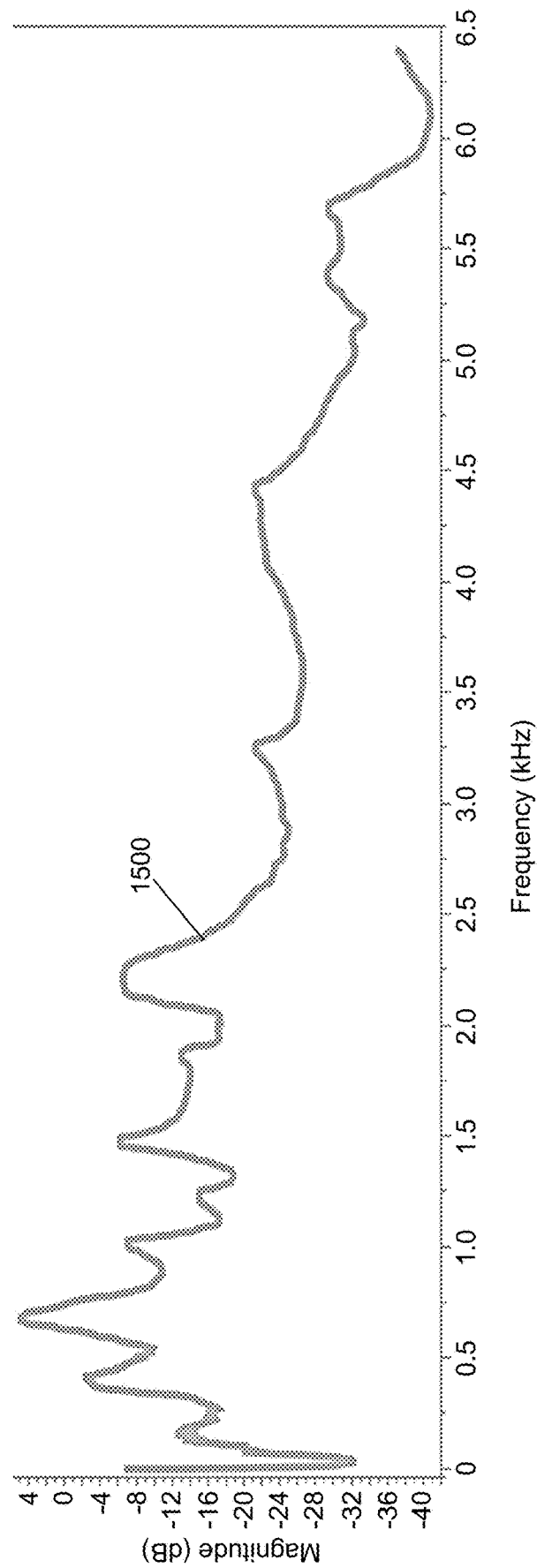
FIG. 15 shows reference frequency spectrum computed from the averaged frequency spectrum of FIG. 14C in accordance with an illustrative embodiment.

In an operation 242, the lowpass noise filter is applied to the average of the computed frequency spectrum based on the filter type and/or the filter window size included in the selected training parameter set to define a reference spectrum $S_{ref}$. For illustration, referring to FIG. 15, a reference spectrum $S_{ref}$ 1500 computed using a median filter type is shown in accordance with an illustrative embodiment computed using the one-minute duration averaged frequency spectrum. The lowpass noise filter smooths the reference spectrum $S_{ref}$ relative to the computed average frequency spectrum.

In an operation 243, an upper threshold value is defined by computing a standard deviation relative to the averaged frequency spectrum. The upper threshold value is defined based on the number of standard deviations above the mean value included in the selected training parameter set.

In an operation 244, a score is computed for the defined reference spectrum $S_{ref}$ using the objective function defined in operation 204 based on the event detection parameters included in the selected training parameter set and using a distance computed between an input spectrum $S_{in}$ and the defined reference spectrum $S_{ref}$ with the defined upper threshold value to detect occurrence of an event. The input spectrum $S_{in}$ was computed by extracting a validation dataset from training dataset 124 based on the training parameters indicated in operation 204, computing the average of the frequency spectrum for the plurality of STFT sliding windows on the validation dataset, and applying the lowpass noise filter to the average of the computed frequency spectrum of the validation dataset based on the filter type and/or the filter window size. A distance between the input spectrum $S_{in}$ and the defined reference spectrum $S_{ref}$ was computed using the distance computation function included in the selected training parameter set.

Figure 16:
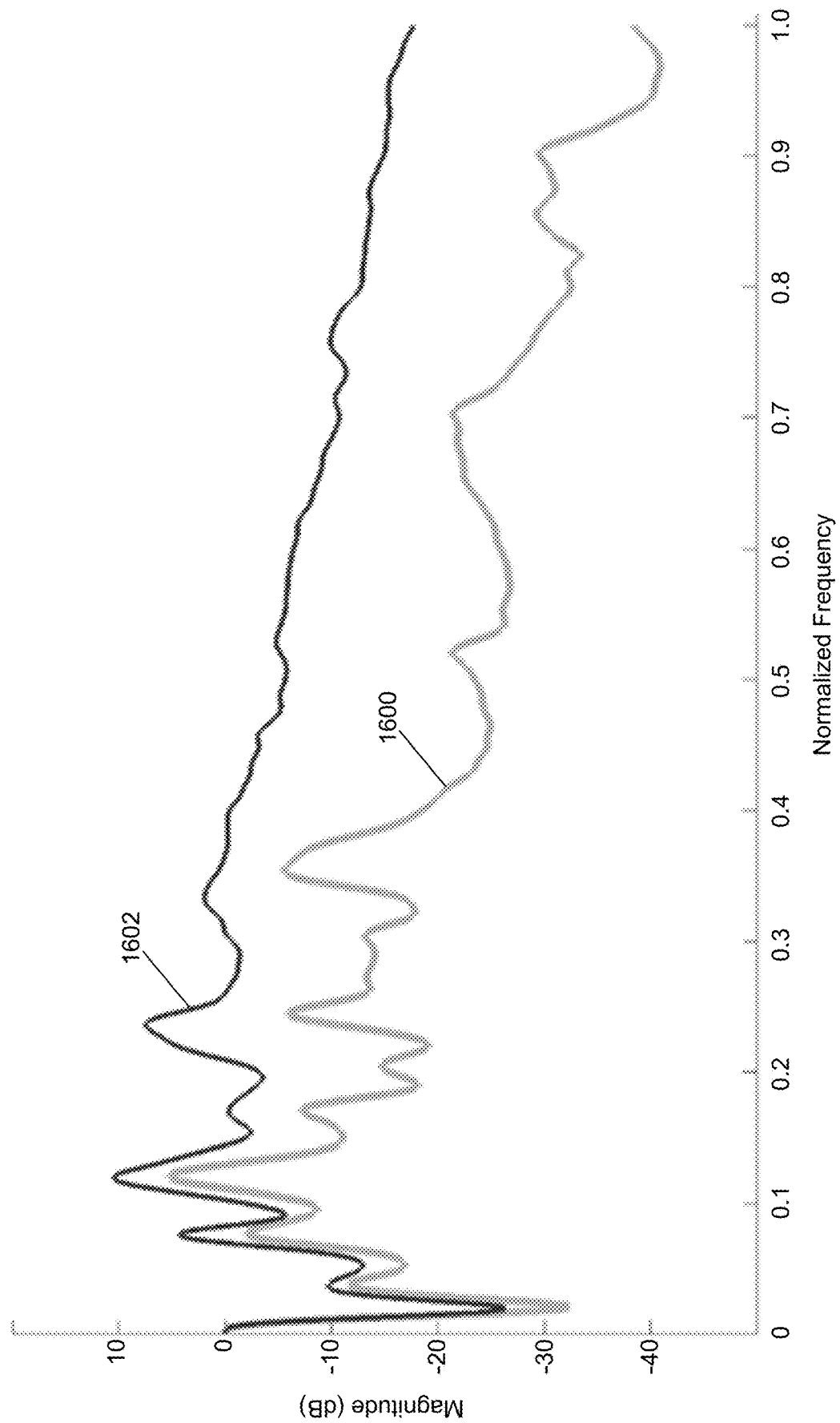
FIG. 16 shows the reference frequency spectrum of FIG. 15 compared with that of an input sensor signal in accordance with an illustrative embodiment.

For illustration, referring to FIG. 16, a reference spectrum $S_{ref}$ 1600 graphed using a normalized frequency is shown in comparison to input spectrum $S_{in}$ 1602 computed using the one-minute duration averaged frequency spectrum in accordance with an illustrative embodiment. The frequencies may be normalized by the sampling rate of the signal $f_s$. The normalized frequency range is [0, 1], with 1 corresponding to half of the sampling rate $f_s/2$ that is known as the Nyquist frequency.

Figure 17:
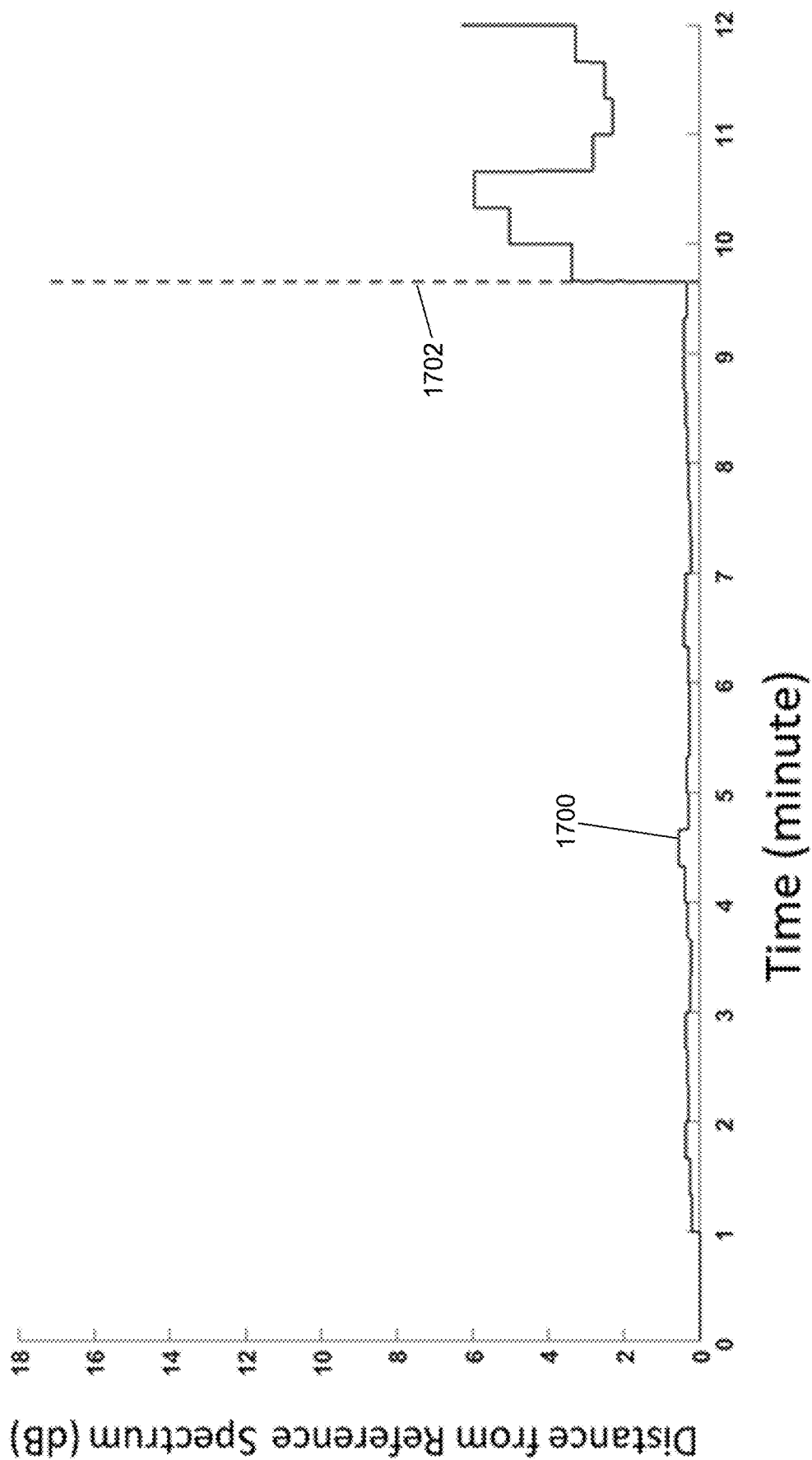
FIG. 17 shows a mean absolute distance computed from the reference spectrum of FIG. 15 as a function of time prior to and after the injected event in accordance with an illustrative embodiment.
Figure 18:
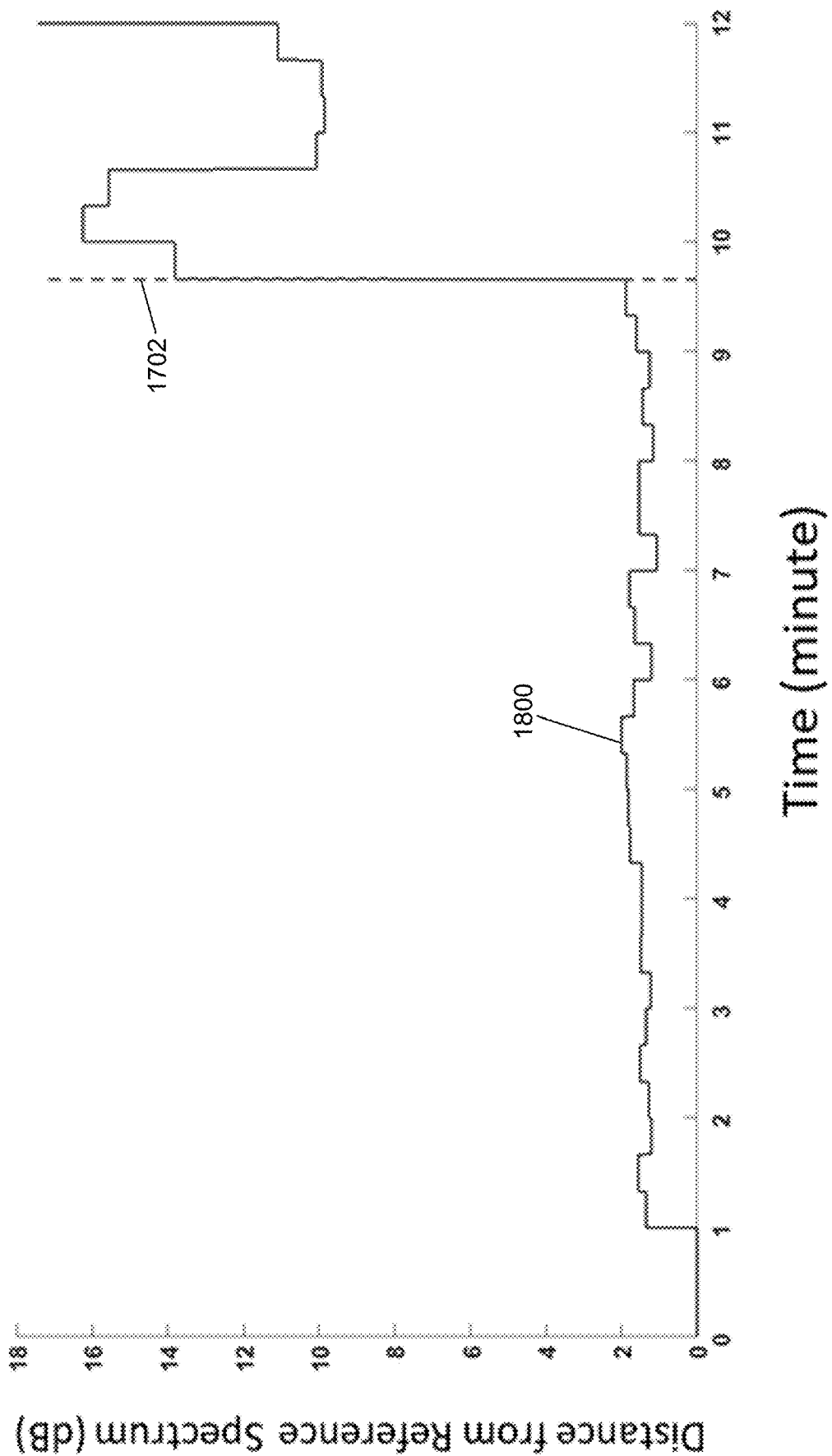
FIG. 18 shows a Hausdorff distance computed from the reference spectrum of FIG. 15 as a function of time prior to and after the injected event in accordance with an illustrative embodiment.
Figure 19:
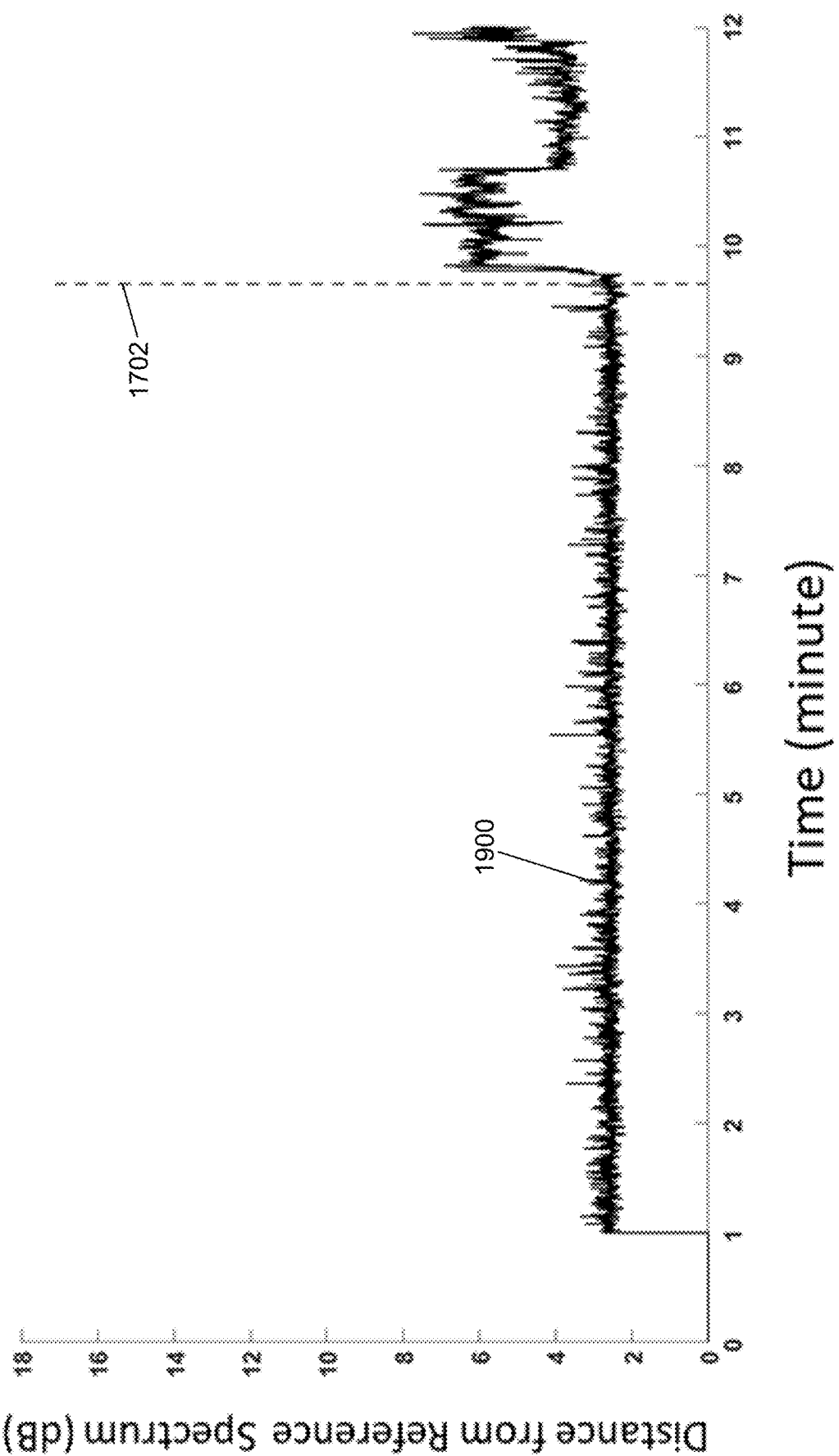
FIG. 19 shows a mean absolute distance computed using an existing method as a function of time prior to and after the injected event in accordance with an illustrative embodiment.

Referring to FIG. 17, a first distance curve 1700 computed between the input spectrum $S_{in}$ and the defined reference spectrum $S_{ref}$ as a function of time using the mean absolute distance computation function is shown in accordance with an illustrative embodiment. The induced shaft misalignment occurred at intervention time 1702. Referring to FIG. 18, a second distance curve 1800 computed between the input spectrum $S_{in}$ and the defined reference spectrum $S_{ref}$ as a function of time using the Hausdorff distance computation function is shown in accordance with an illustrative embodiment. For comparison purposes, referring to FIG. 19, a third distance curve 1900 computed as a function of time using a traditional method is shown in accordance with an illustrative embodiment. In the traditional method, a mask of the Fourier spectrum was computed under normal conditions and used as reference spectrum. Masks of Fourier spectrums when the machine was running were generated for each short time period, and compared with the reference spectrum using the mean absolute distance computation function.

Figure 20:
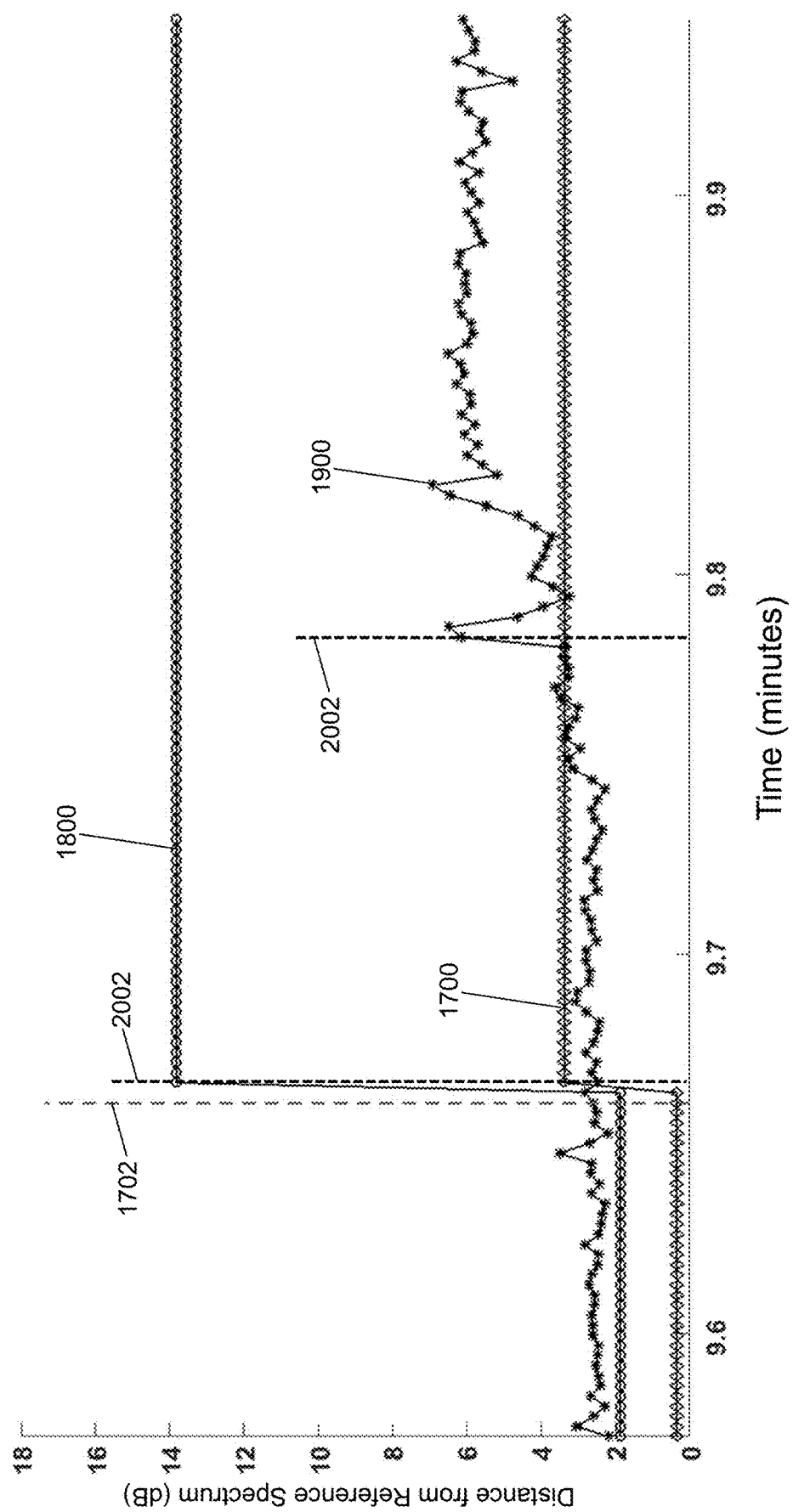
FIG. 20 shows a comparison between the distances computed using the methods of FIGS. 17, 18, and 19 as a function of time just prior to and just after the injected event in accordance with an illustrative embodiment.

Referring to FIG. 20, first distance curve 1700, second distance curve 1800, and third distance curve 1900 are shown zoomed to just before and just after intervention time 1702. In an illustrative embodiment, an event was indicated 0.5 seconds after intervention time 1702 at first alert time 2000 based on first distance curve 1700 and second distance curve 1800; whereas, an event was indicated 7.5 seconds after intervention time 1702 at second alert time 2002 based on third distance curve 1900.

In an operation 246, the computed score is stored in association with the training parameter set, the defined reference spectrum $S_{ref}$, and the defined upper threshold value.

In an operation 248, a determination is made concerning whether there is another training parameter set to evaluate from the plurality of training parameter sets. When there is another training parameter set to evaluate, processing continues in operation 236 to select and evaluate another training parameter set. When there is not another training parameter set to evaluate, processing continues in an operation 250.

In an operation 250, the training parameter set associated with an extremum value of the computed score and the associated reference spectrum $S_{ref}$, and upper threshold value are selected as the monitoring model components. For example, the distance computation function, the STFT window size, the FFT length, the number of spectrums to average, the filter type, the filter window size, the number of consecutive times, the number of times, and/or the time window length may be included to define the trained monitoring model components. For illustration, if the computed score is associated with an accuracy, the extremum value of the computed score may be a maximum value. For further illustration, if the computed score is associated with an error, the extremum value of the computed score may be a minimum value.

Referring to FIG. 2C, similar to operation 236, in an operation 260, a training parameter set is selected from a plurality of training parameter sets that may be defined based on the training parameters indicated in operations 206, 208, 210, 218, 220, 226, and 228. When a change in the entire spectrum is identified, for example, by monitoring the entire spectrum, a machine operator may want to investigate to determine which frequencies or frequency bands are a likely source of the shift in the entire spectrum by monitoring the frequency spectrum segment-by-segment.

Similar to operation 238, in an operation 262, a frequency spectrum is computed for the variable values included in training dataset 124 of the variables indicated in operation 202 using a STFT with the STFT window size and/or FFT length included in the selected training parameter set.

Similar to operation 240, in an operation 264, an average of the computed frequency spectrum is computed based on the number of spectrums to average included in the selected training parameter set. The average of the computed frequency spectrum may be computed based on a power, the magnitude, a cumulative power over frequency, or a cumulative magnitude over frequency. In an illustrative embodiment, cumulative magnitude over frequency may be selected for the average computation.

In an operation 266, a plurality of frequency segments are determined based on the number of segments to evaluate included in the selected training parameter set. As another option, the plurality of frequency segments may be defined by the user based on their knowledge of the device being monitored. For illustration, the SEGMENTATION function included in the Time Series Analysis (TSA) package in the TSMODEL procedure of SAS® Visual Forecasting 8.4 Forecasting Procedures developed and provided by SAS Institute Inc. of Cary, N.C., USA may be used to determine the plurality of frequency segments. The TSMODEL procedure may be similar to that described with respect to U.S. Pat. No. 10,331,490, filed on Nov. 16, 2018, and/or U.S. patent application Ser. No. 16/419,680, filed on May 22, 2019, and titled SCALABLE CLOUD-BASED TIME SERIES ANALYSIS, both of which are assigned to the assignee of the present application, and both of which are hereby incorporated by reference. Each frequency segment may be defined by an upper frequency value and a lower frequency value. When the plurality of frequency segments are contiguous, a minimum frequency value and an upper frequency value for each successive segment may be stored to define the plurality of frequency segments.

Figure 21:
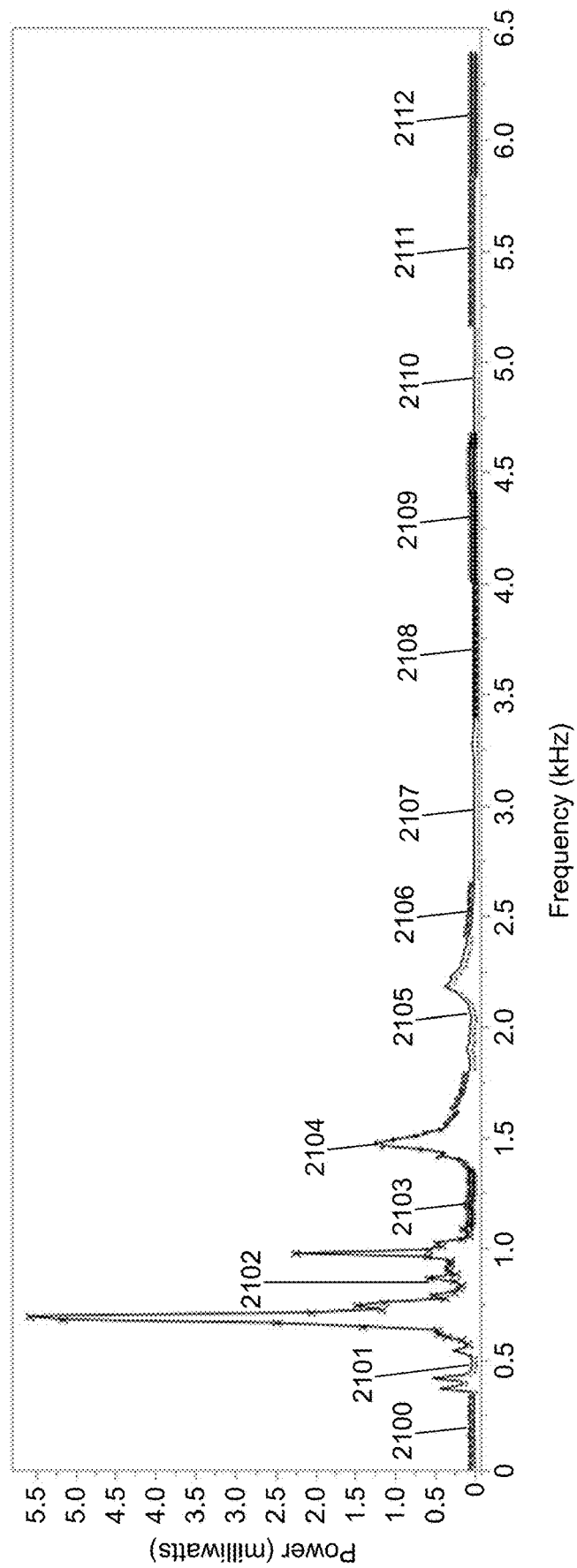
FIG. 21 shows a power of the frequency spectrum of the sensor measurements of FIG. 13 split into frequency segments in accordance with an illustrative embodiment.

For illustration, referring to FIG. 21, a power as a function of frequency for a plurality of averaged frequency segments is shown in accordance with an illustrative embodiment. The plurality of frequency segments included 13 frequency segments with respective power curves 2100, 2101, 2102, 2103, 2104, 2105, 2106, 2107, 2108, 2109, 2110, 2111, and 2112. In an alternative embodiment, a magnitude may be used instead of the power. The upper and lower frequency values for each of the thirteen frequency segments are shown in Table I below.

TABLE I

| Segment Index | Lower Bound (kHz) | Upper Bound (kHz) |
|---|---|---|
| 0 | 0.00 | 0.34 |
| 1 | 0.35 | 0.57 |
| 2 | 0.57 | 1.09 |
| 3 | 1.09 | 1.37 |
| 4 | 1.37 | 1.80 |
| 5 | 1.80 | 2.42 |
| 6 | 2.42 | 2.66 |
| 7 | 2.66 | 3.40 |
| 8 | 3.40 | 4.03 |
| 9 | 4.03 | 4.68 |
| 10 | 4.68 | 5.17 |
| 11 | 5.17 | 5.85 |
| 12 | 5.85 | 6.4 |

Figure 22:
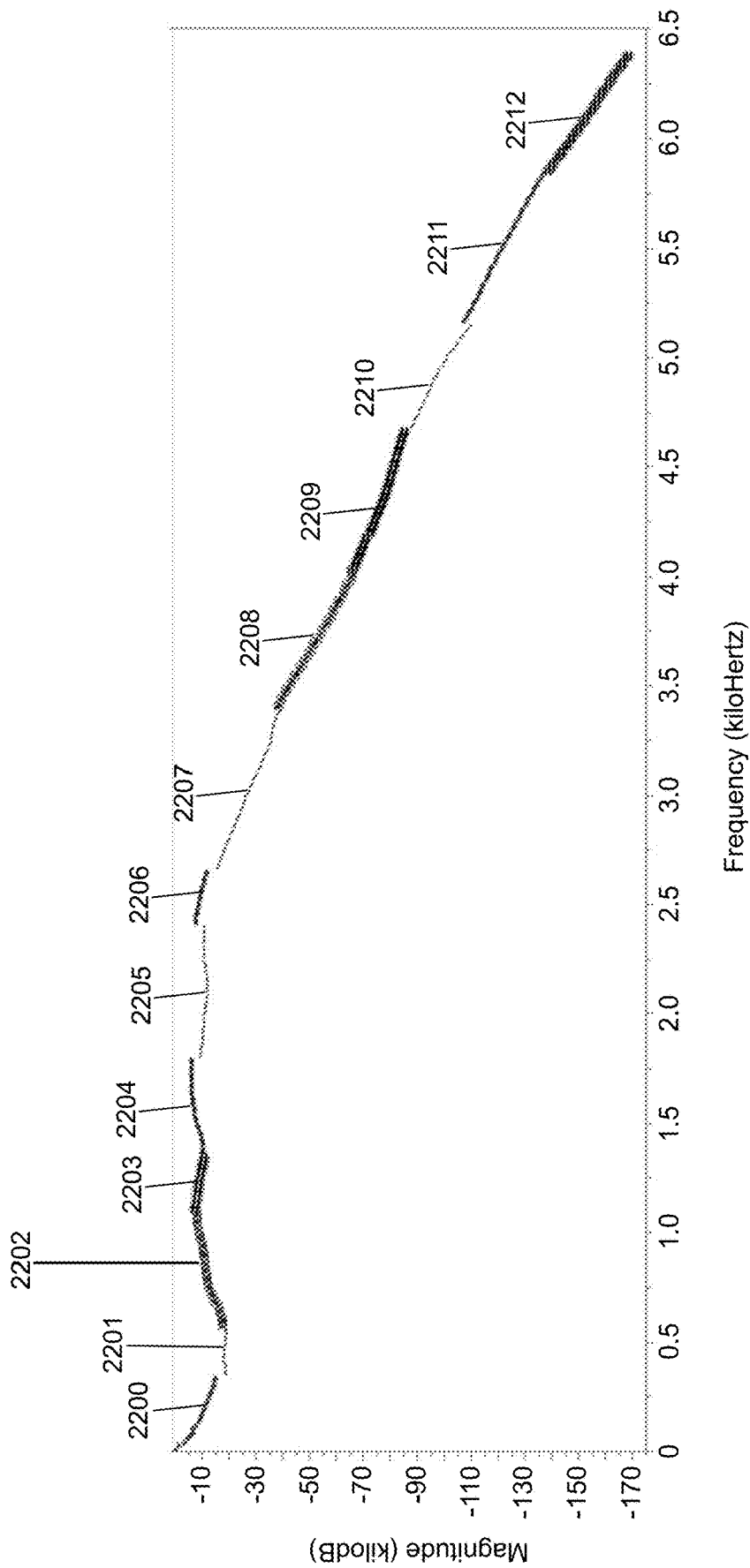
FIG. 22 shows a magnitude of the frequency spectrum of the sensor measurements of FIG. 13 split into frequency segments in accordance with an illustrative embodiment.

For illustration, referring to FIG. 22, a magnitude as a function of frequency for the plurality of averaged frequency segments is shown in accordance with an illustrative embodiment. The plurality of frequency segments included 13 frequency segments with respective magnitude curves 2200, 2201, 2202, 2203, 2204, 2205, 2206, 2207, 2208, 2209, 2210, 2211, and 2212.

In an operation 268, an average of the computed frequency spectrum is computed within each determined frequency segment of the plurality of frequency segments.

In an operation 270, an upper threshold value and a lower threshold value are defined for each frequency segment of the plurality of frequency segments by computing a standard deviation within each determined frequency segment relative to a mean value computed within each determined frequency segment. The upper threshold value and the lower threshold value are defined based on the number of standard deviations above and/or below the mean value included in the selected training parameter set.

Figure 23:
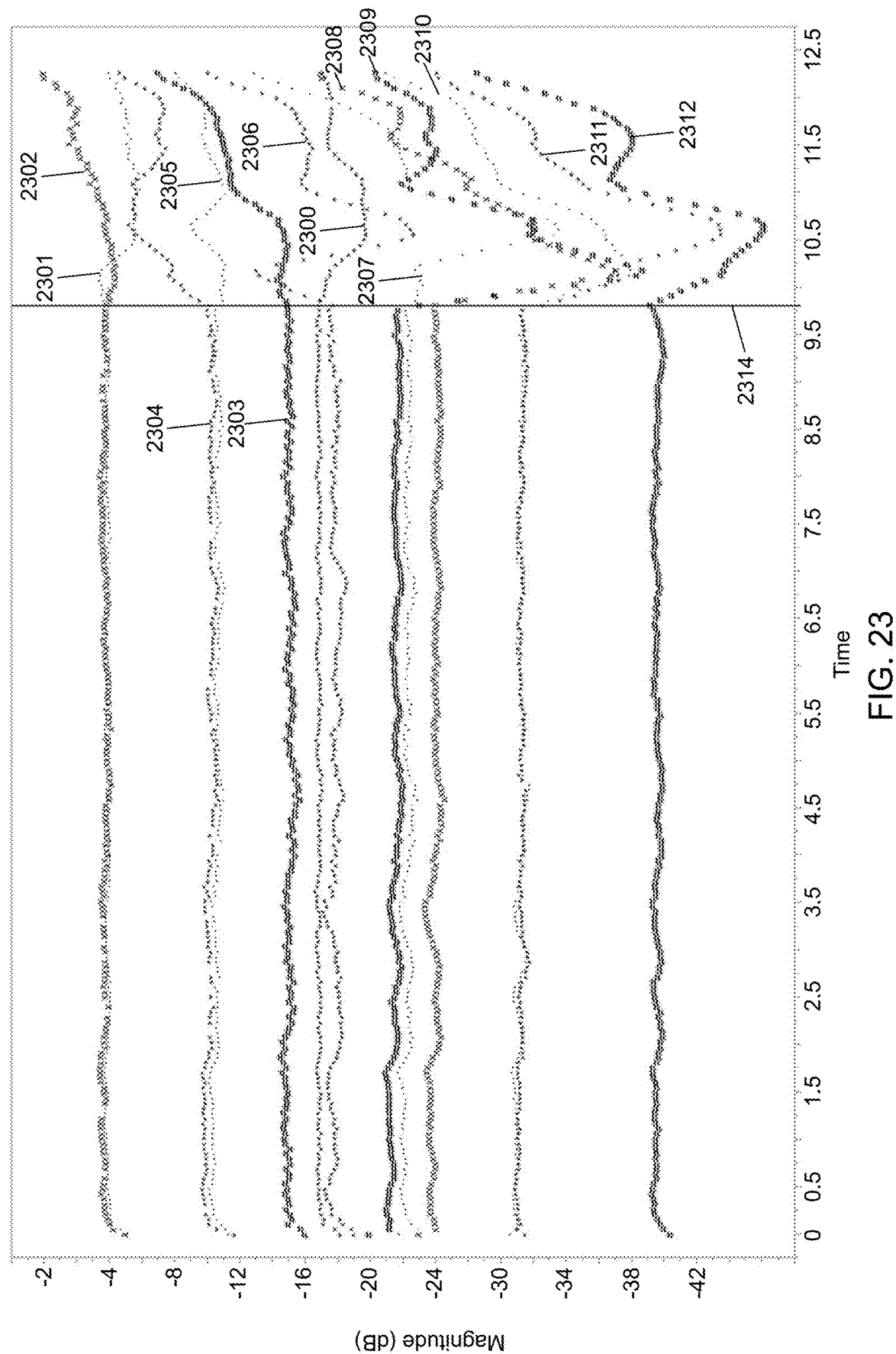
FIG. 23 shows a magnitude of each frequency segment as a function of time prior to and after an injected event in accordance with an illustrative embodiment.

In an operation 272, a score is computed for the defined upper threshold value and the defined lower threshold value for each frequency segment using the objective function defined in operation 204 based on the event detection parameters included in the selected training parameter set and using a validation dataset extracted from training dataset 124 based on the training parameters indicated in operation 204. For illustration, referring to FIG. 23, a magnitude as a function of time for each of the 13 plurality of frequency segments is shown in accordance with an illustrative embodiment. The plurality of frequency segments includes 13 frequency segments with respective magnitude curves 2300, 2301, 2302, 2303, 2304, 2305, 2306, 2307, 2308, 2309, 2310, 2311, and 2312. The induced shaft misalignment occurred at intervention time 2314.

Figure 24:
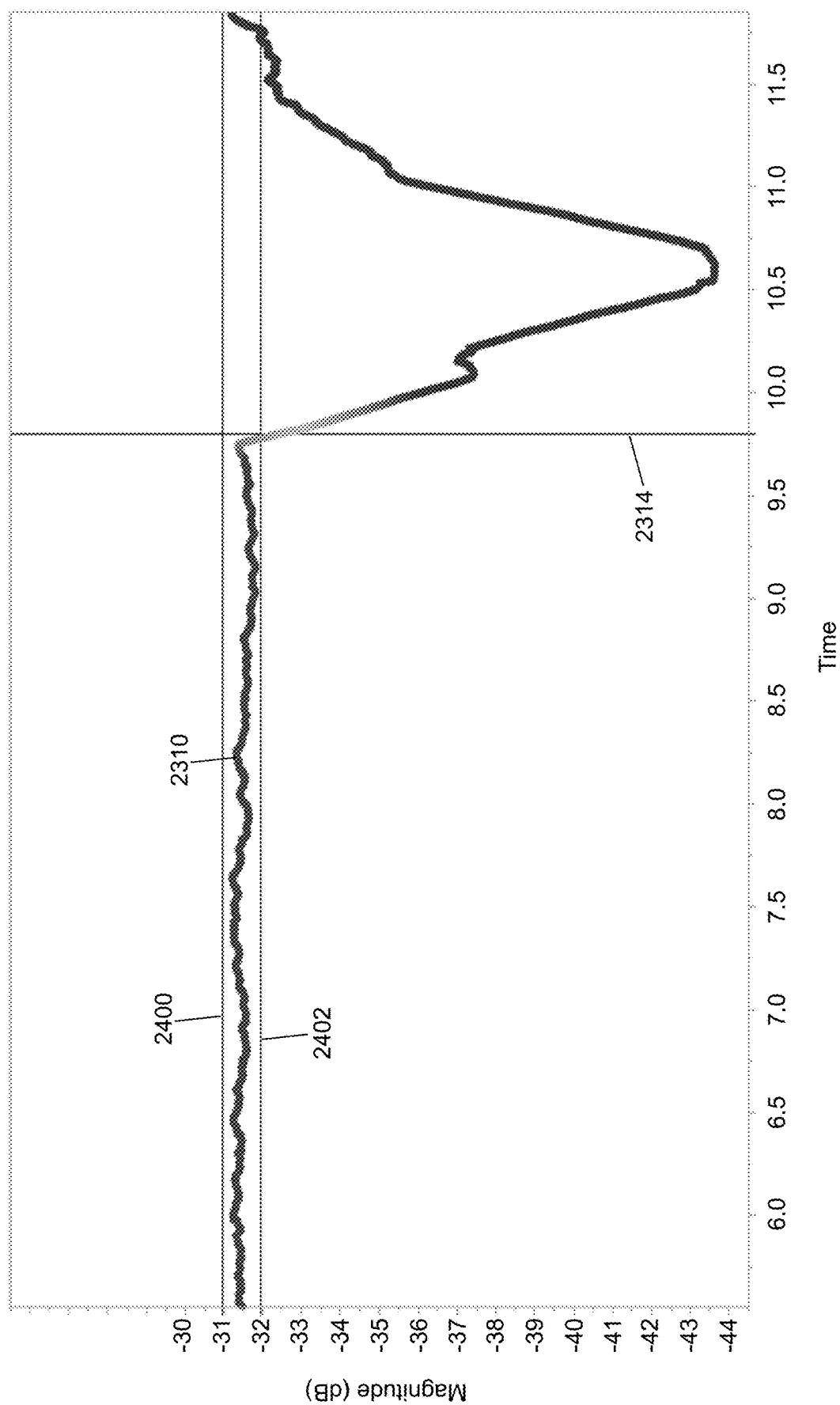
FIG. 24 shows a magnitude of one frequency segment as a function of time prior to and after the injected event in accordance with an illustrative embodiment.

For illustration, referring to FIG. 24, the magnitude as a function of time for the eleventh frequency segment is shown with the upper threshold value 2400 and the lower threshold value 2402 computed in operation 270 in accordance with an illustrative embodiment. In an illustrative embodiment, an alert was generated 7.2 seconds after intervention time 2314.

In an operation 274, the computed score is stored in association with the training parameter set, the defined upper threshold value for each frequency segment, the defined lower threshold value for each frequency segment, and the defined plurality of frequency segments.

In an operation 276, a determination is made concerning whether there is another training parameter set to evaluate from the plurality of training parameter sets. When there is another training parameter set to evaluate, processing continues in operation 260 to select and evaluate another training parameter set. When there is not another training parameter set to evaluate, processing continues in an operation 278.

In operation 278, the training parameter set associated with an extremum value of the computed score, the defined upper threshold value for each frequency segment, the defined lower threshold value for each frequency segment, and the defined plurality of frequency segments are selected as the monitoring model components. For example, the STFT window size, the FFT length, the number of spectrums to average, the filter window size, the number of consecutive times, the number of times, and/or the time window length may be included to define the trained monitoring model components. For illustration, if the computed score is associated with an accuracy, the extremum value of the computed score may be a maximum value. For further illustration, if the computed score is associated with an error, the extremum value of the computed score may be a minimum value.

Referring to FIG. 2D, similar to operation 236, in an operation 280, a training parameter set is selected from a plurality of training parameter sets that may be defined based on the training parameters indicated in operations 206, 208, 210, 218, 220, 224, and 228. When the device is operated in a different mode, for example, when the motor is operated at a different speed, the Fourier spectrum typically also changes changing the average magnitude in the entire spectrum as well as the plurality of frequency segments. Using the operations of FIG. 2B, a reference spectrum can be trained for each operating mode. Using the operations of FIG. 2C, new thresholds for each frequency segment can be trained for each operating mode. Alternatively, a model such as an SVDD can be trained using data that includes normal operating data for each mode.

Similar to operation 238, in an operation 282, a frequency spectrum is computed for the variable values included in training dataset 124 of the variables indicated in operation 202 using a STFT with the STFT window size and/or FFT length included in the selected training parameter set.

Similar to operation 240, in an operation 284, an average of the computed frequency spectrum is computed based on the number of spectrums to average included in the selected training parameter set.

Similar to operation 266, in an operation 286, the plurality of frequency segments are determined.

Similar to operation 268, in an operation 288, an average of the computed frequency spectrum is computed for each determined frequency segment.

In an operation 290, the SVDD model is trained using the SVDD training parameters included in the selected training parameter set. SVDD, like other one-class classifiers, provides a geometric description of observed data. The SVDD classifier computes a distance to each point in the domain space that is a measure of a separation of that point from training data. During scoring, if an observation is found to be a large distance from the training data, it may be identified as an anomaly.

SVDD is used in domains where the majority of data belongs to a single class, or when one of the classes is significantly undersampled. An SVDD model defines a flexible boundary around target class data that is characterized by observations designated as support vectors. Because no assumptions about a distribution of outliers is made, SVDD can describe the boundary of the target class without prior knowledge of the specific data distribution and can identify observations that fall outside the boundary as potential outliers. In the case of machine monitoring, normal working condition data for a machine is in abundance, whereas there is little data for a system failure. By using SVDD on the well-sampled target class, a boundary around the distribution of normal working data is defined, and used to identify outlier points where the machine may be faulty.

The trained SVDD model for normal data description builds a minimum radius hypersphere around training dataset 124. The simplest form for a boundary is a sphere. For a set of data points $x_1, x_2, \ldots x_n$, the mathematical formulation finds a nonnegative vector that contains Lagrange multipliers for all data points such that the following objective function is maximized:

$$L = \sum_{i=1}^{n} \alpha_i (x_i \cdot x_i) - \sum_{i=1}^{n} \sum_{j=1}^{n} \alpha_i \alpha_j (x_i \cdot x_j) \quad (1)$$

subject to:

$$\sum_{i=1}^{n} \alpha_i = 1 \quad (2)$$

$$0 \leq \alpha_i \leq C, \forall i = 1, \ldots, n, \quad (3)$$

where $x_i \in \mathbb{R}^m$, $i=1, \ldots, n$ represents n observations, $\alpha_1 \in \mathbb{R}$ : are the Lagrange multipliers, $C=1/nf$ is a penalty constant that controls a trade-off between a volume and errors, and f is an expected outlier fraction. The expected outlier fraction is generally known to an analyst. For example, in a training phase, $C=1$ may be used such that none of the n observations are treated as outliers.

Depending upon a position of an observation vector, the following results are true:

$$\text{Center position} \sum_{i=1}^{n} \alpha_i x_i = a. \quad (4)$$

-continued $$\text{Inside position:} \|x_i - a\| < R \rightarrow \alpha_i = 0. \quad (5)$$

$$\text{Boundary position:} \|x_i - a\| = R \rightarrow 0 < \alpha_i < C. \quad (6)$$

$$\text{Outside position:} \|x_i - a\| > R \rightarrow \alpha_i = C. \quad (7)$$

where $\alpha$ is a center of the hypersphere and R is a radius of the hypersphere. SV is the set of support vectors that includes the observation vectors that have $C \geq \alpha_i > 0$ after solving equation (1) above. $SV_{<C}$ is a subset of the support vectors that includes the observation vectors that have $C > \alpha_i > 0$ after solving equation (1) above. The $SV_{<C}$ is a subset of the support vectors located on a boundary of the minimum radius hypersphere defined around the data and are referred to herein as boundary support vectors BV.

The radius of the hypersphere is calculated using:

$$R^2 = x_k \cdot x_k - 2\sum_{i=1}^{N_{SV}} \alpha_i(x_i \cdot x_k) + \sum_{i=1}^{N_{SV}} \sum_{j=1}^{N_{SV}} \alpha_i \alpha_j (x_i \cdot x_j) \quad (8)$$

where any $x_k \in BV$, $x_i$ and $x_j$ are the support vectors, $\alpha_i$ and $\alpha_j$ are the Lagrange multipliers of the associated support vector, and $N_{SV}$ is a number of the support vectors included in the set of support vectors. An observation vector z is indicated as an outlier when $dist^2(z) > R^2$, where $$dist^2(z) = (z \cdot z) - 2\sum_{i=1}^{N_{SV}} \alpha_i(x_i \cdot z) + \sum_{i=1}^{N_{SV}} \sum_{j=1}^{N_{SV}} \alpha_i \alpha_j (x_i \cdot x_j). \quad (9)$$

When the outlier fraction f is very small, the penalty constant C is very large resulting in few if any observation vectors in training dataset 124 determined to be in the outside position according to equation (7). Thus, $R^2$ is used as a threshold defined by the trained SVDD model.

Figure 25:
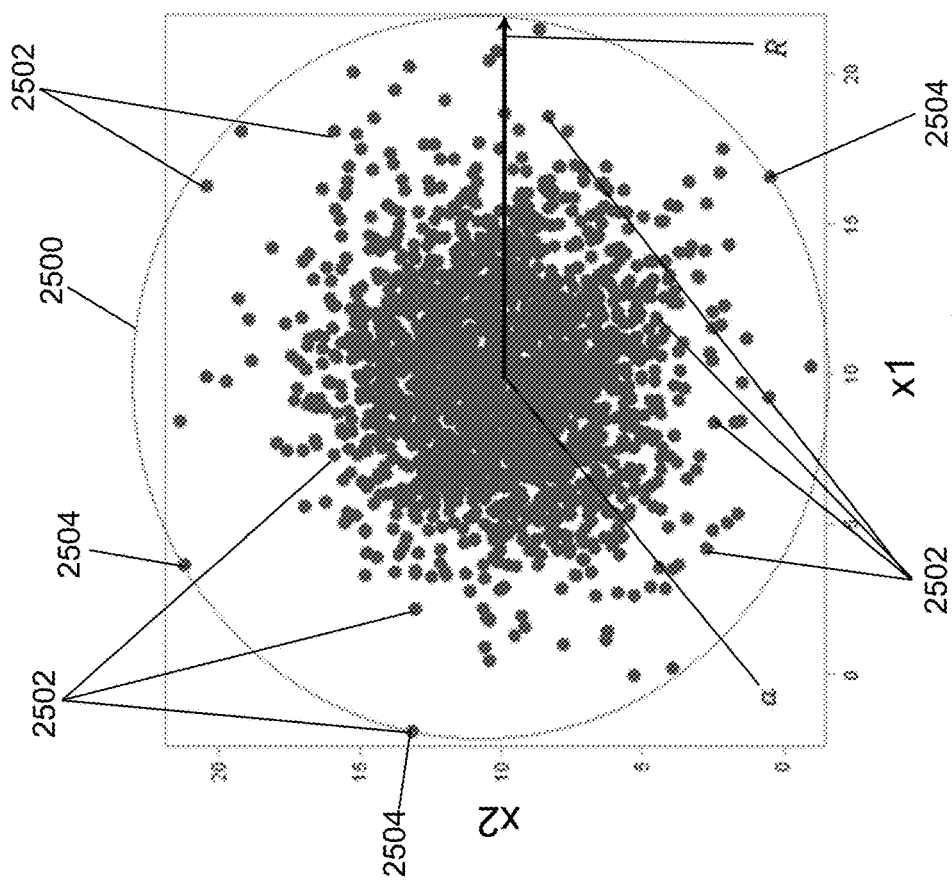
FIG. 25 shows a support vector data description (SVDD) model defining a normal data description in accordance with an illustrative embodiment.

Referring to FIG. 25, an SVDD is illustrated in accordance with an illustrative embodiment that defines a boundary 2500 having a radius R from a center $\alpha$. Boundary 2500 is characterized by observation vectors 2502 (shown as data points on the graph), which are the set of support vectors SV. For illustration, observation vectors 2502 are defined by values of variables x1 and x2 though observation vectors 2502 may include a greater number of variables. The subset of observation vectors 2504 are the boundary support vectors BV on boundary 2500.

Boundary 2500 includes a significant amount of space with a very sparse distribution of training observations. Scoring with the model based on the set of support vectors SV that define boundary 2500 can increase the probability of false positives. Instead of a circular shape, a compact bounded outline around the data that better approximates a shape of data may be preferred. This is possible using a kernel function such as a Gaussian kernel function. The Gaussian kernel function may be defined as:

$$K(x_i, x_j) = \exp\frac{-\|x_i - x_j\|^2}{2s^2} \quad (10)$$

where s is a Gaussian bandwidth parameter that may be selected in a variety of manners possibly as part of the training process.

The objective function for the SVDD model with the Gaussian kernel function is $$L = \sum_{i=1}^{n} \alpha_i K(x_i, x_i) - \sum_{i=1}^{n} \sum_{j=1}^{n} \alpha_i \alpha_j K(x_i, x_j) \quad (11)$$

subject to:

$$\sum_{i=1}^{n} \alpha_i = 1 \quad (12)$$

$$0 \leq \alpha_i \leq C, \forall i = 1, \ldots, n \quad (13)$$

where again SV is the set of support vectors that includes the observation vectors that have $C \geq \alpha_i > 0$ after maximizing equation (11) above. BV are the boundary support vectors that are the subset of the support vectors that have $C > \alpha_i > 0$ after solving equation (11) above and are positioned on the boundary.

The results from equations (4) to (7) above remain valid. A threshold R is computed using:

$$R^2 = K(x_k, x_k) - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j) \quad (14)$$

where any $x_k \in BV$, $x_i$ and $x_j$ are the support vectors, $\alpha_i$ and $\alpha_j$ are the Lagrange multipliers of the associated support vector, and $N_{SV}$ is a number of the support vectors included in the set of support vectors. For a Gaussian kernel function, $K(x_k, x_k) = 1$. Thus, equation (14) can be simplified to $$R^2 = 1 - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j)$$

for a Gaussian kernel function.

An observation vector z is indicated as an outlier when $dist^2(z) > R^2$, where $$dist^2(z) = K(z, z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j). \quad (15)$$

$R^2$ is a threshold determined using the set of support vectors. Again, for a Gaussian kernel function, $K(z, z) = 1$. Thus, equation (15) can be simplified to $$dist^2(z) = 1 - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j)$$

for a Gaussian kernel function.

Figure 26:
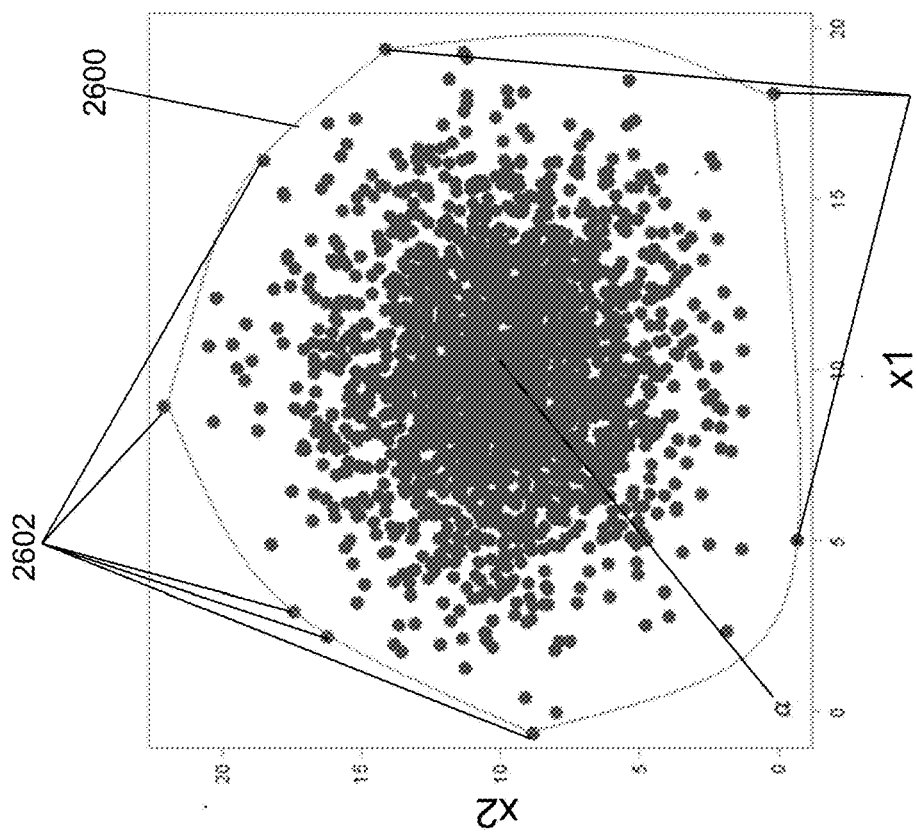
FIG. 26 shows an SVDD model defining a flexible data description using a Gaussian kernel function in accordance with an illustrative embodiment.

Referring to FIG. 26, a second SVDD is shown in accordance with an illustrative embodiment that defines a flexible boundary 2600. Boundary support vectors 2602 are positioned on flexible boundary 2600.

Equation (15) can be simplified to $$dist^2(z) = 1 - 2\sum_{i=1}^{N_{BV}} \alpha_i K(x_i, z) + \sum_{i=1}^{N_{BV}} \sum_{j=1}^{N_{BV}} \alpha_i \alpha_j K(x_i, x_j)$$

where $N_{BV}$ is a number of the boundary support vectors BV and equation (14) can be simplified to $$R^2 = 1 - 2\sum_{i=1}^{N_{BV}} \alpha_i K(x_k, x_i) + \sum_{i=1}^{N_{BV}} \sum_{j=1}^{N_{BV}} \alpha_i \alpha_j K(x_i, x_j)$$

where $dist^2(z) = R^2$ for all of the boundary support vectors BV as z though they may have different Lagrange multiplier values. 75% of training dataset 124 for each speed was used to train the SVDD model using the SVDD procedure available in SAS Visual Data Mining and Machine Learning.

In an operation 292, a score is computed for the trained SVDD model using the objective function defined in operation 204 based on the event detection parameters included in the selected training parameter set and using a validation dataset extracted from training dataset 124 based on the training parameters indicated in operation 204.

Figure 27:
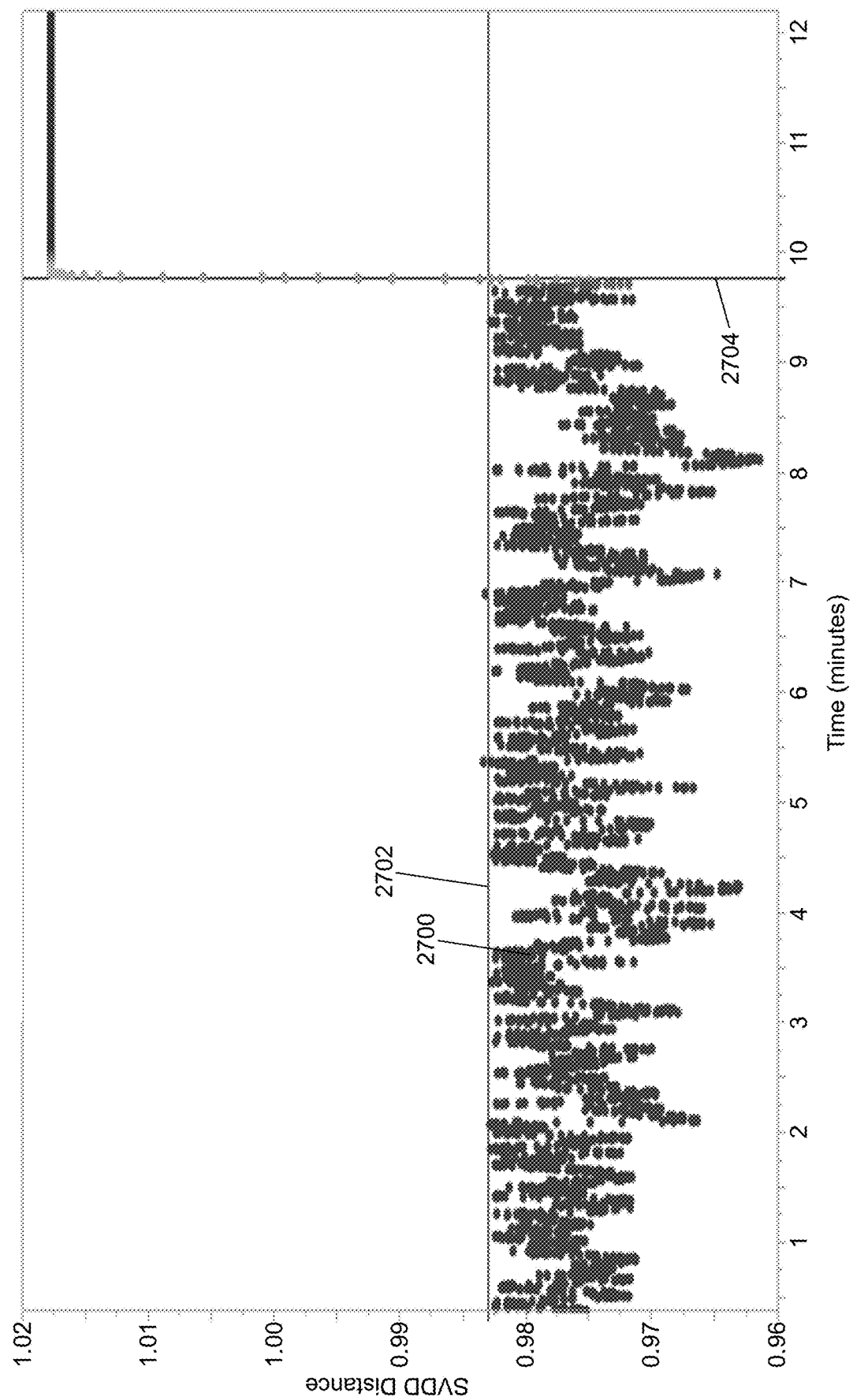
FIG. 27 shows an SVDD distance computed as a function of time using the SVDD model based on machine operation at a first speed prior to and after the injected event in accordance with an illustrative embodiment.

In an operation 294, the computed score is stored in association with the training parameter set and the trained SVDD model. Referring to FIG. 27, a first SVDD distance curve 2700 computed by the trained SVDD model with the machine operating at 25 rpm is shown as a function of time in accordance with an illustrative embodiment where the threshold value R is indicated by line 2702. In the illustrative embodiment, the induced shaft misalignment occurred that was detectable based on the comparison $dist^2(z) > R^2$ at a first alert time 2704 within 6.32 seconds after the intervention time.

Figure 28:
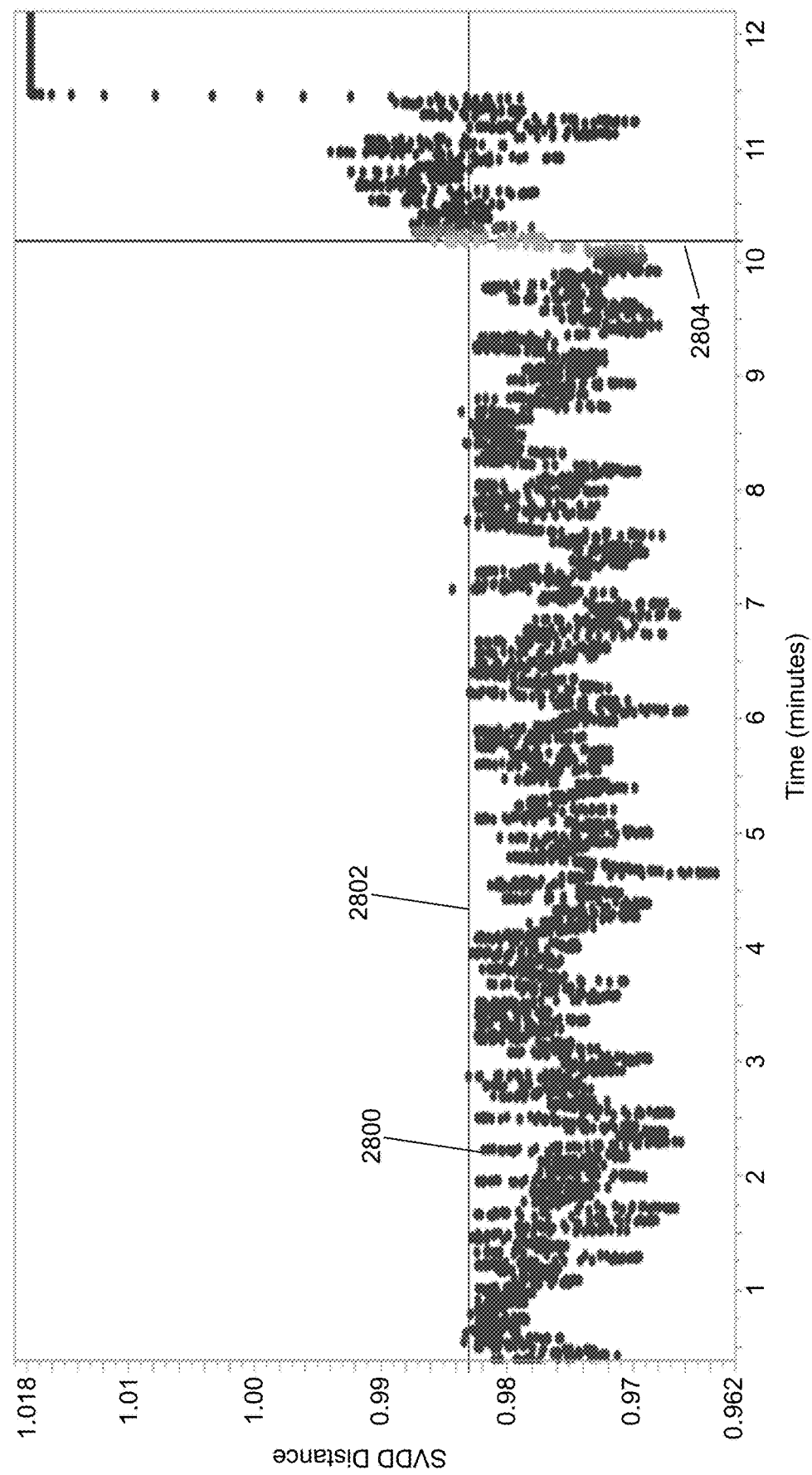
FIG. 28 shows an SVDD distance computed as a function of time using the SVDD model based on machine operation at a second speed prior to and after the injected event in accordance with an illustrative embodiment.

Referring to FIG. 28, a second SVDD distance curve 2800 computed by the trained SVDD model with the machine operating at 35 rpm is shown as a function of time in accordance with an illustrative embodiment where the threshold value R is indicated by line 2802. In the illustrative embodiment, the induced shaft misalignment occurred that was detectable based on the comparison $dist^2(z) > R^2$ at a second alert time 2804 within 9.66 seconds after the intervention time.

Figure 29:
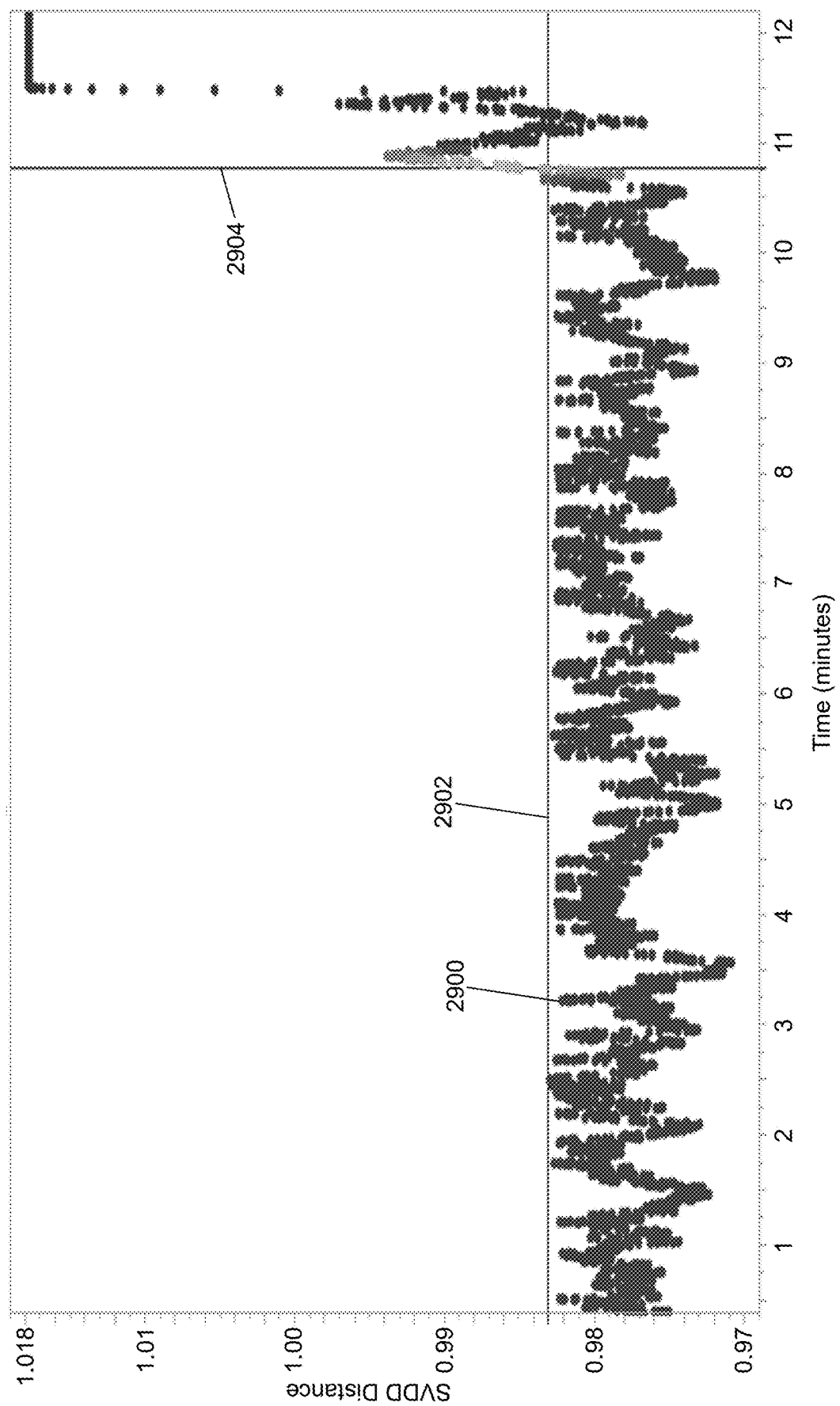
FIG. 29 shows an SVDD distance computed as a function of time using the SVDD model based on machine operation at a third speed prior to and after the injected event in accordance with an illustrative embodiment.

Referring to FIG. 29, a second SVDD distance curve 2900 computed by the trained SVDD model with the machine operating at 50 rpm is shown as a function of time in accordance with an illustrative embodiment where the threshold value R is indicated by line 2902. In the illustrative embodiment, the induced shaft misalignment occurred that was detectable based on the comparison $dist^2(z) > R^2$ at a third alert time 2904 within 8.16 seconds after the intervention time.

These results indicate that an SVDD model trained using normal conditions from all operating modes can detect changes relative to the normal conditions. Whether the SVDD model remains successful for other non-normal conditions depends on how different from the normal operation at any operating mode these non-normal conditions are. To assess this, the multi-dimensional data may be visualized as discussed further below.

In an operation 296, a determination is made concerning whether there is another training parameter set to evaluate from the plurality of training parameter sets. When there is another training parameter set to evaluate, processing continues in operation 280 to select and evaluate another training parameter set. When there is not another training parameter set to evaluate, processing continues in an operation 298.

In operation 298, the training parameter set associated with an extremum value of the computed score, the trained SVDD model, and the defined plurality of frequency segments are selected as the monitoring model components. For example, the STFT window size, the FFT length, the number of spectrums to average, the filter window size, the number of consecutive times, the number of times, and/or the time window length may be included to define the trained monitoring model components may be included with the trained monitoring model components. For illustration, if the computed score is associated with an accuracy, the extremum value of the computed score may be a maximum value. For further illustration, if the computed score is associated with an error, the extremum value of the computed score may be a minimum value.

Referring again to FIG. 2A, in an operation 232, the selected monitoring model components are output, for example, to trained modeling components 126. For example, the trained parameters for the STFT, the trained parameters for the spectrum averaging, the trained parameters for the lowpass noise filter, the distance computation function, the trained parameters for frequency segmentation, the threshold function, the trained parameters that describe the trained SVDD model, the trained parameters for event detection, the reference spectrum, etc. may be stored on one or more devices of distributed computing system 128 and/or on computer-readable medium 108 in a variety of formats as understood by a person of skill in the art. The trained modeling components 126 further may be output to display 116, to printer 120, etc. The trained SVDD model may include the boundary support vectors BV, $\alpha_i$ the Lagrange multiplier for each of the boundary support vectors BV, the center position a, and/or $R^2$ computed from the boundary support vectors BV. Any other constants associated with the boundary support vectors BV may be stored. For example, $$W = \sum_{i=1}^{N_{BV}} \sum_{j=1}^{N_{BV}} \alpha_i \alpha_j K(x_i, x_j)$$

may be stored for use in computing $dist^2(z)$. Additionally, properties such as the objective function value, the number of support vectors, etc. may be stored to trained modeling components 126.

Figure 3:
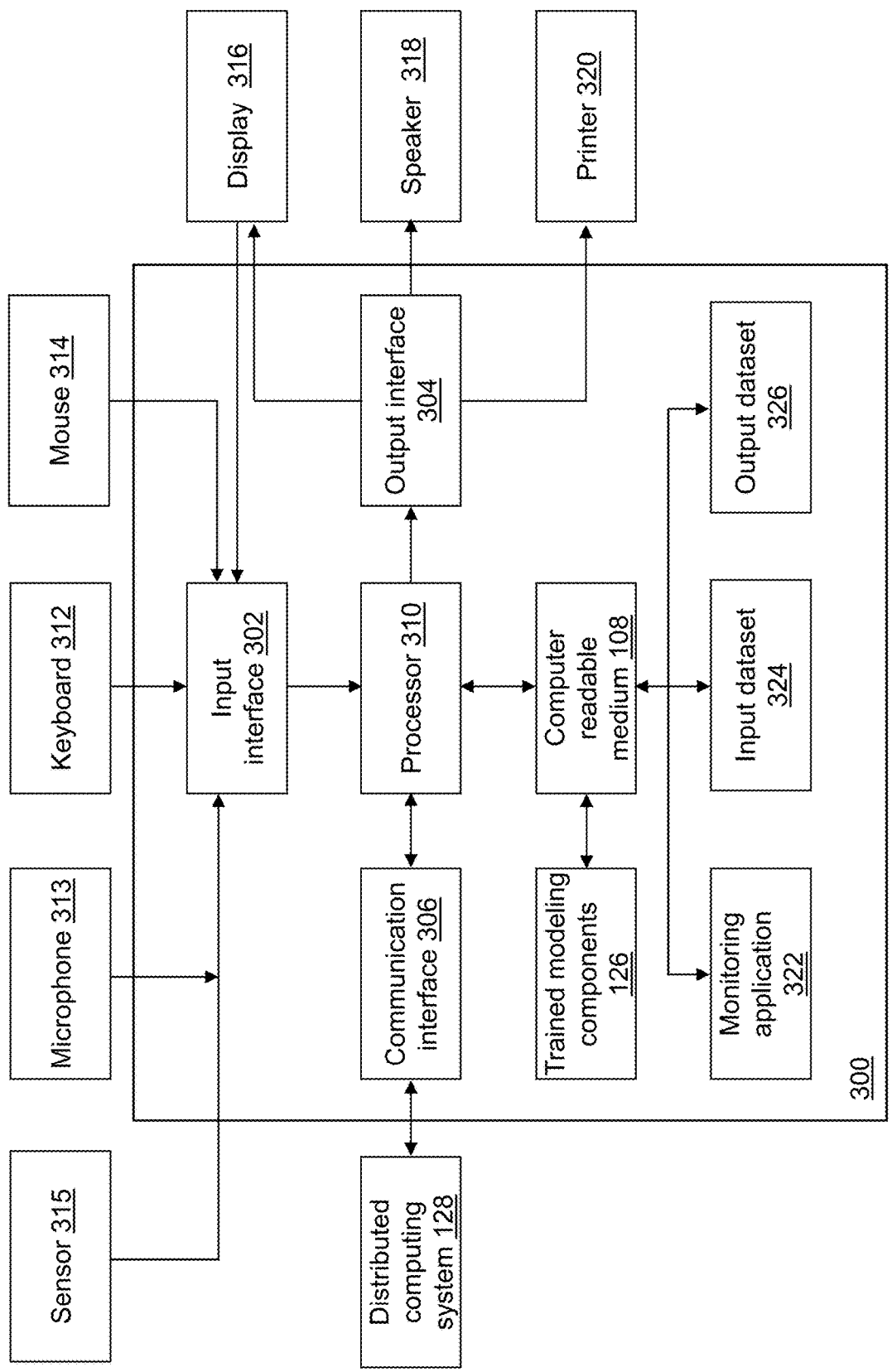
FIG. 3 depicts a block diagram of a monitoring device in accordance with an illustrative embodiment.

Referring to FIG. 3, a block diagram of a monitoring device 300 is shown in accordance with an illustrative embodiment. Monitoring device 300 may include a second input interface 302, a second output interface 304, a second communication interface 306, a second non-transitory computer-readable medium 308, a second processor 310, a monitoring application 322, trained modeling components 126, input dataset 324, and output dataset 326. Fewer, different, and/or additional components may be incorporated into monitoring device 300. Monitoring device 300 and training device 100 may be the same or different devices.

Second input interface 302 provides the same or similar functionality as that described with reference to input interface 102 of training device 100 though referring to monitoring device 300. Second output interface 304 provides the same or similar functionality as that described with reference to output interface 104 of training device 100 though referring to monitoring device 300. Second communication interface 306 provides the same or similar functionality as that described with reference to communication interface 106 of training device 100 though referring to monitoring device 300. Data and messages may be transferred between monitoring device 300 and a distributed computing system 128 using second communication interface 306. Second computer-readable medium 308 provides the same or similar functionality as that described with reference to computer-readable medium 108 of training device 100 though referring to monitoring device 300. Second processor 310 provides the same or similar functionality as that described with reference to processor 110 of training device 100 though referring to monitoring device 300.

Monitoring application 322 performs operations associated with monitoring based on one or more observation vectors included in input dataset 324. An indicator of the monitoring status may be stored in output dataset 326 to support various data analysis functions as well as provide alert/messaging related to the monitoring status. Dependent on the type of data stored in training dataset 124 and input dataset 324, monitoring application 322 may identify anomalies as part of process control, for example, of a manufacturing process, for machine condition monitoring, for image classification, for intrusion detection, for fraud detection, etc. Some or all of the operations described herein may be embodied in monitoring application 322. The operations may be implemented using hardware, firmware, software, or any combination of these methods.

Referring to the example embodiment of FIG. 3, monitoring application 322 is implemented in software (comprised of computer-readable and/or computer-executable instructions) stored in second computer-readable medium 308 and accessible by second processor 310 for execution of the instructions that embody the operations of monitoring application 322. Monitoring application 322 may be written using one or more programming languages, assembly languages, scripting languages, etc. Monitoring application 322 may be integrated with other analytic tools. As an example, monitoring application 322 may be part of an integrated data analytics software application and/or software architecture such as that offered by SAS Institute Inc. of Cary, N.C., USA. For example, monitoring application 322 may be part of SAS® Enterprise Miner™ developed and provided by SAS Institute Inc. of Cary, N.C., USA. Merely for further illustration, monitoring application 322 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. One or more operations of monitoring application 322 further may be performed by an ESPE. Monitoring application 322 and training application 122 may be the same or different applications that are integrated in various manners to perform monitoring of a physical object, of a process, of an environment, etc. based on data captured in input dataset 324.

Monitoring application 322 may be implemented as a Web application. Monitoring application 322 may be integrated with other system processing tools to automatically process data generated as part of operation of an enterprise, to determine a status based on the processed data, and/or to provide a warning or alert associated with the data monitoring using second input interface 302, second output interface 304, and/or second communication interface 306 so that appropriate action can be initiated in response. For example, a warning or an alert may be presented using a second display 316, a second speaker 318, a second printer 320, etc. or sent to one or more computer-readable media, display, speaker, printer, etc. of distributed computing system 128.

Training dataset 124 and input dataset 324 may be generated, stored, and accessed using the same or different mechanisms. Similar to training dataset 124, input dataset 324 may include a plurality of rows and a plurality of columns with the plurality of rows referred to as observations or records, and the columns referred to as variables that are associated with an observation. Input dataset 324 may be transposed.

Similar to training dataset 124, input dataset 324 may be stored on second computer-readable medium 308 or on one or more computer-readable media of distributed computing system 128 and accessed by monitoring device 300 using second communication interface 306. Data stored in input dataset 324 may be a sensor measurement or a data communication value, for example, from a second sensor 315, may be generated or captured in response to occurrence of an event or a transaction, generated by a device such as in response to an interaction by a user with the device, for example, from a second keyboard 312 or a second mouse 314, a second microphone 313, etc. The data stored in input dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 324 may be captured at different time points periodically, intermittently, when an event occurs, etc. One or more columns may include a time value. Similar to training dataset 124, data stored in input dataset 324 may be generated as part of the IoT, and some or all data may be pre- or post-processed by an ESPE.

Similar to training dataset 124, input dataset 324 may be stored in various compressed formats such as a coordinate format, a compressed sparse column format, a compressed sparse row format, etc. Input dataset 324 further may be stored using various structures as known to those skilled in the art including a file system, a relational database, a system of tables, a structured query language database, etc. on monitoring device 300 and/or on distributed computing system 128. Monitoring device 300 and/or distributed computing system 128 may coordinate access to input dataset 324 that is distributed across a plurality of computing devices that make up distributed computing system 128. For example, input dataset 324 may be stored in a cube distributed across a grid of computers as understood by a person of skill in the art. As another example, input dataset 324 may be stored in a multi-node Hadoop® cluster. As another example, input dataset 324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 324.

Figure 4A:
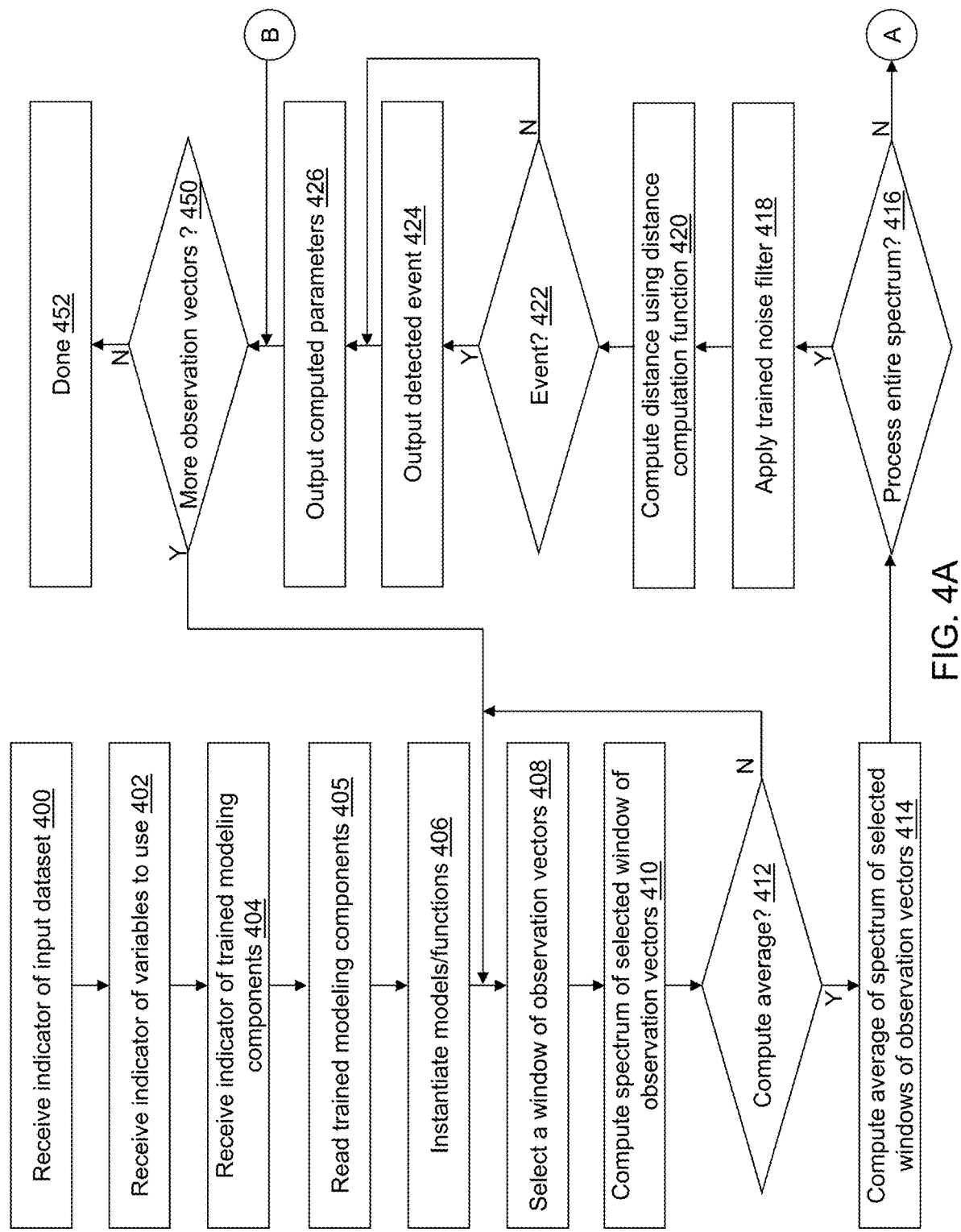
FIGS. 4A-4B depict a flow diagram illustrating examples of operations performed by the monitoring device of FIG. 3 in accordance with an illustrative embodiment.
Figure 4B:
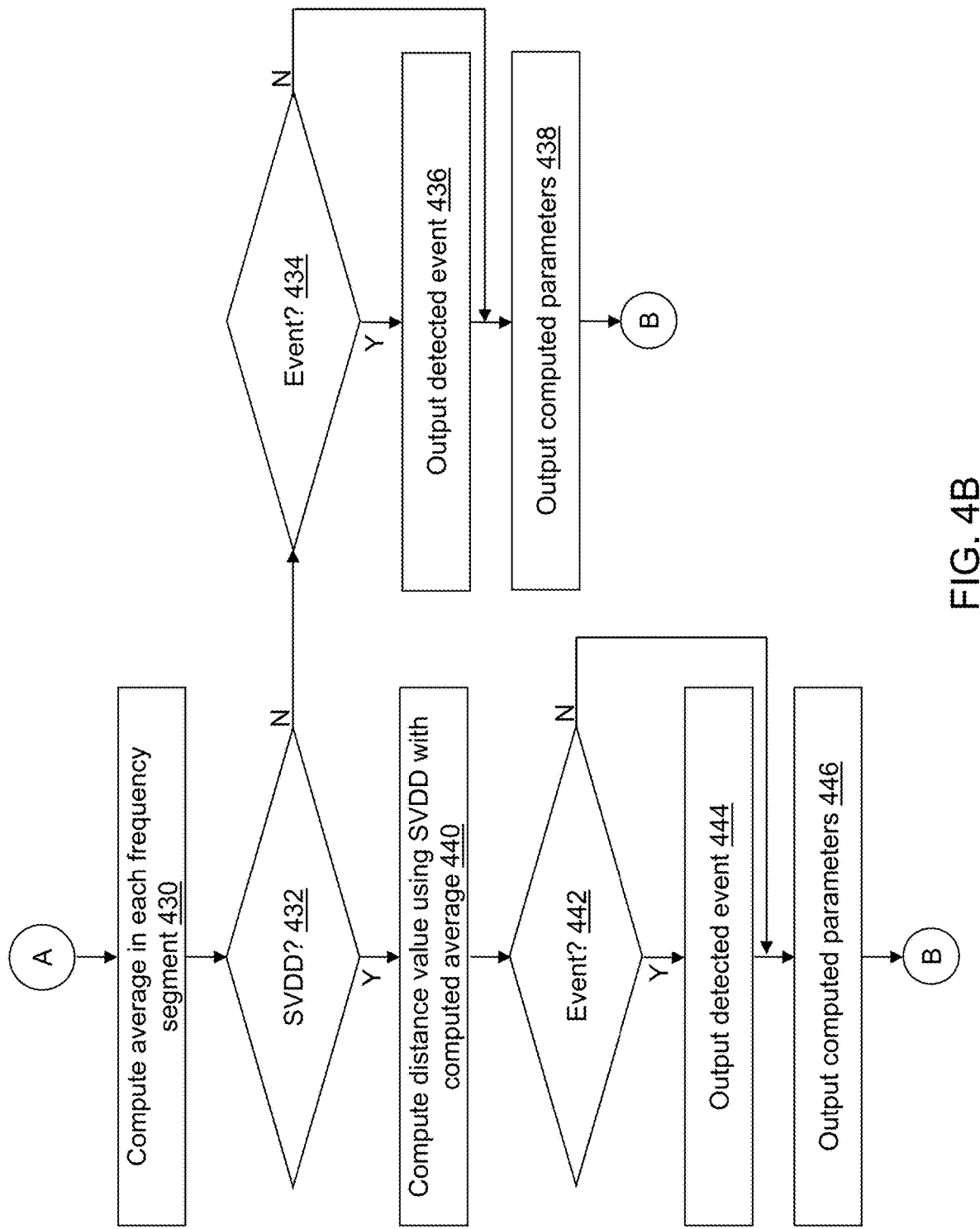

Referring to FIGS. 4A and 4B, example operations of monitoring application 322 are described. Additional, fewer, or different operations may be performed depending on the embodiment of monitoring application 322. The order of presentation of the operations of FIGS. 4A and 4B is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 400, a fourteenth indicator may be received that indicates input dataset 324. For example, the fourteenth indicator indicates a location and a name of input dataset 324. As an example, the fourteenth indicator may be received by monitoring application 322 after selection from a user interface window or after entry by a user into a user interface window. In an alternative embodiment, input dataset 324 may not be selectable. For example, a most recently created dataset may be used automatically.

In an operation 402, a fifteenth indicator may be received that indicates a plurality of variables of input dataset 324 to define $x_i$. The fifteenth indicator may indicate that all or only a subset of the variables stored in input dataset 324 be used for monitoring. For example, the fifteenth indicator indicates a list of variables to use by name, column number, etc. In an alternative embodiment, the fifteenth indicator may not be received. For example, all of the variables may be used automatically. Typically, the plurality of variables of input dataset 324 to define $x_i$ include the plurality of variables of training dataset 124 to define $x_i$ indicated in operation 202

In an operation 404, a sixteenth indicator may be received that indicates trained modeling components 126. For example, the sixteenth indicator indicates a location and a name of trained modeling components 126. As an example, the sixteenth indicator may be received by monitoring application 322 after selection from a user interface window or after entry by a user into a user interface window. In an alternative embodiment, trained modeling components 126 may not be selectable. For example, a most recently created model configuration data may be used automatically. As another example, trained modeling components 126 may be provided automatically as part of integration with training application 122.

In an operation 405, a model description is read from trained modeling components 126.

In an operation 406, a monitoring model is instantiated with the model description. For example, the type(s) of model(s)/function(s), their hyperparameters, and other characterizing elements are read and used to instantiate the monitoring model based on the information output from the training process in operation 232.

In an operation 408, a window of observation vectors is selected from input dataset 324.

In an operation 410, an STFT spectrum is computed using the selected window of observation vectors and the STFT instantiated using the STFT window size and the FFT length included in trained modeling components 126.

In an operation 412, a determination is made concerning whether or not it is time to compute the average based on the number of spectrums to average included in trained modeling components 126. When it is time to compute the average, processing continues in an operation 414. When it is not time to compute the average, processing continues in 408 to select another window of observation vectors.

In operation 414, an average of the computed STFT spectrum for the selected windows of observation vectors is computed based on the number of spectrums to average.

In an operation 416, a determination is made based on the frequency segmentation option included in trained modeling components 126 or otherwise provided as a predefined input value. When the frequency segmentation option indicates the entire spectrum, processing continues in an operation 418. When the frequency segmentation option indicates frequency segmentation, processing continues in an operation 430 shown referring to FIG. 4B. Of course, if a single frequency segmentation option is implemented by monitoring application 322, no determination is needed, and processing continues based on the option implemented.

In operation 418, a filtered, average spectrum is computed using the selected window of observation vectors and the lowpass noise filter instantiated using the filter window size and the filter type included in trained modeling components 126.

In operation 420, a distance value is computed using the computed filtered, average spectrum and the distance computation function instantiated using the distance computation function included in trained modeling components 126.

In an operation 422, a determination is made concerning whether an event has occurred based on the computed distance value and the event detection hyperparameter(s) included in trained modeling components 126. When an event has occurred, processing continues in an operation 424. When an event has not occurred, processing continues in an operation 426.

For example, the computed distance value is compared to the upper threshold value and the lower threshold value included in trained modeling components 126. When the computed distance value is greater than the upper threshold value and/or is less than the lower threshold value, a counter or a start time value may be initialized or an event may be immediately triggered. When the number of consecutive times is included in trained modeling components 126, an event may be indicated as having occurred when the computed distance value is greater than the upper threshold value or is less than the lower threshold value the number of consecutive times of operation 422 based on a counter that is incremented each iteration and is reset when the computed distance value is less than or equal to the upper threshold value and is greater than or equal to the lower threshold value. When the number of times and the time window length are included in trained modeling components 126, an event may be indicated as having occurred when the computed distance value is greater than the upper threshold value or is less than the lower threshold value the number of times of operation 422 within the time window length based on a counter that is incremented each iteration and based on the start time value and a current time value that are reset when the computed distance value is less than or equal to the upper threshold value and is greater than or equal to the lower threshold value. Other tests may further be defined by the event detection parameter(s) included in trained modeling components 126 in alternative embodiments.

In operation 424, the detected event is output. For example, the detected event may be stored on one or more devices of distributed computing system 128 and/or on second computer-readable medium 308 in a variety of formats as understood by a person of skill in the art. The detected event further may be output to second display 316, to second speaker 318, to second printer 320, etc. A warning or alert associated with the detected event further may be output using second input interface 302, second output interface 304, and/or second communication interface 306 so that appropriate action can be initiated in response to the detected event that may indicate a device or machine is not operating properly, has failed, or is predicted to fail.

In operation 426, the parameters computed in one or more of operations 410, 414, 418, and 420 may be output, for example, to output dataset 326, and processing continue in operation 450. Output dataset 326 may be stored on one or more devices of distributed computing system 128 and/or on second computer-readable medium 308 in a variety of formats as understood by a person of skill in the art. The computed parameters further may be output to second display 316, to second speaker 318, to second printer 320, etc. through second output interface 304 and/or second communication interface 306.

Operations 408, 410, 414, 418, 420, and 422 are easy to implement on streaming data using SAS Event Stream Processing. Use of operations 408, 410, 414, 418, 420, and 422 detected the change in model state in less than one second after the intervention. Operations 408, 410, 414, 418, 420, and 422 can be applied to different operating modes by recalibrating the reference spectrum when the operating mode changes.

Referring to FIG. 4B, in operation 430, an average value of the computed, averaged STFT spectrum for the selected windows of observation vectors is computed for each frequency segment of the plurality of frequency segments included in trained modeling components 126.

In an operation 432, a determination is made concerning whether the SVDD threshold function is used as defined in trained modeling components 126 or otherwise provided as a predefined input value. When the SVDD threshold function indicates the trained SVDD model is used to compute the distance value, processing continues in an operation 440. When the SVDD option indicates the trained SVDD model is not used to compute the distance value, processing continues in an operation 434. Of course, if a single threshold function is implemented by monitoring application 322, no determination is needed, and processing continues based on the threshold function implemented.

Similar to operation 422, in operation 434, a determination is made concerning whether an event has occurred based on the computed average magnitude value for each frequency segment and the event detection hyperparameter(s) included in trained modeling components 126. When an event has occurred, processing continues in an operation 436. When an event has not occurred, processing continues in an operation 438.

For example, the computed average magnitude value for each frequency segment is compared to the upper threshold value and the lower threshold value included in trained modeling components 126 for each frequency segment. When the computed average magnitude value is greater than the upper threshold value and/or is less than the lower threshold value for any frequency segment, a counter or a start time value may be initialized or an event may be immediately triggered. When the number of consecutive times is included in trained modeling components 126, an event may be indicated as having occurred when the computed average magnitude value exceeds the upper threshold value or the lower threshold value the number of consecutive times of operation 434 based on a counter that is incremented each iteration and is reset when the computed average magnitude value no longer exceeds the upper threshold value or the lower threshold value. When the number of times and the time window length are included in trained modeling components 126, an event may be indicated as having occurred when the computed average magnitude value exceeds the upper threshold value or the lower threshold value the number of times of operation 434 within the time window length based on a counter that is incremented each iteration and based on a start time value and a current time value that are reset when the computed average magnitude value no longer exceeds the upper threshold value or the lower threshold value. Other tests may further be defined by the event detection parameter(s) included in trained modeling components 126 in alternative embodiments.

Similar to operation 424, in operation 436, the detected event is output.

Similar to operation 426, in operation 438, the parameters computed in one or more of operations 410, 414, and 430 may be output, for example, to output dataset 326, and processing continue in operation 450.

Operations 408, 410, 414, 430, and 434 are easy to implement on streaming data using SAS Event Stream Processing. Use of operations 408, 410, 414, 430, and 434 detected the change in model state approximately 7 second after the intervention. Operations 408, 410, 414, 430, and 434 can be applied to different operating modes by recalibrating the frequency segment thresholds when the operating mode changes.

In operation 440, a distance value is computed using the trained SVDD model included in trained modeling components 126. For example, the distance value is computed using $$dist^2(z) = K(z, z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j)$$

where z is the computed average magnitude value for each frequency segment, and K indicates the kernel function, $x_i$ and $x_j$ are the support vectors, $\alpha_i$ and $\alpha_j$ are the Lagrange multipliers of the associated support vector, and $N_{SV}$ is a number of the support vectors included in the set of support vectors that are stored as part of the trained SVDD model read in operation 404 from trained modeling components 126. For a Gaussian kernel function, $K(z, z)=1$.

Similar to operation 422, in an operation 442, a determination is made concerning whether an event has occurred based on the computed distance value and the event detection hyperparameter(s) included in trained modeling components 126. When an event has occurred, processing continues in an operation 444. When an event has not occurred, processing continues in an operation 446. For example, an event has occurred when $dist^2(z)>R^2$, where the radius of the hypersphere $R^2$ is stored as part of the trained SVDD model read in operation 404 from trained modeling components 126

For example, when $dist^2(z)>R^2$, a counter or a start time value may be initialized or an event may be immediately triggered. When the number of consecutive times is included in trained modeling components 126, an event may be indicated as having occurred when $dist^2(z)>R^2$ the number of consecutive times of operation 442 based on a counter that is incremented each iteration and is reset when $dist^2(z) \leq R^2$. When the number of times and the time window length are included in trained modeling components 126, an event may be indicated as having occurred when $dist^2(z)>R^2$ the number of times of operation 442 within the time window length based on a counter that is incremented each iteration and based on the start time value and the current time value that are reset when $dist^2(z) \leq R^2$. Other tests may further be defined by the event detection parameter(s) included in trained modeling components 126 in alternative embodiments.

Similar to operation 424, in operation 444, the detected event is output.

Similar to operation 426, in operation 446, the parameters computed in one or more of operations 410, 414, 430, and 440 may be output, for example, to output dataset 326, and processing continue in operation 450.

Operations 408, 410, 414, 430, 440, and 442 are easy to implement on streaming data using SAS Event Stream Processing. Use of operations 408, 410, 414, 430, 440, and 442 detected the change in model state between 6 and 10 second after the intervention. Operations 408, 410, 414, 430, 440, and 442 can be applied to all operating modes simultaneously.

Whether the SVDD model is successful in identifying a non-normal condition depends on how much non-normal condition differs from the normal operation of any operating mode. To assess this, the multi-dimensional data may be visualized using t-Stochastic Neighbor Embedding (t-SNE). T-SNE may be used to visualize processing of the observation vectors as a function of time in a large dimensional space. TSNE computes a low-dimensional representation, also called an embedding, of high-dimensional data into two or three dimensions. Unlike other dimension reduction methods, such as principal component analysis, t-SNE is appropriate for nonlinear data and emphasizes existing groupings in the data. The method models the pairwise distances in low dimensions according to a Student's t-distribution. The t-distribution with one degree of freedom has heavier tails than the Gaussian distribution, which means that it assigns higher probability values to large distances. This allows t-SNE to relax pairwise distances for non-neighboring observations, whereas distances between closely neighboring observations are more exactly preserved. This behavior is desirable because it mitigates the crowding problem in high-dimensional data representation and makes existing groups in the data visually evident.

Figure 30:
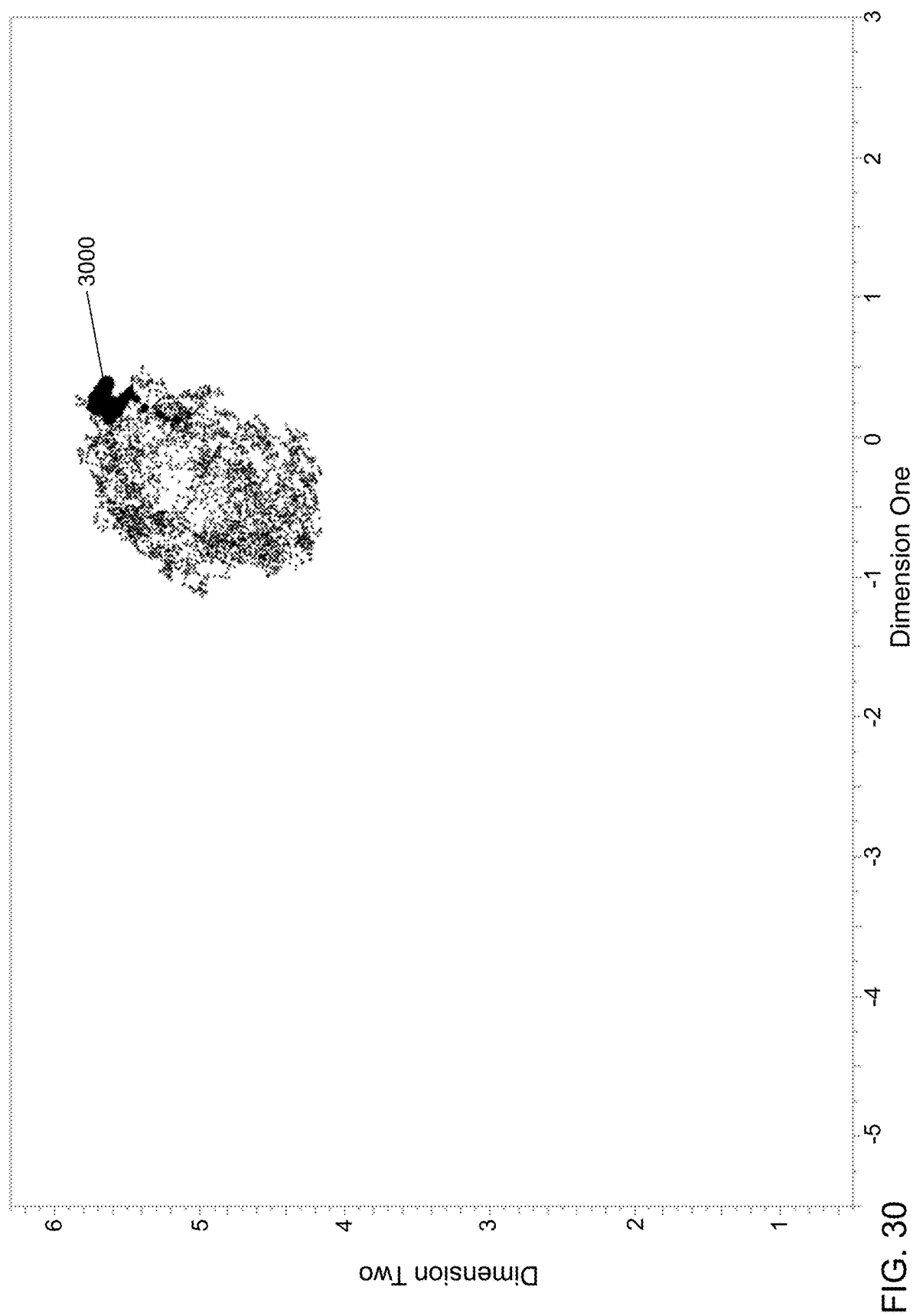
FIG. 30 shows a values of 13 frequency segments projected into two dimensions based on machine operation at the third speed at a first time in accordance with an illustrative embodiment.

For illustration, a TSNE procedure included in SAS® Visual Data Mining and Machine Learning 8.4 Procedures is used. The TSNE procedure returns either two or three computed columns that contain the embedding coordinates. The TSNE procedure computes the embedding by minimizing a Kullback-Leibler divergence between the joint probabilities in high dimensions and the joint probabilities in low dimensions. For example, based on the 13 frequency segments used to train the SVDD model in the example, two-dimensional values can be computed and graphed using the TSNE procedure. The 13 frequency segments used to train the SVDD model describe the average magnitude of the Fourier spectrum in the different frequency segments. For illustration, referring to FIG. 30, two-dimensional values computed using the TSNE procedure for the machine operating at 50 rpm using magnitude data from the 13 frequency segments is shown in accordance with an illustrative embodiment at a first time point immediately after the intervention time. The segment 3000 includes large dots that represent the values generated after the machine intervention time, but before third alert time 2904.

Figure 31:
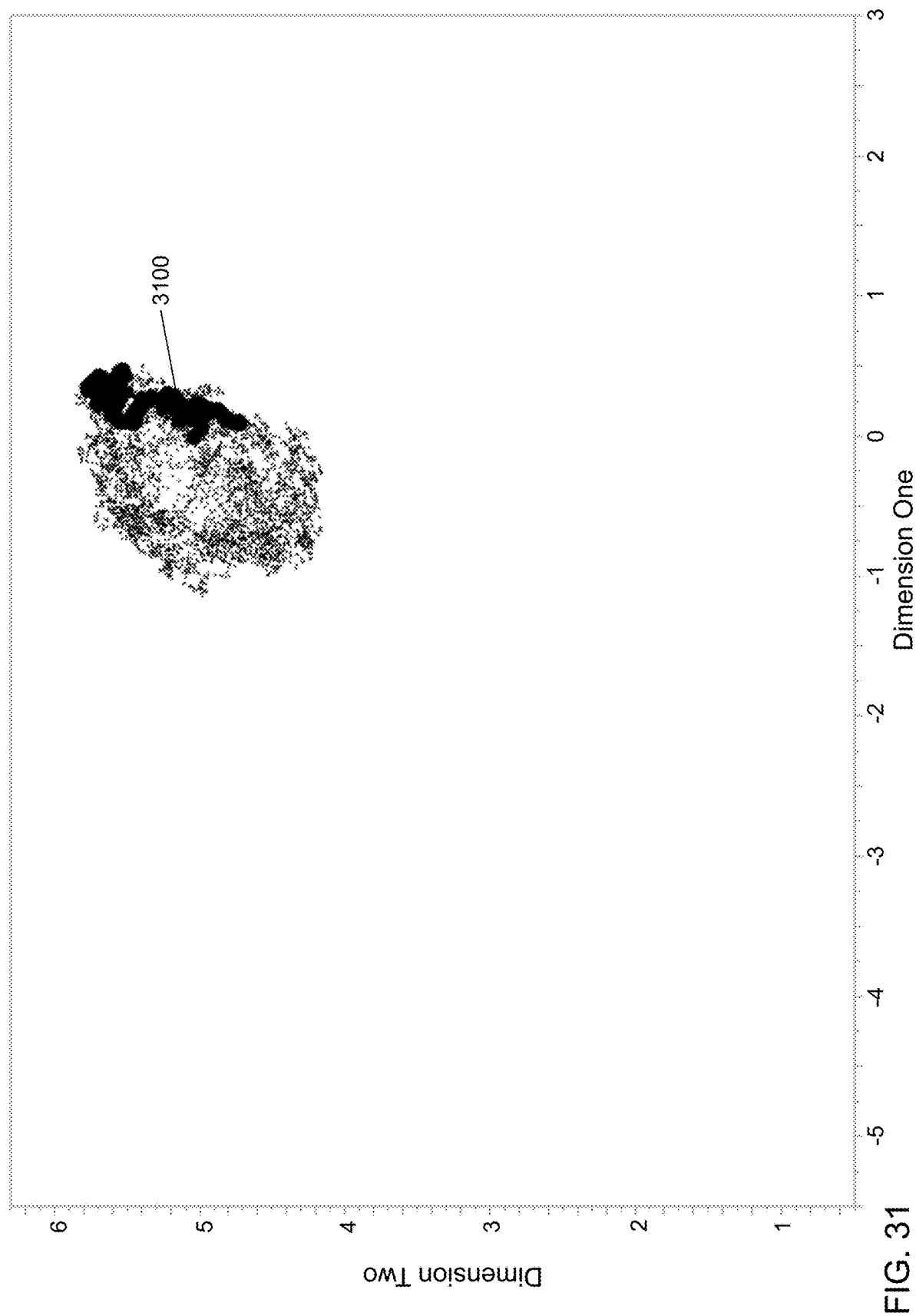
FIG. 31 shows the values of 13 frequency segments projected into two dimensions based on machine operation at the third speed at a second time in accordance with an illustrative embodiment.

For illustration, referring to FIG. 31, two-dimensional values computed using the TSNE procedure for the machine operating at 50 rpm using magnitude data from the 13 frequency segments is shown in accordance with an illustrative embodiment at a second time point after the first time point. The segment 3100 includes additional large dots that represent the values generated after the machine intervention time, but before third alert time 2904.

Figure 32:
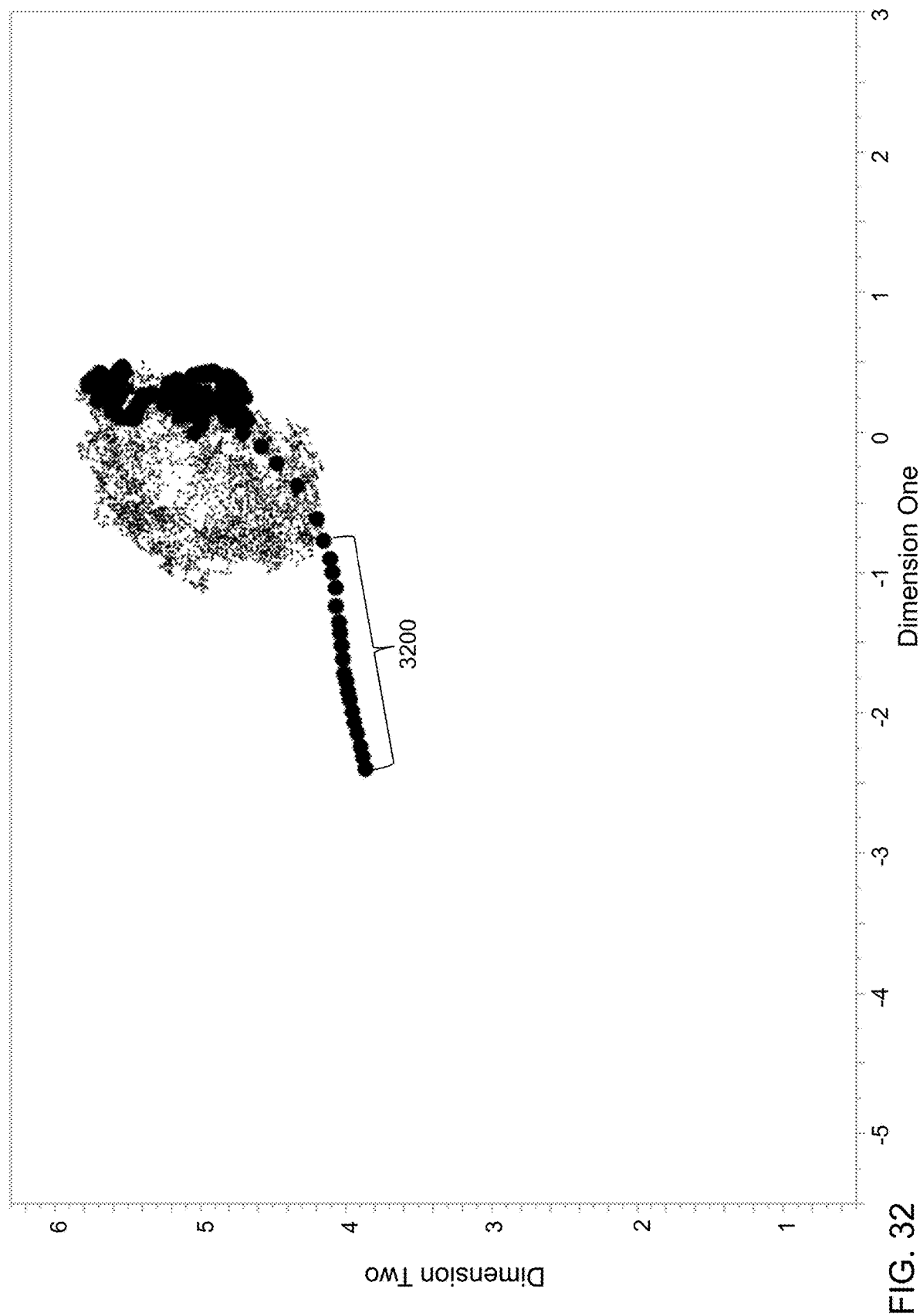
FIG. 32 shows the values of 13 frequency segments projected into two dimensions based on machine operation at the third speed at a third time in accordance with an illustrative embodiment.

For illustration, referring to FIG. 32, two-dimensional values computed using the TSNE procedure for the machine operating at 50 rpm using magnitude data from the 13 frequency segments is shown in accordance with an illustrative embodiment at a third time point after the second time point. The segment 3200 includes additional large dots that represent the values generated after the machine intervention time and after third alert time 2904. The tail of large dots included in segment 3200 show that the two-dimensional values computed using t-SNE visually show that the machine operation is failing or experiencing an operational change.

Figure 33:
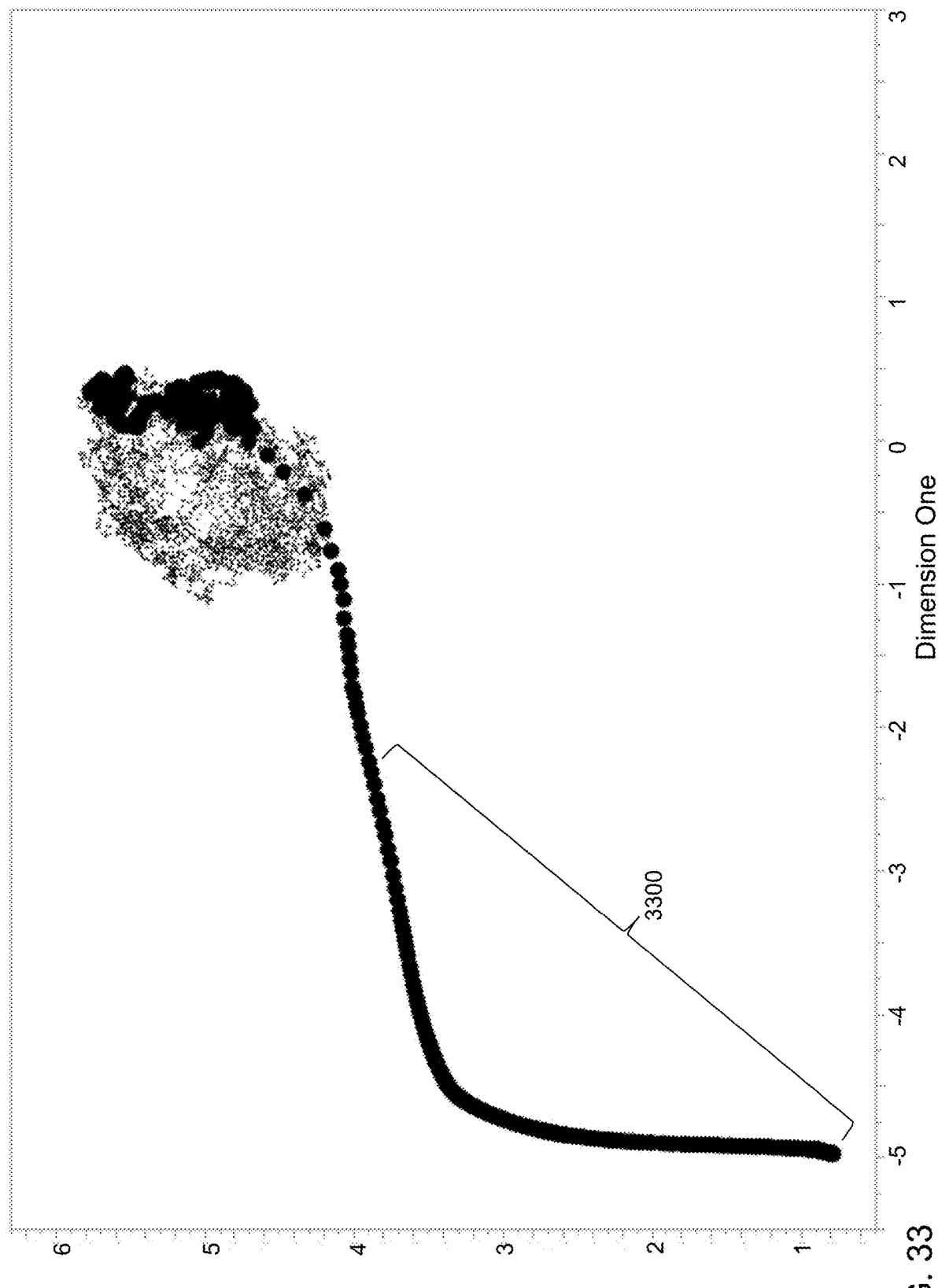
FIG. 33 shows the values of 13 frequency segments projected into two dimensions based on machine operation at the third speed at a fourth time in accordance with an illustrative embodiment.

For illustration, referring to FIG. 33, two-dimensional values computed using the TSNE procedure for the machine operating at 50 rpm using magnitude data from the 13 frequency segments is shown in accordance with an illustrative embodiment at a fourth time point after the third time point. The segment 3300 includes large dots that represent the values generated after the third time point. The tail of large dots included in segment 3300 continue to deviate from the cluster indicating normal operation at the 50 rpm speed using small dots.

Figure 34:
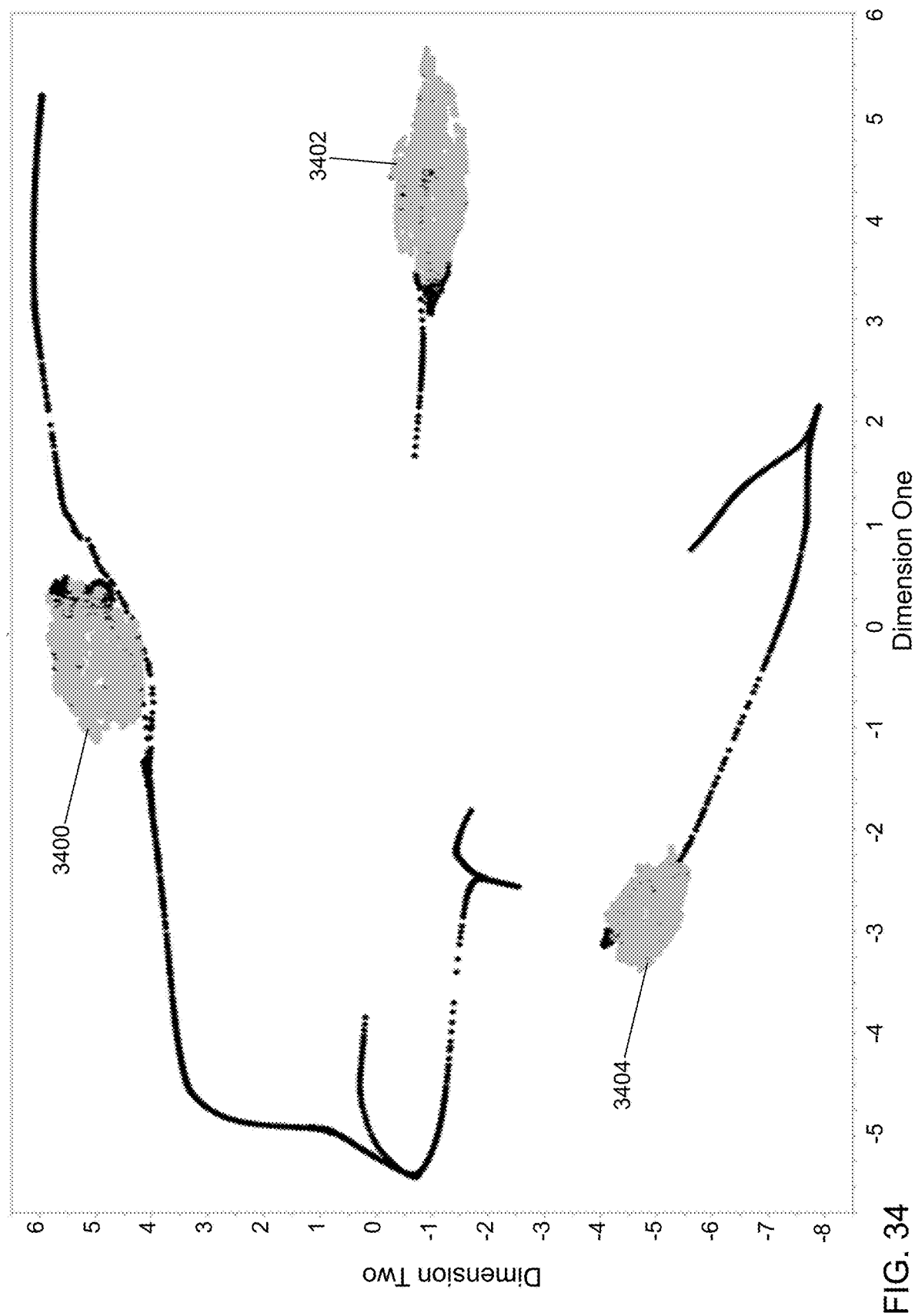
FIG. 34 shows the values of 13 frequency segments projected into two dimensions based on machine operation at the first, second, and third speeds after the injected event in accordance with an illustrative embodiment.

For illustration, referring to FIG. 34, two-dimensional values computed using the TSNE procedure for the machine operating at 25, 35, and 50 rpm using magnitude data from the 13 frequency segments is shown in accordance with an illustrative embodiment at a fifth time point well after the respective intervention time. A 50 rpm segment 3400 shows the cluster of values that indicate normal operation as shown by the gray dots at the 50 rpm speed that diverges after the intervention as shown by the black dots. A 35 rpm segment 3402 shows the cluster of values that indicate normal operation as shown by the gray dots at the 35 rpm speed that diverges after the intervention as shown by the black dots. A 25 rpm segment 3404 shows the cluster of values that indicate normal operation as shown by the gray dots at the 25 rpm speed that diverges after the intervention as shown by the black dots. The trained SVDD worked well for all of the operating modes due to the separation of the "normal" operation for each of the operating speeds as clearly shown in the results of FIG. 34. The results also show why use of the TSNE procedure provides an excellent visual to indicate when machine operation diverges from a normal operation. For example, the TSNE procedure generated graphic can be presented to a machine operator responsible for monitoring the machine operation. The TSNE procedure generated graphic clearly visually represents the divergence of the machine operation after the intervention.

In operation 450, a determination is made concerning whether input dataset 324 includes more observation vectors to process. When input dataset 324 includes more observation vectors to process, processing continues in operation 408. When input dataset 324 does not include more observation vectors to process, processing continues in an operation 452.

In operation 452, the monitoring process is complete until input dataset 324 includes additional observation vectors. For example, input dataset 324 may be updated to include additional observation vectors periodically. Once the additional observation vectors are added, processing continues in operation 408.

Figure 5:
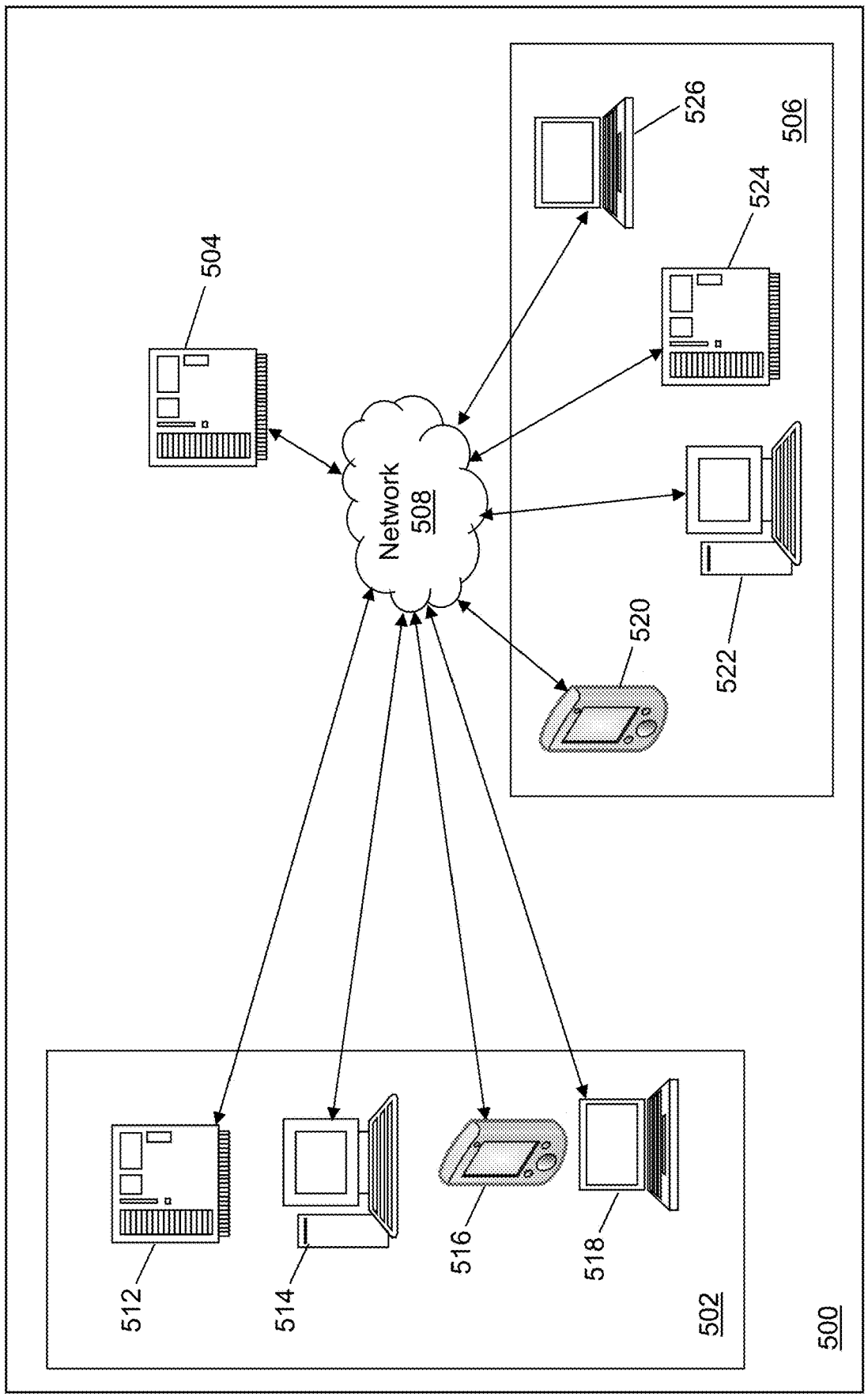
FIG. 5 depicts a block diagram of an event stream processing (ESP) system in accordance with an illustrative embodiment.

Referring to FIG. 5, a block diagram of a stream processing system 500 is shown in accordance with an illustrative embodiment. In an illustrative embodiment, stream processing system 500 may include an event publishing system 502, an ESP device 504, an event subscribing system 506, and a network 508. Each of event publishing system 502, ESP device 504 and event subscribing system 506 may be composed of one or more discrete devices in communication through network 508.

Event publishing system 502 publishes a measurement data value to ESP device 504 as an "event". An event is a data record that reflects a state of a system or a device. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An "Upsert" opcode updates the event object if a key field already exists; otherwise, the event object is inserted. ESP device 504 receives the measurement data value in an event stream, processes the measurement data value, and identifies a computing device of event subscribing system 506 to which the processed measurement data value is sent.

Network 508 may include one or more networks of the same or different types. Network 508 can be any type of wired and/or wireless public or private network including a cellular network, a local area network, a wide area network such as the Internet or the World Wide Web, etc. Network 508 further may comprise sub-networks and consist of any number of communication devices.

The one or more computing devices of event publishing system 502 may include computing devices of any form factor such as a server computer 512, a desktop 514, a smart phone 516, a laptop 518, a personal digital assistant, an integrated messaging device, a tablet computer, a point of sale system, a transaction system, an IoT device, etc. Event publishing system 502 can include any number and any combination of form factors of computing devices that may be organized into subnets. The computing devices of event publishing system 502 send and receive signals through network 508 to/from another of the one or more computing devices of event publishing system 502 and/or to/from ESP device 504. The one or more computing devices of event publishing system 502 may communicate using various transmission media that may be wired and/or wireless as understood by those skilled in the art. The one or more computing devices of event publishing system 502 may be geographically dispersed from each other and/or co-located. Each computing device of the one or more computing devices of event publishing system 502 may be executing one or more event publishing applications such as an event publishing application 922 (shown referring to FIG. 9) of the same or different type.

ESP device 504 can include any form factor of computing device. For illustration, FIG. 5 represents ESP device 504 as a server computer. In general, a server computer may include faster processors, additional processors, more disk memory, and/or more RAM than a client computer and support multi-threading as understood by a person of skill in the art. ESP device 504 sends and receives signals through network 508 to/from event publishing system 502 and/or to/from event subscribing system 506. ESP device 504 may communicate using various transmission media that may be wired and/or wireless as understood by those skilled in the art. ESP device 504 may be implemented on a plurality of computing devices of the same or different type that may support failover processing.

The one or more computing devices of event subscribing system 506 may include computers of any form factor such as a smart phone 520, a desktop 522, a server computer 524, a laptop 526, a personal digital assistant, an integrated messaging device, a tablet computer, etc. Event subscribing system 506 can include any number and any combination of form factors of computing devices. The computing devices of event subscribing system 506 send and receive signals through network 508 to/from ESP device 504. The one or more computing devices of event subscribing system 506 may be geographically dispersed from each other and/or co-located. The one or more computing devices of event subscribing system 506 may communicate using various transmission media that may be wired and/or wireless as understood by those skilled in the art. Each computing device of the one or more computing devices of event subscribing system 506 may be executing one or more event subscribing applications such as an event subscribing application 1122 (shown referring to FIG. 11) of the same or different type.

Figure 6:
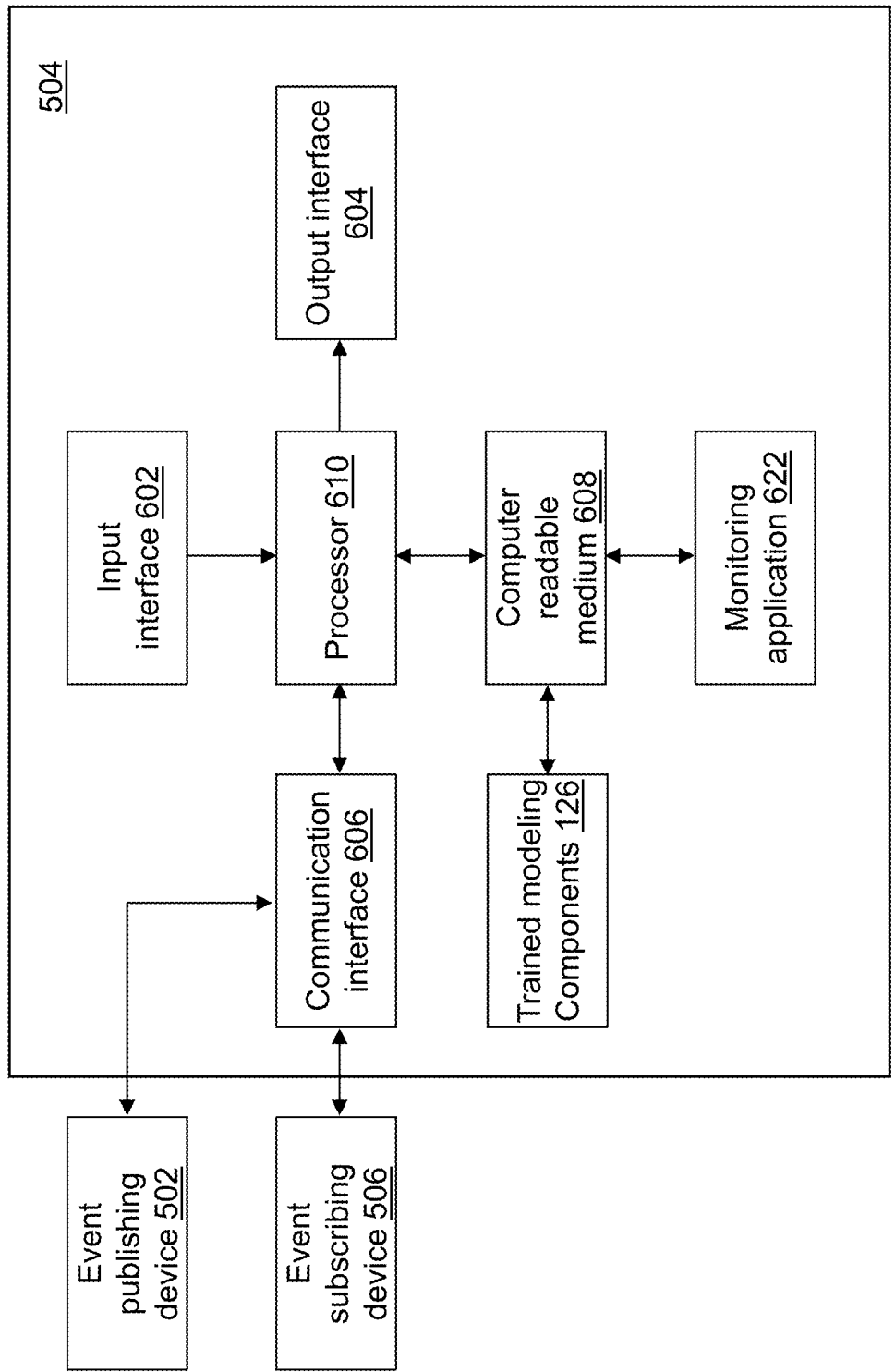
FIG. 6 depicts a block diagram of an ESP device of FIG. 5 in accordance with an illustrative embodiment.

Referring to FIG. 6, a block diagram of ESP device 504 is shown in accordance with an illustrative embodiment. ESP device 504 may include a third input interface 602, a third output interface 604, a third communication interface 606, a third non-transitory computer-readable medium 608, a third processor 610, monitoring application 622, and trained modeling components 126. Fewer, different, and/or additional components may be incorporated into ESP device 504. ESP device 504 and training device 100 may be the same or different devices.

Third input interface 602 provides the same or similar functionality as that described with reference to input interface 102 of training device 100 though referring to ESP device 504. Third output interface 604 provides the same or similar functionality as that described with reference to output interface 104 of training device 100 though referring to ESP device 504. Third communication interface 606 provides the same or similar functionality as that described with reference to communication interface 106 of training device 100 though referring to ESP device 504. Data and messages may be transferred between ESP device 504 and distributed computing system 128 using third communication interface 606. Third computer-readable medium 608 provides the same or similar functionality as that described with reference to computer-readable medium 108 of training device 100 though referring to ESP device 504. Third processor 610 provides the same or similar functionality as that described with reference to processor 110 of training device 100 though referring to ESP device 504.

Monitoring application 622 performs operations similar to monitoring application 322 on new observation vectors received from an event publishing device 900 (shown referring to FIG. 9) to identify outliers and to monitor for changes in the operation of a device(s) generating the new observation vectors. Monitoring application 622 may execute all or a subset of the operations of monitoring application 322. Some or all of the operations described herein may be embodied in monitoring application 622. The operations may be implemented using hardware, firmware, software, or any combination of these methods.

Referring to the example embodiment of FIG. 6, monitoring application 622 is implemented in software (comprised of computer-readable and/or computer-executable instructions) stored in third computer-readable medium 608 and accessible by third processor 610 for execution of the instructions that embody the operations of monitoring application 622. Monitoring application 622 may be written using one or more programming languages, assembly languages, scripting languages, etc. Monitoring application 622 may be integrated with other analytic tools. As an example, monitoring application 622 may be part of an integrated data analytics software application and/or software architecture such as that offered by SAS Institute Inc. of Cary, N.C., USA. For example, monitoring application 6322 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, monitoring application 322 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of monitoring application 322 further may be performed by an ESPE. Monitoring application 622 and training application 122 further may be integrated applications.

Monitoring application 622 may be implemented as a Web application. Monitoring application 622 may be integrated with other system processing tools to automatically process data generated as part of operation of an enterprise, to identify any outliers in the processed data, to monitor the data, and to provide a warning or alert associated with the outlier identification using third input interface 602, third output interface 604, and/or third communication interface 606 so that appropriate action can be initiated in response to the outlier identification. For example, sensor data may be received from event publishing system 502, processed by monitoring application 622, and a warning or an alert may be sent to event subscribing system 506.

Figure 7:
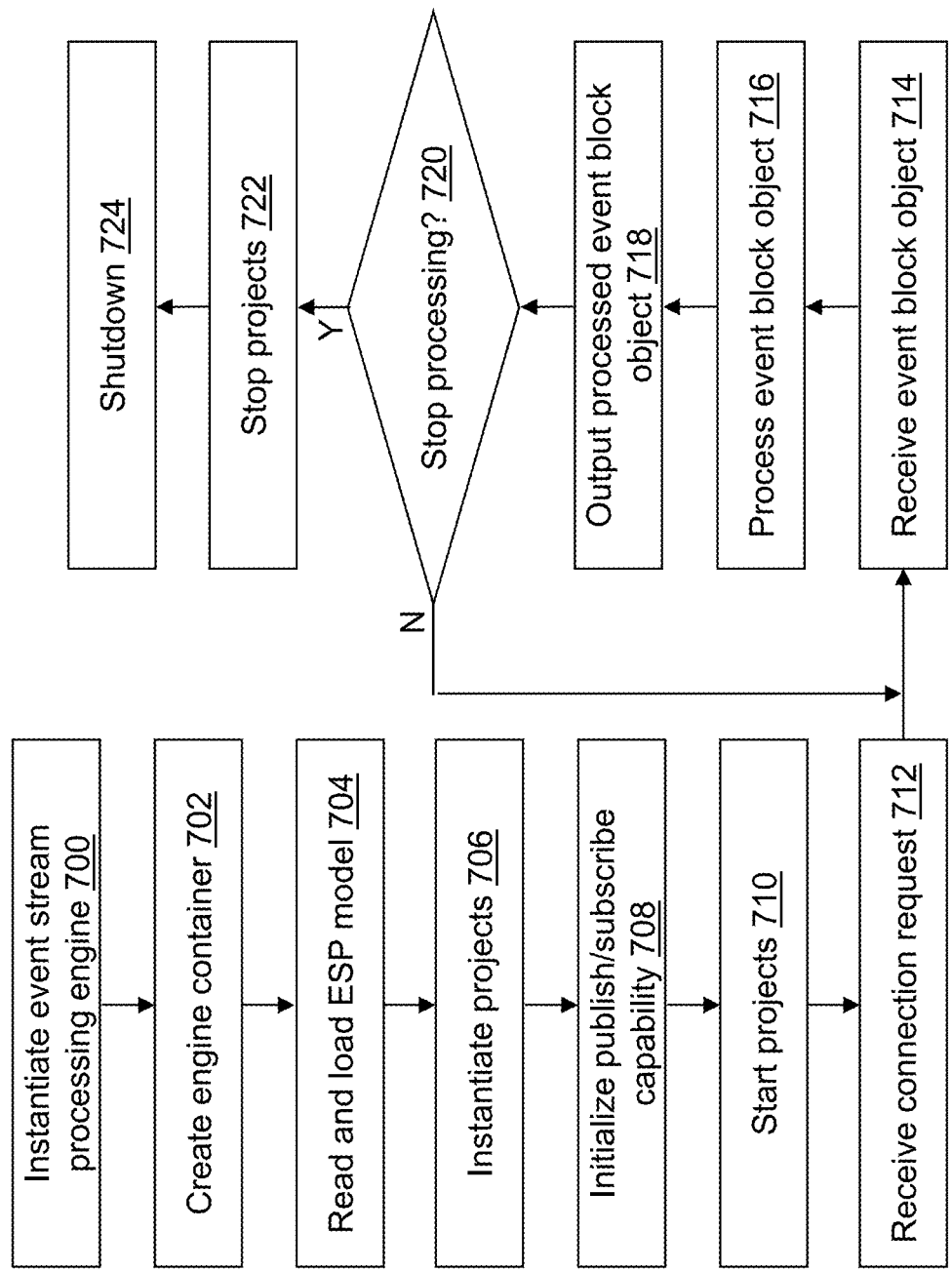
FIG. 7 depicts a flow diagram illustrating examples of operations performed by the ESP device of FIG. 6 in accordance with an illustrative embodiment.

Referring to FIG. 7, a flow diagram illustrating examples of operations performed by ESP device 504 is shown in accordance with an illustrative embodiment. Additional, fewer, or different operations may be performed depending on the embodiment of monitoring application 622. The order of presentation of the operations of FIG. 7 is not intended to be limiting. Although some of the operational flows are presented in sequence, the various operations may be performed in various repetitions, concurrently (in parallel, for example, using threads), and/or in other orders than those that are illustrated. In an illustrative embodiment, ESP device 504 is also configured to perform one or more of the operations of FIGS. 4A and 4B.

Figure 8:
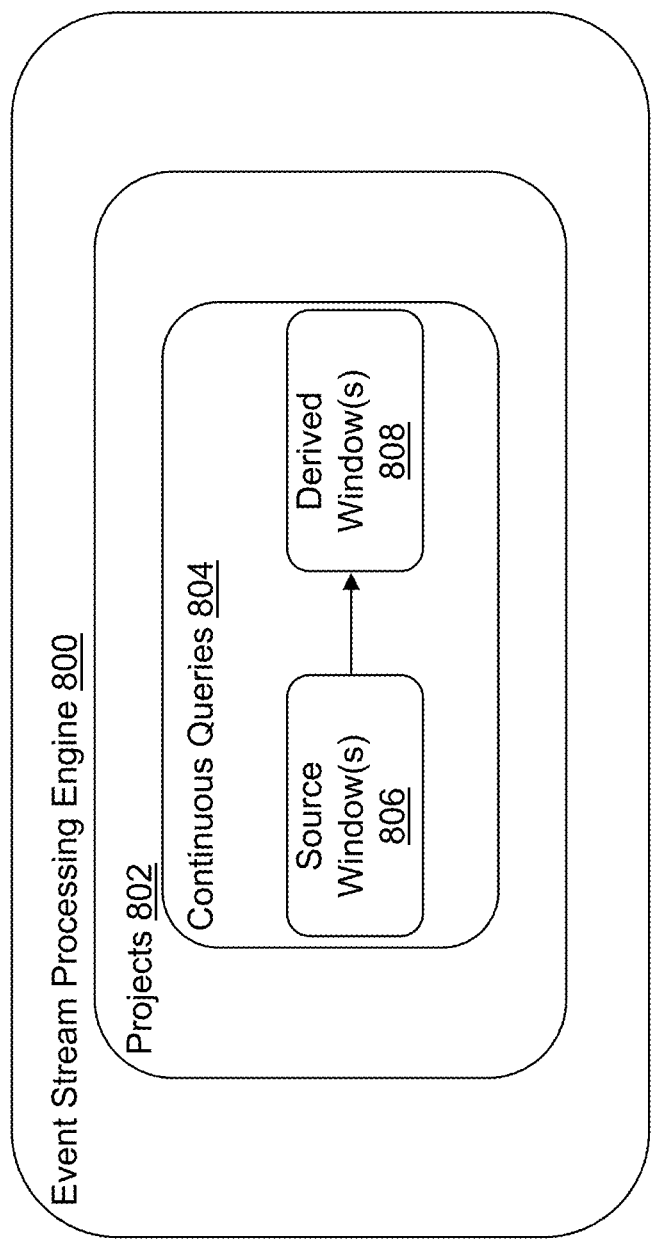
FIG. 8 depicts a block diagram of an ESP engine executing on the ESP device of FIG. 6 in accordance with an illustrative embodiment.

In an operation 700, an ESP engine (ESPE) 800 (shown referring to FIG. 8) is instantiated. For example, referring to FIG. 8, the components of ESPE 800 executing at ESP device 504 are shown in accordance with an illustrative embodiment. ESPE 800 may include one or more projects 802. A project may be described as a second-level container in an engine model managed by ESPE 800 where a thread pool size for the project may be defined by a user. A value of one for the thread pool size indicates that writes are single-threaded. Each project of the one or more projects 802 may include one or more continuous queries 804 that contain data flows, which are data transformations of incoming event streams. The one or more continuous queries 804 may include one or more source windows 806 and one or more derived windows 808.

The engine container is the top-level container in a model that manages the resources of the one or more projects 802. Each ESPE 800 has a unique engine name. Additionally, the one or more projects 802 may each have unique project names, and each query may have a unique continuous query name and begin with a uniquely named source window of the one or more source windows 806. Each ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 800 can support the opcodes for events including insert, update, upsert, and delete. As a result, events entering a source window of the one or more source windows 806 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, a partial-update, or a retention generated event from retention policy management, and one or more microsecond timestamps. For example, the one or more microsecond timestamps may indicate a sensor data generation time, a data receipt time by event publishing device 900, a data transmit time by event publishing device 900, a data receipt time by ESP device 504, etc.

An event block object may be described as a grouping or package of one or more event objects. An event stream may be described as a flow of event block objects. A continuous query of the one or more continuous queries 804 transforms the incoming event stream made up of streaming event block objects published into ESPE 800 into one or more outgoing event streams using the one or more source windows 806 and the one or more derived windows 808. A continuous query can also be thought of as data flow modeling. One or more of the operations of FIGS. 4A and 4B may be implemented by the continuous query of the one or more continuous queries 804.

The one or more source windows 806 are at the top of the directed graph and have no windows feeding into them. Event streams are published into the one or more source windows 806 by event publishing system 506, and from there, the event streams are directed to the next set of connected windows as defined by the directed graph. The one or more derived windows 808 are all instantiated windows that are not source windows and that have other windows streaming events into them. The one or more derived windows 808 perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Referring again to FIG. 7, in an operation 702, the engine container is created. For illustration, ESPE 800 may be instantiated using a function call that specifies the engine container as a manager for the model. The function call may include the engine name for ESPE 800 that may be unique to ESPE 800.

In an operation 704, an ESP model that may be stored locally to third computer-readable medium 608 is read and loaded.

In an operation 706, the one or more projects 802 defined by the ESP model are instantiated. Instantiating the one or more projects 802 also instantiates the one or more continuous queries 804, the one or more source windows 806, and the one or more derived windows 808 defined from the ESP model. Based on the ESP model, ESPE 800 may analyze and process events in motion or event streams. Instead of storing events and running queries against the stored events, ESPE 800 may store queries and stream events through them to allow continuous analysis of data as it is received. The one or more source windows 806 and the one or more derived windows 808 defined from the ESP model may be created based on the relational, pattern matching, and procedural algorithms that transform the input event streams into the output event streams to model, simulate, score, test, predict, etc. based on the continuous query model defined by the ESP model and event publishing application 922 that is streaming data to ESPE 800. For example, the one or more projects 802 may be designed to perform one or more of operations 406 to 450 on observation vectors received in event block objects based on trained modeling components 126.

In an operation 708, the pub/sub capability is initialized for ESPE 800. In an illustrative embodiment, the pub/sub capability is initialized for each project of the one or more projects 802. To initialize and enable pub/sub capability for ESPE 800, a host name and a port number are provided. The host name and the port number of ESPE 800 may be read from the ESP model. Pub/sub clients can use the host name and the port number of ESP device 504 to establish pub/sub connections to ESPE 800. For example, a server listener socket is opened for the port number to enable event publishing system 502 and/or event subscribing system 506 to connect to ESPE 800 for pub/sub services. The host name and the port number of ESP device 504 to establish pub/sub connections to ESPE 800 may be referred to as the host:port designation of ESPE 800 executing on ESP device 504.

Pub/sub is a message-oriented interaction paradigm based on indirect addressing. Processed data recipients (event subscribing system 506) specify their interest in receiving information from ESPE 800 by subscribing to specific classes of events, while information sources (event publishing system 502) publish events to ESPE 800 without directly addressing the data recipients.

In an operation 710, the one or more projects 802 defined from the ESP model are started. The one or more started projects may run in the background on ESP device 504.

In an operation 712, a connection request is received from event publishing device 900 for a source window to which data will be published. A connection request further is received from a computing device of event subscribing system 506, for example, from event subscribing device 1100.

In an operation 714, an event block object is received from event publishing device 900. An event block object containing one or more event objects is injected into a source window of the one or more source windows 806 defined from the ESP model. The event block object may include one or more observation vectors. For example, the source window may perform an operation similar to operation 408 after the project is started. Each time a new event block object is received into the source window, the appropriate data within the received event block object is extracted for processing.

In an operation 716, the received event block object is processed through the one or more continuous queries 804. For example, the one or more continuous queries 804 may be designed to perform one or more of operations 408 to 422, 430 to 434, and/or 430 to 442 on observation vectors received in event block objects based on trained modeling components 126. The unique ID assigned to the event block object by event publishing device 900 is maintained as the event block object is passed through ESPE 800 and between the one or more source windows 806 and/or the one or more derived windows 808 of ESPE 800. A unique embedded transaction ID further may be embedded in the event block object as the event block object is processed by a continuous query. ESPE 800 maintains the event block containership aspect of the received event blocks from when the event block is published into a source window and works its way through the directed graph defined by the one or more continuous queries 804 with the various event translations before being output to event subscribing device 1100.

In an operation 718, the processed event block object is output to one or more subscribing devices of event subscribing system 506 such as event subscribing device 1100. An output from the one or more continuous queries 804 may be an event indicator or the observation vector indicating occurrence of an event in one of operations 422, 434, or 442 similar to operations 424, 436, and/or 444. An output from the one or more continuous queries 804 may be the computed parameters similar to operations 426, 438, and/or 446.

The processed event block object may only consist of events that indicate occurrence of an event depending on the embodiment. Event subscribing device 1100 can correlate a group of subscribed event block objects back to a group of published event block objects by comparing the unique ID of the event block object that a publisher, such as event publishing device 900, attached to the event block object with the event block ID received by event subscribing device 1100. The received event block objects further may be stored, for example, in a RAM or cache type memory of third computer-readable medium 608. For example ESP device 504 may further include output dataset 326.

In an operation 720, a determination is made concerning whether or not processing is stopped. If processing is not stopped, processing continues in operation 714 to continue receiving the one or more event streams containing event block objects from event publishing device 900. If processing is stopped, processing continues in an operation 722.

In operation 722, the started projects are stopped.

In an operation 724, ESPE 800 is shutdown.

Figure 9:
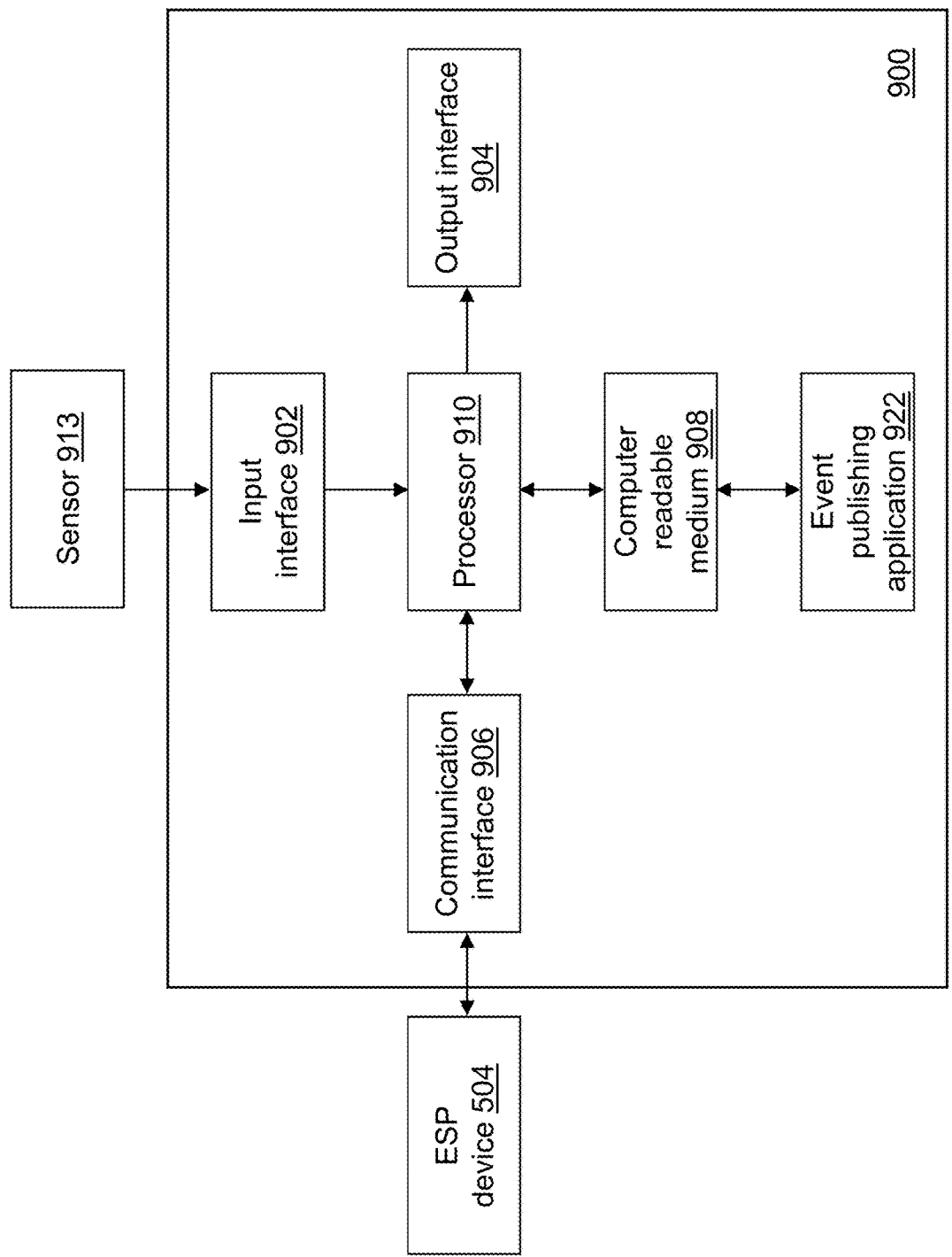
FIG. 9 depicts a block diagram of an event publishing device of an event publishing system of the ESP system of FIG. 5 in accordance with an illustrative embodiment.

Referring to FIG. 9, a block diagram of an event publishing device 900 of event publishing system 502 is shown in accordance with an example embodiment. Event publishing device 900 is an example computing device of event publishing system 502. For example, each of server computer 512, desktop 514, smart phone 516, and laptop 518 may be an instance of event publishing device 900. Event publishing device 900 may include a fourth input interface 902, a fourth output interface 904, a fourth communication interface 906, a fourth computer-readable medium 908, a fourth processor 910, and event publishing application 922. Each event publishing device 900 of event publishing system 502 may include the same or different components and combinations of components. Fewer, different, and additional components may be incorporated into event publishing device 900. Event publishing system 502 includes, is integrated with, and/or communicates with a sensor 913, data generation devices, data capture devices, etc. For example, sensor 913 may be the same as or similar to second sensor 315.

Fourth input interface 902 provides the same or similar functionality as that described with reference to input interface 102 of training device 100 though referring to event publishing device 900. Fourth output interface 904 provides the same or similar functionality as that described with reference to output interface 104 of training device 100 though referring to event publishing device 900. Fourth communication interface 906 provides the same or similar functionality as that described with reference to communication interface 106 of training device 100 though referring to event publishing device 900. Data and messages may be transferred between event publishing device 900 and ESP device 504 using fourth communication interface 906. Fourth computer-readable medium 908 provides the same or similar functionality as that described with reference to computer-readable medium 108 of training device 100 though referring to event publishing device 900. Fourth processor 910 provides the same or similar functionality as that described with reference to processor 110 of training device 100 though referring to event publishing device 900.

Event publishing application 922 performs operations associated with generating, capturing, and/or receiving a measurement data value and publishing the measurement data value in an event stream to ESP device 504. One or more measurement data values may be included in an observation vector. The operations may be implemented using hardware, firmware, software, or any combination of these methods. Referring to the example embodiment of FIG. 9, event publishing application 922 is implemented in software (comprised of computer-readable and/or computer-executable instructions) stored in fourth computer-readable medium 908 and accessible by fourth processor 910 for execution of the instructions that embody the operations of event publishing application 922. Event publishing application 922 may be written using one or more programming languages, assembly languages, scripting languages, etc. Event publishing application 922 may be implemented as a Web application.

Figure 10:
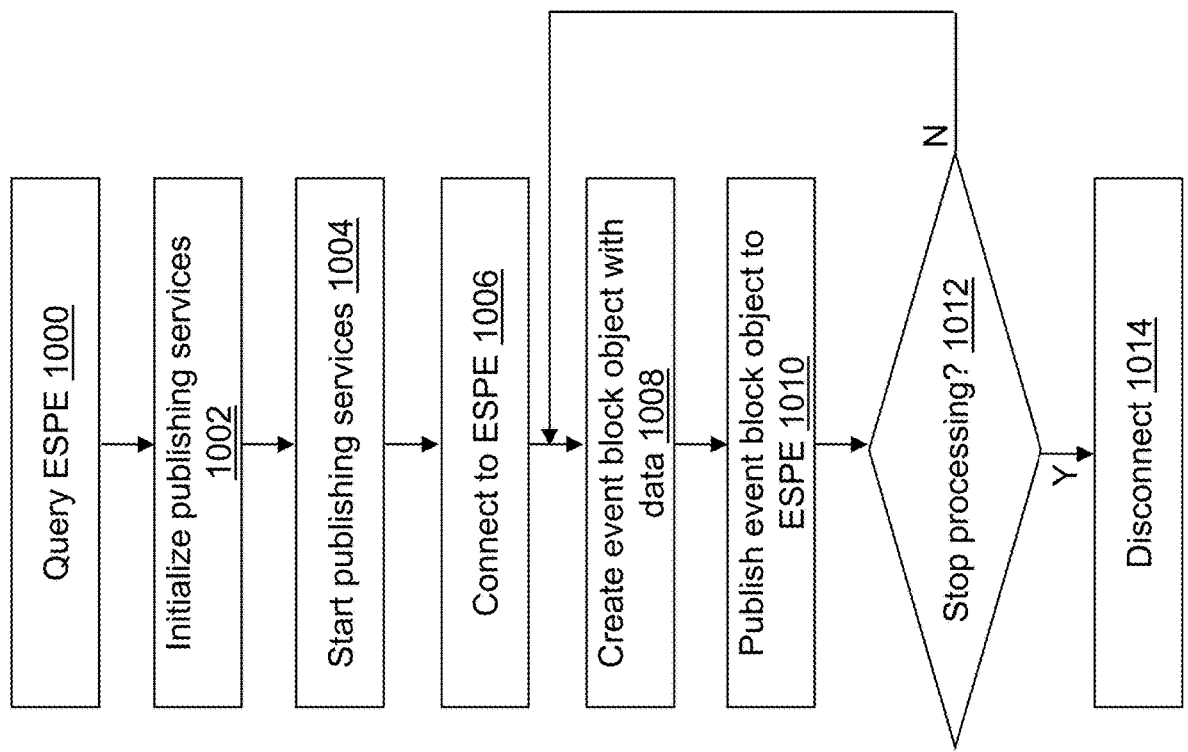
FIG. 10 depicts a flow diagram illustrating examples of operations performed by the event publishing device of FIG. 9 in accordance with an illustrative embodiment.

Referring to FIG. 10, example operations associated with event publishing application 922 are described. Additional, fewer, or different operations may be performed depending on the embodiment. The order of presentation of the operations of FIG. 10 is not intended to be limiting. A user can interact with one or more user interface windows presented to the user in a display under control of event publishing application 922 independently or through a browser application in an order selectable by the user. Although some of the operational flows are presented in sequence, the various operations may be performed in various repetitions, concurrently, and/or in other orders than those that are illustrated. For example, a user may execute event publishing application 922, which causes presentation of a first user interface window, which may include a plurality of menus and selectors such as drop-down menus, buttons, text boxes, hyperlinks, etc. associated with event publishing application 922 as understood by a person of skill in the art. As further understood by a person of skill in the art, various operations may be performed in parallel, for example, using a plurality of threads or a plurality of computing devices such as a grid or a cloud of computing devices.

In an operation 1000, ESPE 800 is queried, for example, to discover projects 802, continuous queries 804, windows 806, 808, window schema, and window edges currently running in ESPE 800. The engine name and host/port to ESPE 800 may be provided as an input to the query and a list of strings may be returned with the names of the projects 802, of the continuous queries 804, of the windows 806, 808, of the window schema, and/or of the window edges of currently running projects on ESPE 800. The host is associated with a host name or Internet Protocol (IP) address of ESP device 504. The port is the port number provided when a publish/subscribe (pub/sub) capability is initialized by ESPE 800. The engine name is the name of ESPE 800. The engine name of ESPE 800 and host/port to ESP device 504 may be read from a storage location on fourth computer-readable medium 908, may be provided on a command line, or otherwise input to or defined by event publishing application 922 as understood by a person of skill in the art.

In an operation 1002, publishing services are initialized.

In an operation 1004, the initialized publishing services are started, which may create a publishing client for the instantiated event publishing application 922. The publishing client performs the various pub/sub activities for the instantiated event publishing application 922. For example, a string representation of a URL to ESPE 800 is passed to a "Start" function. For example, the URL may include the host:port designation of ESPE 800 executing at ESP device 504, a project of the projects 802, a continuous query of the continuous queries 804, and a window of the source windows 806. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 922 is publishing to more than one source window of ESPE 800, the initialized publishing services may be started to each source window using the associated names (project name, continuous query name, source window name).

In an operation 1006, a connection is made between event publishing application 922 and ESPE 800 for each source window of the source windows 806 to which any measurement data value is published. To make the connection, the pointer to the created publishing client may be passed to a "Connect" function. If event publishing application 922 is publishing to more than one source window of ESPE 800, a connection may be made to each started window using the pointer returned for the respective "Start" function call.

In an operation 1008, an event block object is created by event publishing application 922 that includes one or more measurement data values. The measurement data values may have been received, captured, generated, etc., for example, through third communication interface 906 or third input interface 902 or by third processor 910. The measurement data values may be processed before inclusion in the event block object, for example, to change a unit of measure, convert to a different reference system, etc. The event block object may include one or more measurement data values measured at different times and/or by different devices and/or by the same or different sensors associated with each device.

In an operation 1010, the created event block object is published to ESPE 800, for example, using the pointer returned for the respective "Start" function call to the appropriate source window. Event publishing application 922 passes the created event block object to the created publishing client, where the unique ID field in the event block object has been set by event publishing application 922 possibly after being requested from the created publishing client. In an illustrative embodiment, event publishing application 922 may wait to begin publishing until a "Ready" callback has been received from the created publishing client. The event block object is injected into the source window, continuous query, and project associated with the started publishing client.

In an operation 1012, a determination is made concerning whether or not processing is stopped. If processing is not stopped, processing continues in operation 1008 to continue creating and publishing event block objects that include measurement data values. If processing is stopped, processing continues in an operation 1014.

In operation 1014, the connection made between event publishing application 922 and ESPE 800 through the created publishing client is disconnected, and each started publishing client is stopped.

Figure 11:
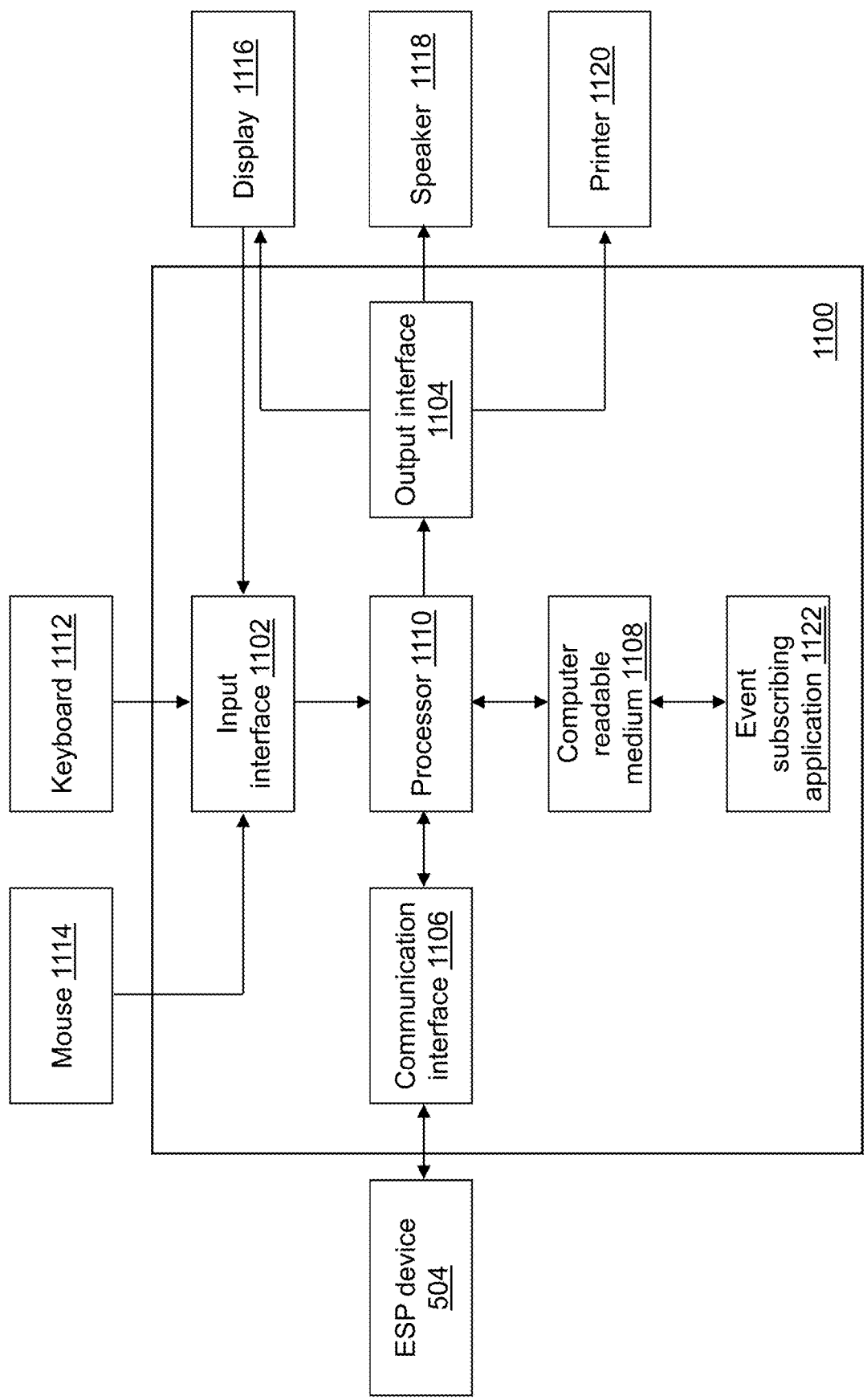
FIG. 11 depicts a block diagram of an event subscribing device of an event subscribing system of the ESP system of FIG. 5 in accordance with an illustrative embodiment.

Referring to FIG. 11, a block diagram of an event subscribing device 1100 is shown in accordance with an example embodiment. Event subscribing device 1100 is an example computing device of event subscribing system 506. For example, each of smart phone 520, desktop 522, server computer 524, and laptop 526 may be an instance of event subscribing device 1100. Event subscribing device 1100 may include a fifth input interface 1102, a fifth output interface 1104, a fourth communication interface 1106, a fifth computer-readable medium 1108, a fifth processor 1110, and event subscribing application 1122. Fewer, different, and additional components may be incorporated into event subscribing device 1100. Each event subscribing device 1100 of event subscribing system 506 may include the same or different components or combination of components.

Fifth input interface 1102 provides the same or similar functionality as that described with reference to input interface 102 of training device 100 though referring to event subscribing device 1100. Fifth output interface 1104 provides the same or similar functionality as that described with reference to output interface 104 of training device 100 though referring to event subscribing device 1100. Fifth communication interface 1106 provides the same or similar functionality as that described with reference to communication interface 106 of training device 100 though referring to event subscribing device 1100. Data and messages may be transferred between event subscribing device 1100 and ESP device 504 using fifth communication interface 1106. Fifth computer-readable medium 1108 provides the same or similar functionality as that described with reference to computer-readable medium 108 of training device 100 though referring to event subscribing device 1100. Fifth processor 1110 provides the same or similar functionality as that described with reference to processor 110 of training device 100 though referring to event subscribing device 1100.

Figure 12:
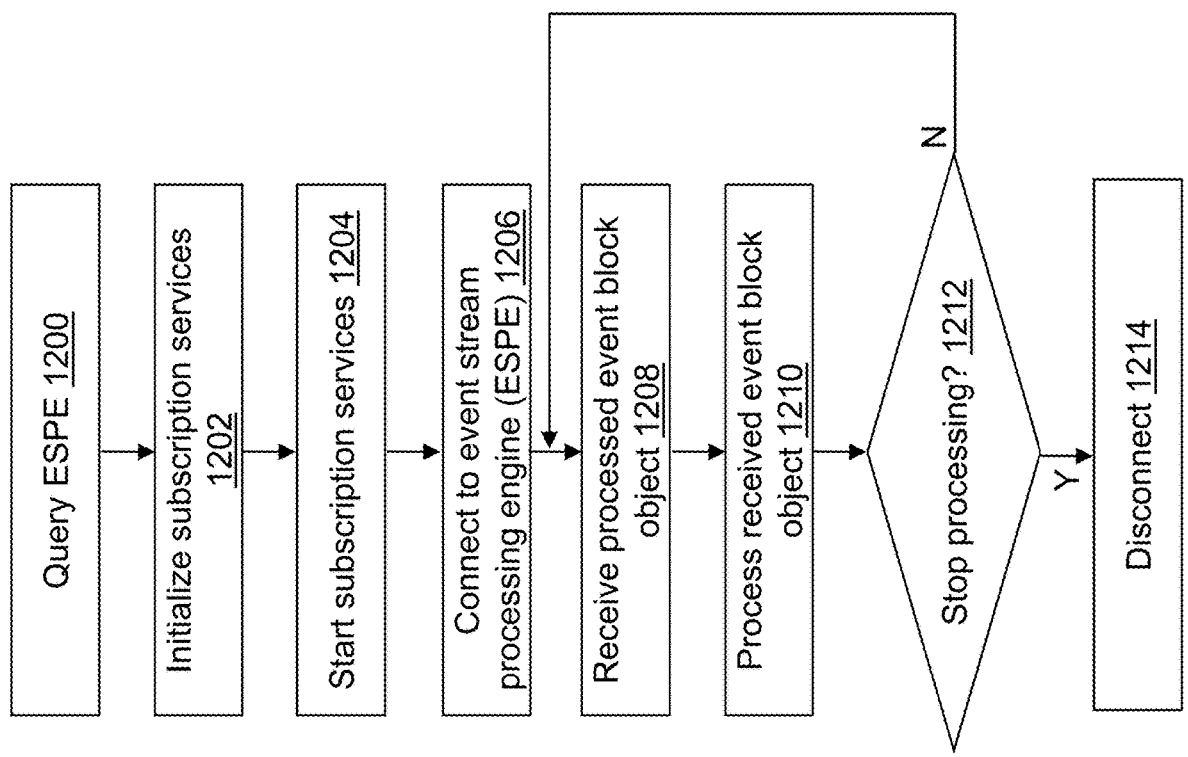
FIG. 12 depicts a flow diagram illustrating examples of operations performed by the event subscribing device of FIG. 11 in accordance with an illustrative embodiment.

Referring to FIG. 12, example operations associated with event subscribing application 1122 are described. Additional, fewer, or different operations may be performed depending on the embodiment. The order of presentation of the operations of FIG. 12 is not intended to be limiting.

Similar to operation 1100, in an operation 1200, ESPE 800 is queried, for example, to discover names of projects 802, of continuous queries 804, of windows 806, 808, of window schema, and of window edges currently running in ESPE 800. The host name of ESP device 504, the engine name of ESPE 800, and the port number opened by ESPE 800 are provided as an input to the query and a list of strings may be returned with the names to the projects 802, continuous queries 804, windows 806, 808, window schema, and/or window edges.

In an operation 1202, subscription services are initialized.

In an operation 1204, the initialized subscription services are started, which may create a subscribing client on behalf of event subscribing application 1122 at event subscribing device 1100. The subscribing client performs the various pub/sub activities for event subscribing application 1122. For example, a URL to ESPE 800 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1206, a connection may be made between event subscribing application 1122 executing at event subscribing device 1100 and ESPE 800 through the created subscribing client. To make the connection, the pointer to the created subscribing client may be passed to a "Connect" function and a mostly non-busy wait loop created to wait for receipt of event block objects.

In an operation 1208, the processed event block object is received by event subscribing application 1122 executing at event subscribing device 1100 as a result of operation 718.

In an operation 1210, the received event block object is processed based on the operational functionality provided by event subscribing application 1122. For example, event subscribing application 1122 may extract data from the received event block object and store the extracted data in a database. In addition, or in the alternative, event subscribing application 1122 may extract data from the received event block object and send the extracted data to a system control operator display system, an automatic control system, a notification device, an analytic device, etc. In addition, or in the alternative, event subscribing application 1122 may extract data from the received event block object and send the extracted data to a post-incident analysis device to further analyze the data included in the received event block object. Event subscribing application 1122 may perform any number of different types of actions as a result of extracting data from the received event block object. The action may involve presenting information on a third display 1116 or a third printer 1120, presenting information using a third speaker 1118, storing data in fifth computer-readable medium 1108, sending information to another device using fifth communication interface 1106, etc. A user may further interact with presented information using a third mouse 1114 and/or a third keyboard 1112.

In an operation 1212, a determination is made concerning whether or not processing is stopped. If processing is not stopped, processing continues in operation 1208 to continue receiving and processing event block objects. If processing is stopped, processing continues in an operation 1214.

In operation 1214, the connection made between event subscribing application 1122 and ESPE 800 through the subscribing client is disconnected, and the subscribing client is stopped.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) compute a frequency spectrum of a plurality of observation vectors using a Fourier transform, wherein each observation vector of the plurality of observation vectors includes a sensor value measured by a sensor, wherein the plurality of observation vectors includes the sensor value measured as a function of time;
   (B) repeat (A) a predefined plurality of times with successive windows of the plurality of observation vectors, wherein each window of the successive windows includes a subset of the plurality of observation vectors, wherein the successive windows include successive subsets selected sequentially in time;
   (C) compute an average frequency spectrum from the frequency spectrum computed the predefined plurality of times;
   (D) apply a predefined noise filter to the computed average frequency spectrum to define a filtered frequency spectrum;
   (E) compute a distance value between the defined filtered frequency spectrum and a predefined reference spectrum using a distance computation function;
   (F) determine when an event has occurred based on a comparison between the computed distance value and a predefined distance threshold; and
   (G) when an event has occurred based on the comparison, output an event indicator to indicate the event has occurred.

2. The non-transitory computer-readable medium of claim 1, wherein the Fourier transform is a short time Fourier transform.

3. The non-transitory computer-readable medium of claim 2, wherein the frequency spectrum is computed using the short time Fourier transform with a predefined window size that defines a number of observation vectors selected from the plurality of observation vectors for each subset and with a predefined fast Fourier transform length.

4. The non-transitory computer-readable medium of claim 3, wherein each subset includes the number of observation vectors selected from the plurality of observation vectors.

5. The non-transitory computer-readable medium of claim 4, wherein each successive subset includes an overlapping number of observation vectors selected from a previous subset in most recent time order.

6. The non-transitory computer-readable medium of claim 3, wherein the predefined window size and the predefined fast Fourier transform length are selected based on training with training observation vectors.

7. The non-transitory computer-readable medium of claim 1, wherein the predefined plurality of times is selected based on training with training observation vectors.

8. The non-transitory computer-readable medium of claim 1, wherein the predefined noise filter is a lowpass filter.

9. The non-transitory computer-readable medium of claim 8, wherein the lowpass filter is selected from the group consisting of a median filter, a Butterworth filter, a Chebyshev I filter, and a Chebyshev II filter.

10. The non-transitory computer-readable medium of claim 1, wherein the distance computation function is selected from the group consisting of a mean absolute distance computation function and a Hausdorff distance computation function.

11. The non-transitory computer-readable medium of claim 1, wherein the predefined distance threshold is selected based on training with training observation vectors.

12. The non-transitory computer-readable medium of claim 1, wherein the event indicator is a most recent observation vector of the plurality of observation vectors.

13. The non-transitory computer-readable medium of claim 1, wherein the event indicator is a notification message.

14. The non-transitory computer-readable medium of claim 1, wherein the plurality of observation vectors is selected from a stream of event block objects received by the computing device.

15. The non-transitory computer-readable medium of claim 1, wherein the event indicator is output by streaming the event indicator to a second computing device that subscribes to receive the event indicator from the computing device.

16. The non-transitory computer-readable medium of claim 1, wherein the computing device is executing an event stream processing engine that performs the computer-readable instructions.

17. The non-transitory computer-readable medium of claim 1, wherein the computer-readable instructions further cause the computing device to repeat (A) to (G) with a next observation vector.

18. A computing device comprising:
   a processor; and
   a non-transitory computer-readable medium operably coupled to the processor, the computer-readable medium having computer-readable instructions stored thereon that, when executed by the processor, cause the computing device to
   (A) compute a frequency spectrum of a plurality of observation vectors using a Fourier transform, wherein each observation vector of the plurality of observation vectors includes a sensor value measured by a sensor, wherein the plurality of observation vectors includes the sensor value measured as a function of time;
   (B) repeat (A) a predefined plurality of times with successive windows of the plurality of observation vectors, wherein each window of the successive windows includes a subset of the plurality of observation vectors, wherein the successive windows include successive subsets selected sequentially in time;
- (C) compute an average frequency spectrum from the frequency spectrum computed the predefined plurality of times;
- (D) apply a predefined noise filter to the computed average frequency spectrum to define a filtered frequency spectrum;
- (E) compute a distance value between the defined filtered frequency spectrum and a predefined reference spectrum using a distance computation function;
- (F) determine when an event has occurred based on a comparison between the computed distance value and a predefined distance threshold; and
- (G) when an event has occurred based on the comparison, output an event indicator to indicate the event has occurred.

19. A method of detecting an event, the method comprising:
- (A) computing, by a computing device, a frequency spectrum of a plurality of observation vectors using a Fourier transform, wherein each observation vector of the plurality of observation vectors includes a sensor value measured by a sensor, wherein the plurality of observation vectors includes the sensor value measured as a function of time;
- (B) repeating (A), by the computing device, a predefined plurality of times with successive windows of the plurality of observation vectors, wherein each window of the successive windows includes a subset of the plurality of observation vectors, wherein the successive windows include successive subsets selected sequentially in time;
- (C) computing, by the computing device, an average frequency spectrum from the frequency spectrum computed the predefined plurality of times;
- (D) applying, by the computing device, a predefined noise filter to the computed average frequency spectrum to define a filtered frequency spectrum;
- (E) computing, by the computing device, a distance value between the defined filtered frequency spectrum and a predefined reference spectrum using a distance computation function;
- (F) determining, by the computing device, when an event has occurred based on a comparison between the computed distance value and a predefined distance threshold; and
- (G) when an event has occurred based on the comparison, outputting, by the computing device, an event indicator to indicate the event has occurred.

20. The method of claim 19, wherein the Fourier transform is a short time Fourier transform.

21. The method of claim 20, wherein the frequency spectrum is computed using the short time Fourier transform with a predefined window size that defines a number of observation vectors selected from the plurality of observation vectors for each subset and with a predefined fast Fourier transform length.

22. The method of claim 21, wherein each subset includes the number of observation vectors selected from the plurality of observation vectors.

23. The method of claim 22, wherein each successive subset includes an overlapping number of observation vectors selected from a previous subset in most recent time order.

24. The method of claim 21, wherein the predefined window size and the predefined fast Fourier transform length are selected based on training with training observation vectors.

25. The method of claim 19, wherein the predefined noise filter is a lowpass filter.

26. The method of claim 19, wherein the distance computation function is selected from the group consisting of a mean absolute distance computation function and a Hausdorff distance computation function.

27. The method of claim 19, wherein the event indicator is a most recent observation vector of the plurality of observation vectors.

28. The method of claim 19, wherein the event indicator is a notification message.

29. The method of claim 19, wherein the plurality of observation vectors is selected from a stream of event block objects received by the computing device.

30. The method of claim 19, wherein the event indicator is output by streaming the event indicator to a second computing device that subscribes to receive the event indicator from the computing device.

* * * * *

UNITED STATES PATENT AND TRADEMARK OFFICE
CERTIFICATE OF CORRECTION

| | | |
|---|---|---|
| PATENT NO. | : 10,558,207 B1 | Page 1 of 1 |
| APPLICATION NO. | : 16/549608 | |
| DATED | : February 11, 2020 | |
| INVENTOR(S) | : Anya M. McGuirk et al. | |

It is certified that error appears in the above-identified patent and that said Letters Patent is hereby corrected as shown below:

In the Specification

Column 3, Line 14:
Delete the phrase "$\alpha_1$ is the Lagrange constant associated with" and replace with --$\alpha_j$ is the Lagrange constant associated with--.

Column 23, Line 9:
Delete the phrase "where $\alpha$ is a center of the hypersphere" and replace with --where $a$ is a center of the hypersphere--.

Column 23, Line 44:
Delete the phrase "having a radius $R$ from a center $\alpha$." and replace with --having a radius $R$ from a center $a$.--.

Signed and Sealed this
Twenty-sixth Day of May, 2020

Andrei Iancu
*Director of the United States Patent and Trademark Office*